US012426632B2

(12) United States Patent
DePiano et al.

(10) Patent No.: US 12,426,632 B2
(45) Date of Patent: Sep. 30, 2025

(54) HEATING ELEMENTS FORMED FROM A SHEET OF A MATERIAL AND INPUTS AND METHODS FOR THE PRODUCTION OF ATOMIZERS

(71) Applicant: RAI STRATEGIC HOLDINGS, INC., Winston-Salem, NC (US)

(72) Inventors: John DePiano, Burlington, MA (US); David Smith, Needham, MA (US); Charles Jacob Novak, III, Winston-Salem, NC (US); Frank S. Silveira, Wilmington, MA (US); Michael Laine, Newburyport, MA (US); Robert Alden Metcalfe, Newburyport, MA (US); John William Wolber, Nashua, NH (US)

(73) Assignee: R.J. REYNOLDS TOBACCO COMPANY, Winston-Salem, NC (US)

( * ) Notice: Subject to any disclaimer, the term of this patent is extended or adjusted under 35 U.S.C. 154(b) by 0 days.

(21) Appl. No.: 18/243,948

(22) Filed: Sep. 8, 2023

(65) Prior Publication Data

US 2023/0413905 A1 Dec. 28, 2023

Related U.S. Application Data

(60) Continuation of application No. 16/009,830, filed on Jun. 15, 2018, now Pat. No. 11,785,990, which is a (Continued)

(51) Int. Cl.

*H05B 3/46* (2006.01)
*A24F 40/10* (2020.01)

(Continued)

(52) U.S. Cl.

CPC .............. *A24F 40/46* (2020.01); *A24F 40/40* (2020.01); *A24F 40/70* (2020.01); *H05B 3/46* (2013.01);

(Continued)

(58) Field of Classification Search

None

See application file for complete search history.

(56) References Cited

U.S. PATENT DOCUMENTS

| | | | | |
|---|---|---|---|---|
| 1,771,366 A | | 7/1930 | Wyss et al. | |
| 1,990,547 A | * | 2/1935 | Jancke | A45D 4/12 219/528 |

(Continued)

FOREIGN PATENT DOCUMENTS

| | | |
|---|---|---|
| AU | 276250 | 7/1965 |
| CA | 2 641 869 | 5/2010 |

(Continued)

OTHER PUBLICATIONS

International Search Report and Written Opinion of the International Searching Authority for corresponding International Application No. PCT/US2014/024697 mailed Jan. 20, 2015.

(Continued)

*Primary Examiner* — Thor S Campbell

(74) *Attorney, Agent, or Firm* — Womble Bond Dickinson (US) LLP

(57) ABSTRACT

The present disclosure relates to an input for production of atomizers and atomizers formed from a sheet of a material, and which may be employed in an aerosol delivery device such as a smoking article. The input may include a carrier and heating elements coupled thereto. The heating elements may include first and second ends and interconnected alternating loops disposed therebetween. The heating elements may be oriented parallel to a longitudinal axis of the carrier, (Continued)

or perpendicular thereto. The heating elements may be coupled to a liquid transport element by bending the interconnected loops at least partially around the liquid transport element. The ends of the heating element may be coupled to heater terminals. A related method for forming atomizers is also provided.

10 Claims, 28 Drawing Sheets

Related U.S. Application Data continuation of application No. 15/232,389, filed on Aug. 9, 2016, now Pat. No. 10,595,561, which is a division of application No. 13/842,125, filed on Mar. 15, 2013, now Pat. No. 9,491,974.

(51) Int. Cl.
*A24F 40/40* (2020.01)
*A24F 40/46* (2020.01)
*A24F 40/70* (2020.01)

(52) U.S. Cl.
CPC ........ *A24F 40/10* (2020.01); *H05B 2203/017* (2013.01); *H05B 2203/021* (2013.01); *Y10T 29/49387* (2015.01)

(56) References Cited

U.S. PATENT DOCUMENTS 2,057,353 A 10/1936 Whittemore, Jr.
2,104,266 A 1/1938 McCormick
2,556,679 A * 6/1951 Czepek .................... H05B 3/00 338/242
2,805,669 A 9/1957 Meriro
3,200,819 A 8/1965 Gilbert
3,316,919 A 5/1967 Green et al.
3,398,754 A 8/1968 Tughan
3,419,015 A 12/1968 Wochnowski
3,424,171 A 1/1969 Rooker
3,476,118 A 11/1969 Luttich
4,054,145 A 10/1977 Berndt et al.
4,131,117 A 12/1978 Kite et al.
4,150,677 A 4/1979 Osborne
4,190,046 A 2/1980 Virag
4,219,032 A 8/1980 Tabatznik et al.
4,259,970 A 4/1981 Green, Jr.
4,284,089 A 8/1981 Ray
4,303,083 A 12/1981 Burruss, Jr.
4,449,541 A 5/1984 Mays et al.
4,506,682 A 3/1985 Muller
4,635,651 A 1/1987 Jacobs
4,674,519 A 6/1987 Keritsis et al.
4,708,151 A 11/1987 Shelar
4,714,082 A 12/1987 Banerjee et al.
4,735,217 A 4/1988 Gerth et al.
4,756,318 A 7/1988 Clearman et al.
4,771,795 A 9/1988 White et al.
4,776,353 A 10/1988 Lilja et al.
4,793,365 A 12/1988 Sensabaugh, Jr. et al.
4,800,903 A 1/1989 Ray et al.
4,819,665 A 4/1989 Roberts et al.
4,821,749 A 4/1989 Toft et al.
4,830,028 A 5/1989 Lawson et al.
4,836,224 A 6/1989 Lawson et al.
4,836,225 A 6/1989 Sudoh
4,848,374 A 7/1989 Chard et al.
4,848,376 A 7/1989 Lilja et al.
4,874,000 A 10/1989 Tamol et al.
4,880,018 A 11/1989 Graves, Jr. et al.
4,887,619 A 12/1989 Burcham, Jr. et al.
4,907,606 A 3/1990 Lilja et al.
4,913,168 A 4/1990 Potter et al.
4,917,119 A 4/1990 Potter et al.
4,917,128 A 4/1990 Clearman et al.
4,922,901 A 5/1990 Brooks et al.
4,924,888 A 5/1990 Perfetti et al.
4,928,714 A 5/1990 Shannon
4,938,236 A 7/1990 Banerjee et al.
4,941,483 A 7/1990 Ridings et al.
4,941,484 A 7/1990 Clapp et al.
4,945,931 A 8/1990 Gori
4,947,874 A 8/1990 Brooks et al.
4,947,875 A 8/1990 Brooks et al.
4,972,854 A 11/1990 Kiernan et al.
4,972,855 A 11/1990 Kuriyama et al.
4,986,286 A 1/1991 Roberts et al.
4,987,906 A 1/1991 Young et al.
5,005,593 A 4/1991 Fagg
5,019,122 A 5/1991 Clearman et al.
5,022,416 A 6/1991 Watson
5,034,721 A 7/1991 Benedictus
5,042,510 A 8/1991 Curtiss et al.
5,056,537 A 10/1991 Brown et al.
5,060,669 A 10/1991 White et al.
5,060,671 A 10/1991 Counts et al.
5,065,775 A 11/1991 Fagg
5,072,744 A 12/1991 Luke et al.
5,074,319 A 12/1991 White et al.
5,076,296 A 12/1991 Nystrom et al.
5,093,894 A 3/1992 Deevi et al.
5,095,921 A 3/1992 Losee et al.
5,097,850 A 3/1992 Braunshteyn et al.
5,099,862 A 3/1992 White et al.
5,099,864 A 3/1992 Young et al.
5,103,842 A 4/1992 Strang et al.
5,121,757 A 6/1992 White et al.
5,129,409 A 7/1992 White et al.
5,131,415 A 7/1992 Munoz et al.
5,143,097 A 9/1992 Sohn et al.
5,144,962 A 9/1992 Counts et al.
5,146,934 A 9/1992 Deevi et al.
5,159,940 A 11/1992 Hayward et al.
5,159,942 A 11/1992 Brinkley et al.
5,179,966 A 1/1993 Losee et al.
5,211,684 A 5/1993 Shannon et al.
5,220,930 A 6/1993 Gentry
5,224,498 A 7/1993 Deevi et al.
5,228,460 A 7/1993 Sprinkel et al.
5,230,354 A 7/1993 Smith et al.
5,235,992 A 8/1993 Sensabaugh
5,243,999 A 9/1993 Smith
5,246,018 A 9/1993 Deevi et al.
5,249,586 A 10/1993 Morgan et al.
5,261,424 A 11/1993 Sprinkel, Jr.
5,269,327 A * 12/1993 Counts .................... A24F 40/30 131/194
5,285,798 A 2/1994 Banerjee et al.
5,293,883 A 3/1994 Edwards
5,301,694 A 4/1994 Raymond
5,303,720 A 4/1994 Banerjee et al.
5,318,050 A 6/1994 Gonzalez-Parra et al.
5,322,075 A 6/1994 Deevi et al.
5,322,076 A 6/1994 Brinkley et al.
5,339,838 A 8/1994 Young et al.
5,345,951 A 9/1994 Serrano et al.
5,353,813 A 10/1994 Deevi et al.
5,357,984 A 10/1994 Farrier et al.
5,360,023 A 11/1994 Blakley et al.
5,369,723 A 11/1994 Counts et al.
5,372,148 A 12/1994 McCafferty et al.
5,377,698 A 1/1995 Litzinger et al.
5,388,574 A 2/1995 Ingebrethsen et al.
5,388,594 A * 2/1995 Counts .................. A24F 40/485 131/194
5,408,574 A 4/1995 Deevi et al.
5,435,325 A 7/1995 Clapp et al.
5,445,169 A 8/1995 Brinkley et al.
5,468,266 A 11/1995 Bensalem et al.
5,468,936 A 11/1995 Deevi et al.
5,479,948 A 1/1996 Counts et al.
5,498,850 A 3/1996 Das

(56) References Cited

U.S. PATENT DOCUMENTS

| | | | | |
|---|---|---|---|---|
| 5,498,855 | A | 3/1996 | Deevi et al. | |
| 5,499,636 | A | 3/1996 | Baggett, Jr. et al. | |
| 5,501,237 | A | 3/1996 | Young et al. | |
| 5,505,214 | A | 4/1996 | Collins et al. | |
| 5,515,842 | A | 5/1996 | Ramseyer et al. | |
| 5,530,225 | A * | 6/1996 | Hajaligol | A24F 40/46 131/194 |
| 5,551,450 | A | 9/1996 | Hemsley | |
| 5,551,451 | A | 9/1996 | Riggs et al. | |
| 5,564,442 | A | 10/1996 | MacDonald et al. | |
| 5,573,692 | A | 11/1996 | Das et al. | |
| 5,591,368 | A * | 1/1997 | Fleischhauer | A24F 40/46 131/194 |
| 5,593,792 | A | 1/1997 | Farrier et al. | |
| 5,595,577 | A | 1/1997 | Bensalem et al. | |
| 5,596,706 | A | 1/1997 | Sikk et al. | |
| 5,611,360 | A | 3/1997 | Tang | |
| 5,613,504 | A | 3/1997 | Collins et al. | |
| 5,613,505 | A | 3/1997 | Campbell et al. | |
| 5,649,552 | A | 7/1997 | Cho et al. | |
| 5,649,554 | A | 7/1997 | Sprinkel et al. | |
| 5,659,656 | A | 8/1997 | Das | |
| 5,665,262 | A | 9/1997 | Hajaligol et al. | |
| 5,666,976 | A | 9/1997 | Adams et al. | |
| 5,666,977 | A | 9/1997 | Higgins et al. | |
| 5,666,978 | A | 9/1997 | Counts et al. | |
| 5,687,746 | A | 11/1997 | Rose et al. | |
| 5,692,291 | A * | 12/1997 | Deevi | A24D 1/20 338/319 |
| 5,692,525 | A | 12/1997 | Counts et al. | |
| 5,692,526 | A | 12/1997 | Adams et al. | |
| 5,708,258 | A | 1/1998 | Counts et al. | |
| 5,711,320 | A | 1/1998 | Martin | |
| 5,714,738 | A * | 2/1998 | Hauschulz | F16L 53/35 219/535 |
| 5,726,421 | A | 3/1998 | Fleischhauer et al. | |
| 5,727,571 | A | 3/1998 | Meiring et al. | |
| 5,730,158 | A | 3/1998 | Collins et al. | |
| 5,750,964 | A | 5/1998 | Counts et al. | |
| 5,799,663 | A | 9/1998 | Gross et al. | |
| 5,816,263 | A | 10/1998 | Counts et al. | |
| 5,819,756 | A | 10/1998 | Mielordt | |
| 5,829,453 | A | 11/1998 | White et al. | |
| 5,865,185 | A | 2/1999 | Collins et al. | |
| 5,865,186 | A | 2/1999 | Volsey, II | |
| 5,878,752 | A | 3/1999 | Adams et al. | |
| 5,880,439 | A | 3/1999 | Deevi et al. | |
| 5,894,841 | A | 4/1999 | Voges | |
| 5,915,387 | A | 6/1999 | Baggett, Jr. et al. | |
| 5,934,289 | A | 8/1999 | Watkins et al. | |
| 5,954,979 | A | 9/1999 | Counts et al. | |
| 5,967,148 | A | 10/1999 | Harris et al. | |
| 6,026,820 | A | 2/2000 | Baggett, Jr. et al. | |
| 6,033,623 | A | 3/2000 | Deevi et al. | |
| 6,040,560 | A | 3/2000 | Fleischhauer et al. | |
| 6,053,176 | A | 4/2000 | Adams et al. | |
| 6,087,639 | A * | 7/2000 | Engelke | H05B 3/06 174/148 |
| 6,089,857 | A | 7/2000 | Matsuura et al. | |
| 6,095,153 | A | 8/2000 | Kessler et al. | |
| 6,116,247 | A | 9/2000 | Banyasz et al. | |
| 6,119,700 | A | 9/2000 | Fleischhauer et al. | |
| 6,125,853 | A | 10/2000 | Susa et al. | |
| 6,125,855 | A | 10/2000 | Nevett et al. | |
| 6,125,866 | A | 10/2000 | Nichols et al. | |
| 6,155,268 | A | 12/2000 | Takeuchi | |
| 6,164,287 | A | 12/2000 | White | |
| 6,182,670 | B1 | 2/2001 | White | |
| 6,196,218 | B1 | 3/2001 | Voges | |
| 6,196,219 | B1 | 3/2001 | Hess et al. | |
| 6,216,706 | B1 | 4/2001 | Kumar et al. | |
| 6,289,898 | B1 | 9/2001 | Fournier et al. | |
| 6,349,728 | B1 | 2/2002 | Pham | |
| 6,357,671 | B1 | 3/2002 | Cewers | |
| 6,418,938 | B1 | 7/2002 | Fleischhauer et al. | |
| 6,446,426 | B1 | 9/2002 | Sweeney et al. | |
| 6,532,965 | B1 | 3/2003 | Abhulimen et al. | |
| 6,570,140 | B2 * | 5/2003 | Karacsony | G02B 6/2558 219/535 |
| 6,598,607 | B2 | 7/2003 | Adiga et al. | |
| 6,601,776 | B1 | 8/2003 | Oljaca et al. | |
| 6,615,840 | B1 | 9/2003 | Fournier et al. | |
| 6,688,313 | B2 | 2/2004 | Wrenn et al. | |
| 6,701,936 | B2 | 3/2004 | Shafer et al. | |
| 6,715,494 | B1 | 4/2004 | McCoy | |
| 6,730,832 | B1 | 5/2004 | Dominguez et al. | |
| 6,772,756 | B2 | 8/2004 | Shayan | |
| 6,803,545 | B2 | 10/2004 | Blake et al. | |
| 6,803,550 | B2 | 10/2004 | Sharpe et al. | |
| 6,810,883 | B2 | 11/2004 | Felter et al. | |
| 6,854,461 | B2 | 2/2005 | Nichols | |
| 6,854,470 | B1 | 2/2005 | Pu | |
| 6,994,096 | B2 | 2/2006 | Rostami et al. | |
| 7,011,096 | B2 | 3/2006 | Li et al. | |
| 7,017,585 | B2 | 3/2006 | Li et al. | |
| 7,025,066 | B2 | 4/2006 | Lawson et al. | |
| 7,117,867 | B2 * | 10/2006 | Cox | A24F 40/60 128/200.14 |
| 7,163,015 | B2 | 1/2007 | Moffitt | |
| 7,173,222 | B2 | 2/2007 | Cox et al. | |
| 7,185,659 | B2 | 3/2007 | Sharpe et al. | |
| 7,234,470 | B2 | 6/2007 | Yang | |
| 7,290,549 | B2 | 11/2007 | Banerjee et al. | |
| 7,293,565 | B2 | 11/2007 | Griffin et al. | |
| 7,392,809 | B2 | 7/2008 | Larson et al. | |
| 7,513,253 | B2 | 4/2009 | Kobayashi et al. | |
| 7,647,932 | B2 | 1/2010 | Cantrell et al. | |
| 7,690,385 | B2 | 4/2010 | Moffitt | |
| 7,692,123 | B2 | 4/2010 | Baba et al. | |
| 7,726,320 | B2 | 6/2010 | Robinson et al. | |
| 7,775,459 | B2 | 8/2010 | Martens, III et al. | |
| 7,810,505 | B2 | 10/2010 | Yang | |
| 7,832,410 | B2 | 11/2010 | Hon | |
| 7,845,359 | B2 | 12/2010 | Montaser | |
| 7,878,209 | B2 | 2/2011 | Newbery et al. | |
| 7,896,006 | B2 | 3/2011 | Hamano et al. | |
| 8,066,010 | B2 | 11/2011 | Newbery et al. | |
| 8,079,371 | B2 | 12/2011 | Robinson et al. | |
| 8,127,772 | B2 | 3/2012 | Montaser | |
| 8,156,944 | B2 | 4/2012 | Han | |
| 8,314,591 | B2 | 11/2012 | Terry et al. | |
| 8,365,742 | B2 | 2/2013 | Hon | |
| 8,375,957 | B2 | 2/2013 | Hon | |
| 8,393,331 | B2 | 3/2013 | Hon | |
| 8,402,976 | B2 | 3/2013 | Fernando et al. | |
| D685,522 | S | 7/2013 | Potter et al. | |
| 8,499,766 | B1 | 8/2013 | Newton | |
| 8,528,569 | B1 | 9/2013 | Newton | |
| 8,550,069 | B2 | 10/2013 | Alelov | |
| 8,931,293 | B2 * | 1/2015 | Shei | A47J 36/2483 219/385 |
| 10,143,239 | B2 * | 12/2018 | Gavrielov | H05B 3/44 |
| 2002/0146242 | A1 | 10/2002 | Vieira | |
| 2003/0131859 | A1 | 7/2003 | Li et al. | |
| 2003/0226837 | A1 | 12/2003 | Blake et al. | |
| 2004/0020500 | A1 | 2/2004 | Wrenn et al. | |
| 2004/0118401 | A1 | 6/2004 | Smith et al. | |
| 2004/0129280 | A1 | 7/2004 | Woodson et al. | |
| 2004/0149296 | A1 | 8/2004 | Rostami et al. | |
| 2004/0200488 | A1 | 10/2004 | Felter et al. | |
| 2004/0226568 | A1 | 11/2004 | Takeuchi et al. | |
| 2004/0255965 | A1 | 12/2004 | Perfetti et al. | |
| 2005/0016549 | A1 | 1/2005 | Banerjee et al. | |
| 2005/0016550 | A1 | 1/2005 | Katase | |
| 2005/0063686 | A1 * | 3/2005 | Whittle | A61M 11/041 392/390 |
| 2005/0066986 | A1 | 3/2005 | Nestor et al. | |
| 2005/0172976 | A1 | 8/2005 | Newman et al. | |
| 2005/0274390 | A1 | 12/2005 | Banerjee et al. | |
| 2006/0016453 | A1 | 1/2006 | Kim | |
| 2006/0070633 | A1 | 4/2006 | Rostami et al. | |
| 2006/0162733 | A1 | 7/2006 | McGrath et al. | |
| 2006/0185687 | A1 | 8/2006 | Hearn et al. | |

(56) References Cited

U.S. PATENT DOCUMENTS

| | | | | |
|---|---|---|---|---|
| 2006/0196518 | A1 | 9/2006 | Hon | |
| 2007/0074734 | A1 | 4/2007 | Braunshteyn et al. | |
| 2007/0102013 | A1 | 5/2007 | Adams et al. | |
| 2007/0215167 | A1 | 9/2007 | Crooks et al. | |
| 2007/0283972 | A1 | 12/2007 | Monsees et al. | |
| 2008/0085103 | A1 | 4/2008 | Beland et al. | |
| 2008/0092912 | A1 | 4/2008 | Robinson et al. | |
| 2008/0149118 | A1 | 6/2008 | Oglesby et al. | |
| 2008/0245377 | A1 | 10/2008 | Marshall et al. | |
| 2008/0257367 | A1 | 10/2008 | Paterno et al. | |
| 2008/0276947 | A1 | 11/2008 | Martzel | |
| 2008/0302374 | A1 | 12/2008 | Wengert et al. | |
| 2009/0065010 | A1 | 3/2009 | Shands | |
| 2009/0095311 | A1* | 4/2009 | Han | H01M 10/46 131/194 |
| 2009/0095312 | A1 | 4/2009 | Herbrich et al. | |
| 2009/0126745 | A1 | 5/2009 | Hon | |
| 2009/0188490 | A1 | 7/2009 | Hon | |
| 2009/0230117 | A1 | 9/2009 | Fernando et al. | |
| 2009/0260641 | A1 | 10/2009 | Monsees et al. | |
| 2009/0260642 | A1 | 10/2009 | Monsees et al. | |
| 2009/0272379 | A1* | 11/2009 | Thorens | A61M 15/06 219/535 |
| 2009/0283103 | A1 | 11/2009 | Nielsen et al. | |
| 2009/0293892 | A1 | 12/2009 | Williams et al. | |
| 2009/0320863 | A1 | 12/2009 | Fernando et al. | |
| 2009/0324206 | A1 | 12/2009 | Young et al. | |
| 2010/0006113 | A1 | 1/2010 | Urtsev et al. | |
| 2010/0024834 | A1 | 2/2010 | Oglesby et al. | |
| 2010/0043809 | A1 | 2/2010 | Magnon | |
| 2010/0059070 | A1 | 3/2010 | Potter et al. | |
| 2010/0059073 | A1 | 3/2010 | Hoffmann et al. | |
| 2010/0065075 | A1 | 3/2010 | Banerjee et al. | |
| 2010/0083959 | A1 | 4/2010 | Siller | |
| 2010/0163063 | A1 | 7/2010 | Fernando et al. | |
| 2010/0200006 | A1 | 8/2010 | Robinson et al. | |
| 2010/0229881 | A1 | 9/2010 | Hearn | |
| 2010/0242974 | A1 | 9/2010 | Pan | |
| 2010/0242976 | A1 | 9/2010 | Katayama et al. | |
| 2010/0258139 | A1 | 10/2010 | Onishi et al. | |
| 2010/0300467 | A1 | 12/2010 | Kuistilla et al. | |
| 2010/0307518 | A1 | 12/2010 | Wang | |
| 2010/0313901 | A1 | 12/2010 | Fernando et al. | |
| 2011/0005535 | A1 | 1/2011 | Xiu | |
| 2011/0011396 | A1* | 1/2011 | Fang | A61M 11/041 128/202.21 |
| 2011/0036363 | A1 | 2/2011 | Urtsev et al. | |
| 2011/0036365 | A1 | 2/2011 | Chong et al. | |
| 2011/0073121 | A1 | 3/2011 | Levin et al. | |
| 2011/0088707 | A1 | 4/2011 | Hajaligol | |
| 2011/0094523 | A1 | 4/2011 | Thorens et al. | |
| 2011/0120482 | A1 | 5/2011 | Brenneise | |
| 2011/0126848 | A1* | 6/2011 | Zuber | A24F 40/46 131/329 |
| 2011/0155153 | A1* | 6/2011 | Thorens | A24F 40/46 131/329 |
| 2011/0155718 | A1* | 6/2011 | Greim | H05B 3/46 219/539 |
| 2011/0162663 | A1 | 7/2011 | Bryman | |
| 2011/0168194 | A1 | 7/2011 | Hon | |
| 2011/0180082 | A1 | 7/2011 | Banerjee et al. | |
| 2011/0265806 | A1 | 11/2011 | Alarcon et al. | |
| 2011/0303231 | A1 | 12/2011 | Li et al. | |
| 2011/0309157 | A1 | 12/2011 | Yang et al. | |
| 2012/0042885 | A1 | 2/2012 | Stone et al. | |
| 2012/0060853 | A1 | 3/2012 | Robinson et al. | |
| 2012/0076714 | A1* | 3/2012 | Fahrenbruck | B01J 19/2415 423/342 |
| 2012/0111347 | A1 | 5/2012 | Hon | |
| 2012/0132643 | A1 | 5/2012 | Choi et al. | |
| 2012/0227752 | A1 | 9/2012 | Alelov | |
| 2012/0231464 | A1 | 9/2012 | Yu et al. | |
| 2012/0260927 | A1* | 10/2012 | Liu | A24F 40/46 219/525 |
| 2012/0279512 | A1 | 11/2012 | Hon | |
| 2012/0318882 | A1 | 12/2012 | Abehasera | |
| 2013/0037041 | A1 | 2/2013 | Worm et al. | |
| 2013/0056013 | A1 | 3/2013 | Terry et al. | |
| 2013/0081625 | A1 | 4/2013 | Rustad et al. | |
| 2013/0081642 | A1 | 4/2013 | Safari | |
| 2013/0192619 | A1* | 8/2013 | Tucker | H05B 3/42 29/611 |
| 2013/0255702 | A1 | 10/2013 | Griffith, Jr. et al. | |
| 2013/0306084 | A1 | 11/2013 | Flick | |
| 2013/0319439 | A1 | 12/2013 | Gorelick et al. | |
| 2013/0340750 | A1 | 12/2013 | Thorens et al. | |
| 2013/0340775 | A1 | 12/2013 | Juster et al. | |
| 2014/0000638 | A1 | 1/2014 | Sebastian et al. | |
| 2014/0048086 | A1 | 2/2014 | Zhanghua | |
| 2014/0060554 | A1 | 3/2014 | Collett et al. | |
| 2014/0060555 | A1 | 3/2014 | Chang et al. | |
| 2014/0096781 | A1 | 4/2014 | Sears et al. | |
| 2014/0096782 | A1 | 4/2014 | Ampolini et al. | |
| 2014/0157583 | A1* | 6/2014 | Ward | A24F 40/70 29/729 |
| 2014/0209105 | A1* | 7/2014 | Sears | A24F 40/44 131/328 |
| 2014/0253144 | A1 | 9/2014 | Novak, III et al. | |
| 2014/0261408 | A1 | 9/2014 | DePiano et al. | |
| 2014/0261486 | A1 | 9/2014 | Potter et al. | |
| 2014/0261487 | A1 | 9/2014 | Chapman et al. | |
| 2014/0261495 | A1 | 9/2014 | Novak, III et al. | |
| 2014/0270727 | A1 | 9/2014 | Ampolini et al. | |
| 2014/0270730 | A1 | 9/2014 | DePiano et al. | |
| 2016/0066621 | A1* | 3/2016 | DePiano | A24F 40/46 392/404 |
| 2016/0174302 | A1* | 6/2016 | Lu | H05B 3/145 219/553 |
| 2018/0303164 | A1* | 10/2018 | DePiano | H05B 3/46 |

FOREIGN PATENT DOCUMENTS

| | | |
|---|---|---|
| CA | 2 752 255 | 8/2010 |
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| CN | 202 750 708 | 2/2013 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| EP | 1 996 037 | 4/2012 |
| EP | 2 468 116 | 6/2012 |
| EP | 1 993 388 | 8/2012 |
| EP | 2 754 359 | 7/2014 |
| GB | 1444461 | 7/1976 |
| GB | 2469850 | 11/2010 |
| WO | WO 1986/02528 | 5/1986 |
| WO | WO 1997/48293 | 12/1997 |
| WO | WO 02/37990 | 5/2002 |
| WO | WO 2003/034847 A1 | 5/2003 |
| WO | WO 2004/043175 | 5/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/091593 | 8/2010 |
| WO | WO 2010/118644 | 10/2010 |
| WO | WO 2010/140937 | 12/2010 |
| WO | WO 2011/010334 | 1/2011 |
| WO | WO 2011/081558 | 7/2011 |

(56) References Cited

FOREIGN PATENT DOCUMENTS

| | | |
|---|---|---|
| WO | WO 2012/072762 | 6/2012 |
| WO | WO 2012/100523 | 8/2012 |
| WO | WO 2013/089551 | 6/2013 |
| WO | WO 2014/088889 | 6/2014 |

OTHER PUBLICATIONS

Invitation to Pay Additional Fees and Partial International Search for corresponding International Application No. PCT/US2014/024697 mailed Sep. 23, 2014.

Cambridge Dictionary (accessed Feb. 1, 2023). https://dictionary.cambridge.org/ns/dictionary/english/planar.

* cited by examiner

HEATING ELEMENTS FORMED FROM A SHEET OF A MATERIAL AND INPUTS AND METHODS FOR THE PRODUCTION OF ATOMIZERS

CROSS-REFERENCE TO RELATED APPLICATIONS

The present application is a continuation of U.S. patent application Ser. No. 16/009,830 filed Jun. 15, 2018, which is a continuation of U.S. patent application Ser. No. 15/232,389 filed Aug. 9, 2016, which is a divisional of U.S. patent application Ser. No. 13/842,125 filed Mar. 15, 2013, the disclosures of which are incorporated herein by reference in their entirety.

FIELD OF THE DISCLOSURE

The present disclosure relates to heating elements for atomizers, and more particularly to heating elements formed from a sheet of a material. The heating elements may be configured to heat an aerosol precursor, which may be made or derived from tobacco or otherwise incorporate tobacco, to form an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. patent application Ser. No. 13/432,406, filed Mar. 28, 2012, U.S. patent application Ser. No. 13/536,438, filed Jun. 28, 2012, U.S. patent application Ser. No. 13/602,871, filed Sep. 4, 2012, and U.S. patent application Ser. No. 13/647,000, filed Oct. 8, 2012, which are incorporated herein by reference.

Certain tobacco products that have employed electrical energy to produce heat for smoke or aerosol formation, and in particular, certain products that have been referred to as electronic cigarette products, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; COHITA™ COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; GREEN SMOKE® by Green Smoke Inc. USA; GREENARETTE™ by Greenarette LLC; HALLIGAN™, HENDU™, JET™, MAXXQ™ PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC and VUSE® by R. J. Reynolds Vapor Company. Yet other electrically powered aerosol delivery devices, and in particular those devices that have been characterized as so-called electronic cigarettes, have been marketed under the tradenames BLU™; COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP® and SOUTH BEACH SMOKE™.

It would be desirable to provide a smoking article that employs heat produced by electrical energy to provide the sensations of cigarette, cigar, or pipe smoking, that does so without combusting tobacco to any significant degree, that does so without the need of a combustion heat source, and that does so without necessarily delivering considerable quantities of incomplete combustion and pyrolysis products. Thus, advances with respect to manufacturing electronic smoking articles would be desirable.

BRIEF SUMMARY OF THE DISCLOSURE

The present disclosure relates to aerosol delivery devices configured to produce aerosol. In one aspect an input for production of a plurality of atomizers is provided. The input may include a carrier defining a plurality of access windows spaced apart along a longitudinal axis of the carrier. The input may additionally include a plurality of heating elements that are coupled to the carrier and respectively received in the access windows. The carrier and the heating elements may be integrally formed from a sheet of a material.

In some embodiments the carrier may include a first side strip and a second side strip extending parallel to the longitudinal axis. A first end and a second end of each of the heating elements may be respectively coupled to one of the first side strip and the second side strip. At least one of the first side strip and the second side strip may define a plurality of apertures extending therethrough. The carrier may additionally include a plurality of connecting strips extending between the first side strip and the second side strip and separating the access windows. A first end and a second end of each of the heating elements may be respectively coupled to one of the connecting strips.

In some embodiments the heating elements may define a plurality of longitudinal axes and each of the heating elements may include a plurality of interconnected loops oriented transversely to the longitudinal axes and alternatingly disposed with respect thereto. The longitudinal axes of the heating elements may be coaxial with the longitudinal axis of the carrier. In an alternate embodiment the longitudinal axes of the heating elements may be perpendicular to the longitudinal axis of the carrier.

In an additional aspect, a heating element is provided. The heating element may include a first end, a second end, and a plurality of interconnected loops coupled to the first end and the second end. The interconnected loops may be oriented transversely to a longitudinal axis extending between the first end and the second end and alternatingly disposed with respect thereto. The first end, the second end, and the plurality of interconnected loops may be integrally formed from a sheet of a material.

In some embodiments the interconnected loops may be bent toward one another. A plurality of tips of the interconnected loops may be positioned adjacent one another and the interconnected loops may define a substantially cylindrical void extending parallel to the longitudinal axis. The first end and the second end may define a width that is greater than a width of a band of the material defining the interconnected loops.

In an additional aspect, a method of forming a plurality of atomizers is provided. The method may include providing a sheet of a material. Further, the method may include forming the sheet of the material into a carrier defining a plurality of access windows spaced apart along a longitudinal axis of the carrier. The method may additionally include forming the sheet of the material into a plurality of heating elements that are coupled to the carrier and respectively received in the access windows.

In some embodiments, forming the sheet of the material into the carrier may include forming a first side strip and a second side strip extending parallel to the longitudinal axis. Forming the sheet of the material into the carrier and forming the sheet of the material into the heating elements may include retaining a plurality of connections between a first end and a second end of the heating elements and the first side strip and the second side strip. Further, forming the sheet of the material into the carrier may include forming a plurality of apertures extending through at least one of the first side strip and the second side strip.

In some embodiments, forming the sheet of the material into the carrier may include forming a plurality of connecting strips extending between the first side strip and the second side strip and separating the access windows. Forming the sheet of the material into the carrier and forming the sheet of the material into the heating elements may include retaining a plurality of connections between a first end and a second end of each of the heating elements and the connecting strips. Further, forming the sheet of the material into the heating elements may include forming a plurality of interconnected loops oriented transversely to a plurality of longitudinal axes of the heating elements. Forming the sheet of the material into the heating elements may include forming the heating elements such that the longitudinal axes thereof are coaxial with the longitudinal axis of the carrier. Forming the sheet of the material into the heating elements may include forming the heating elements such that the longitudinal axes thereof are perpendicular to the longitudinal axis of the carrier.

In some embodiments the method may additionally include providing a liquid transport element. The method may also include bending the interconnected loops about the liquid transport element such that a plurality of tips of the interconnected loops are positioned adjacent one another and the interconnected loops define a substantially cylindrical void extending parallel to the longitudinal axis of the carrier in which the liquid transport element is received. Additionally, the method may include decoupling the heating elements from the carrier. Further, the method may include connecting a first end and a second end of each of the heating elements to a plurality of heater terminals.

BRIEF DESCRIPTION OF THE FIGURES

Figure 1:
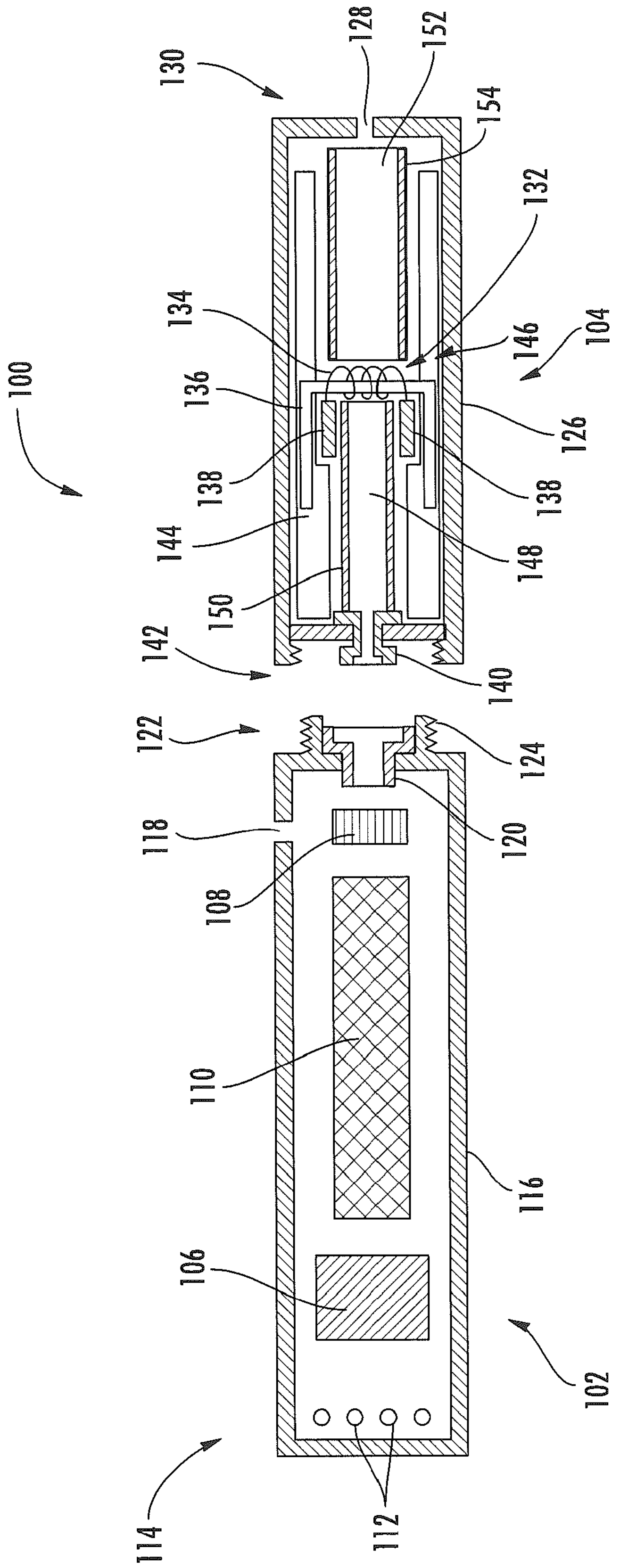
Figure 2:
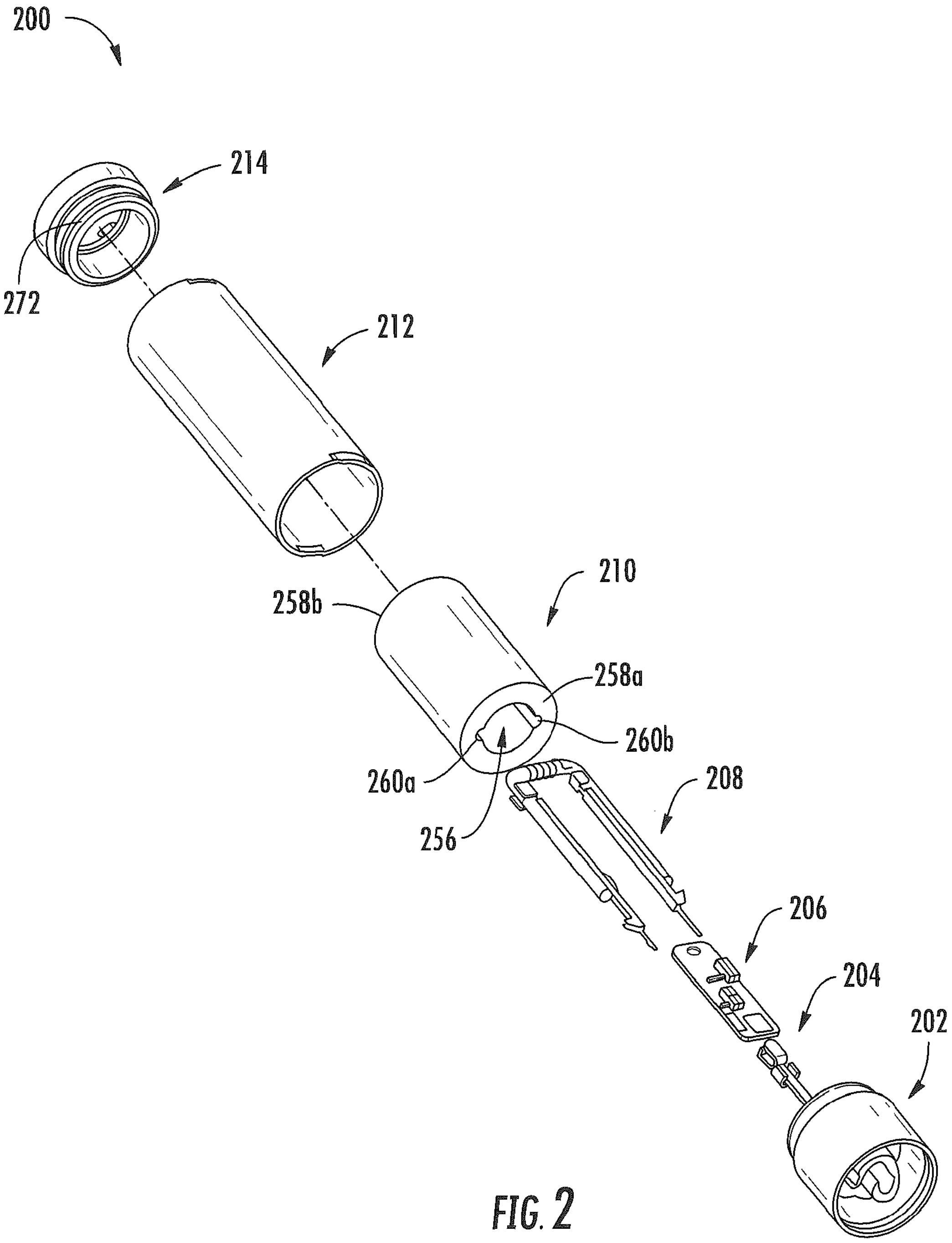
Figure 3:
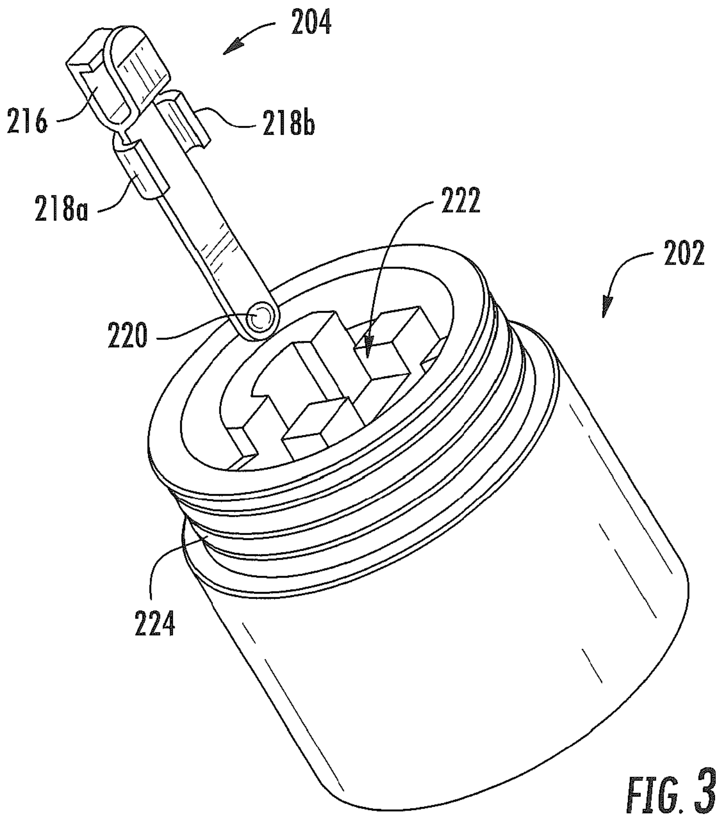
Figure 4:
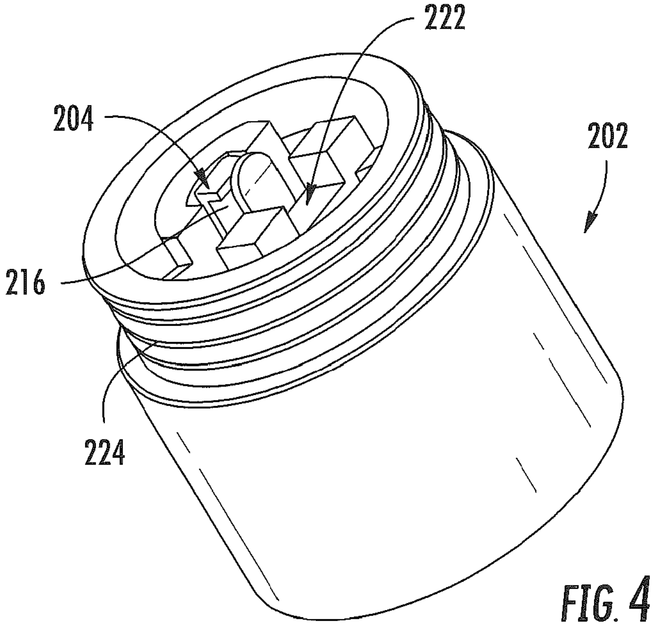
Figure 5:
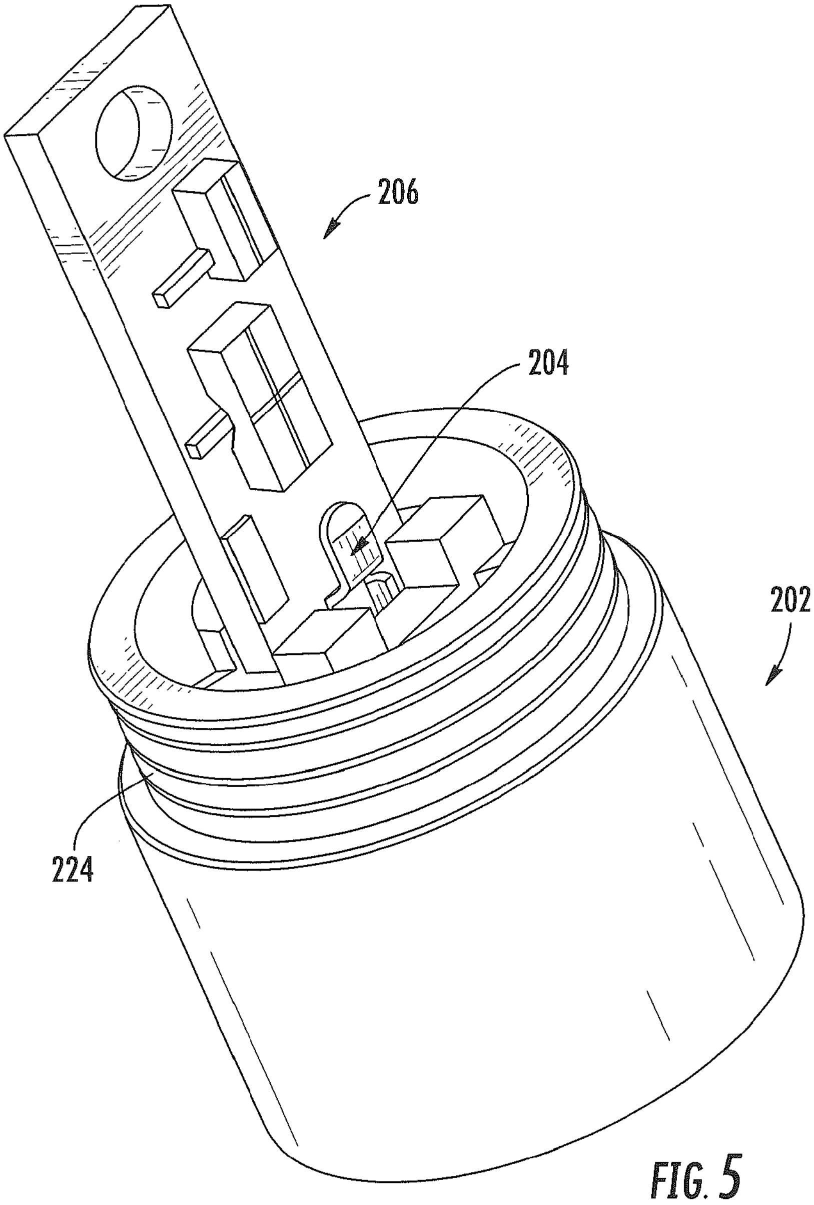
Figure 6:
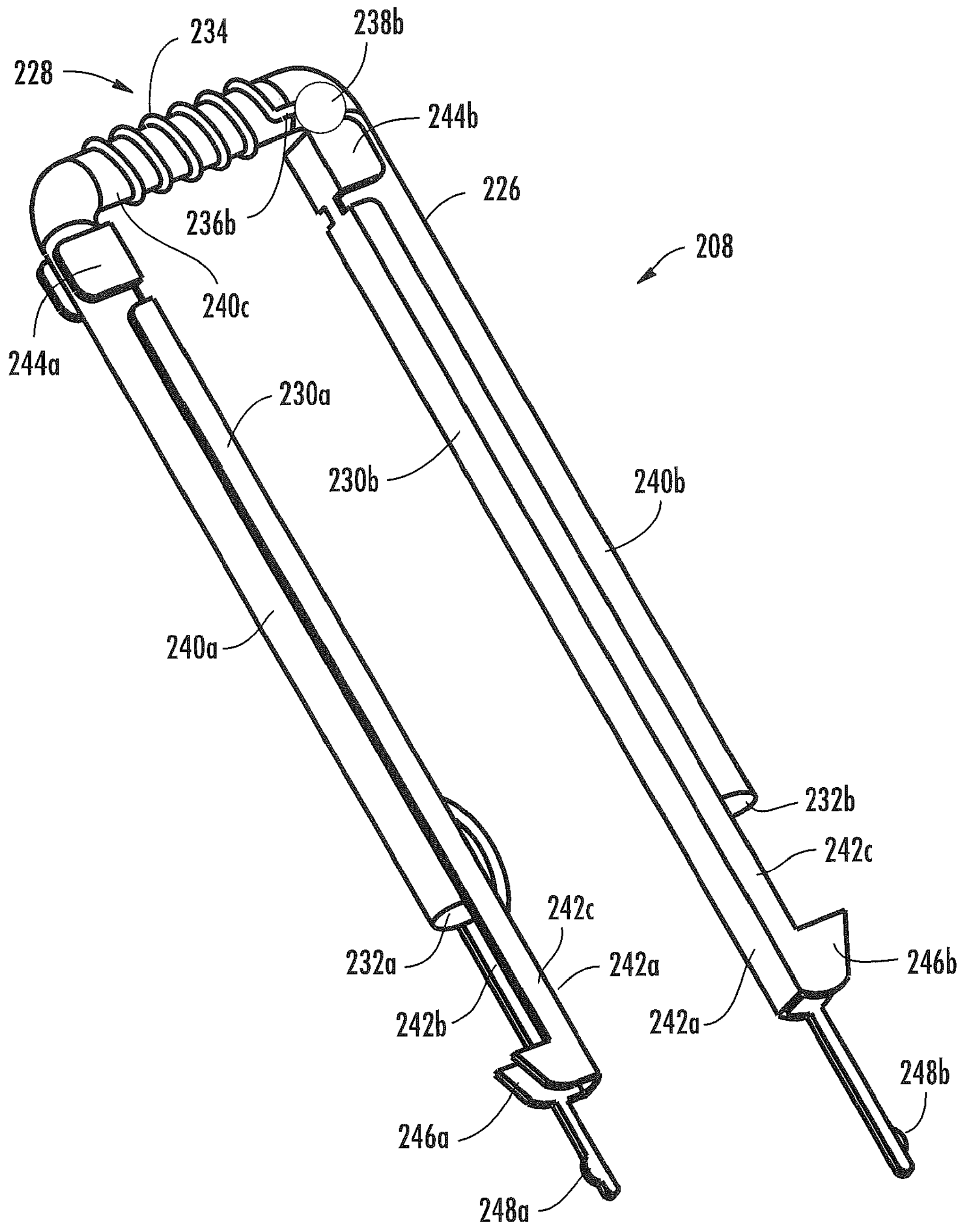
Figure 7:
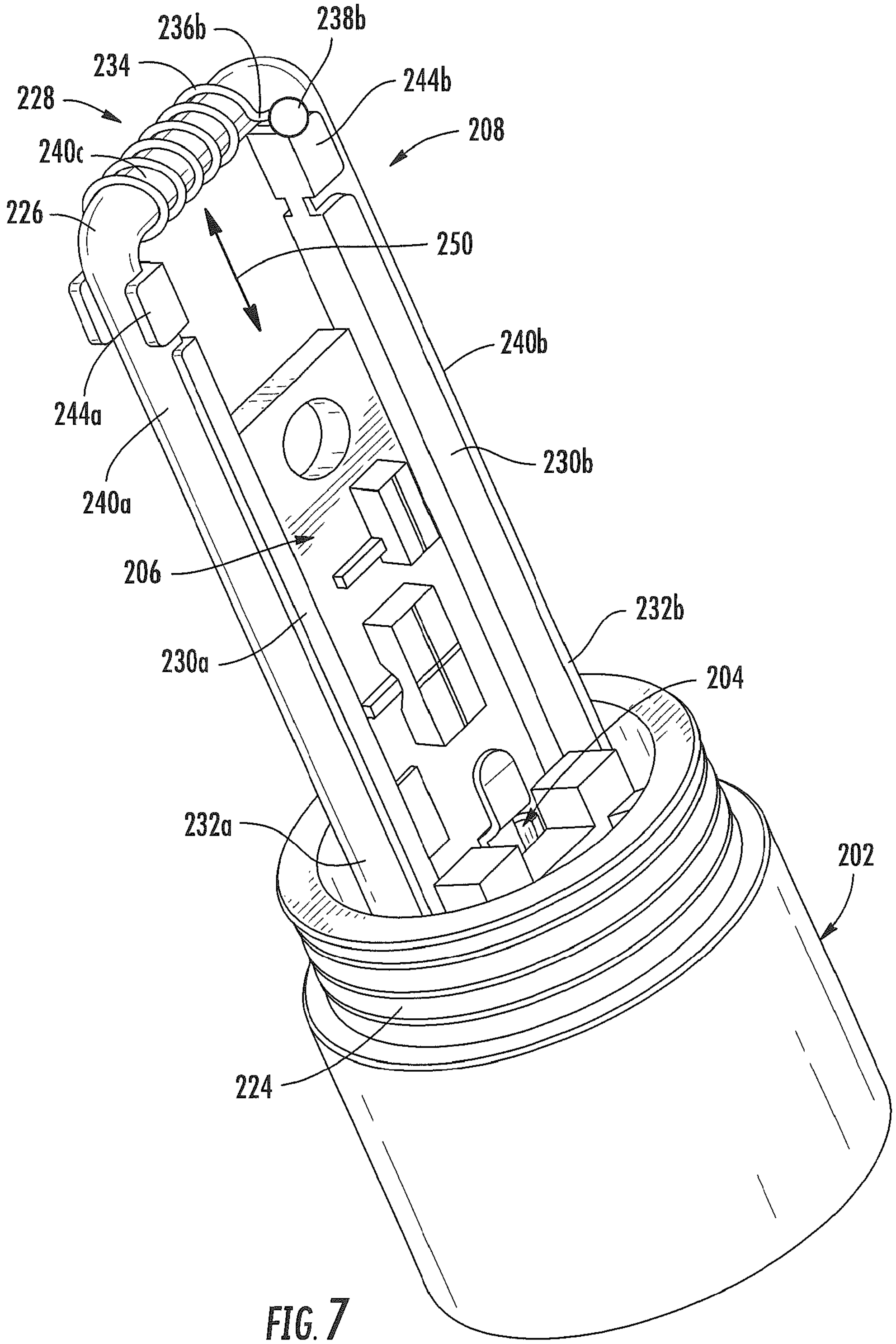
Figure 8:
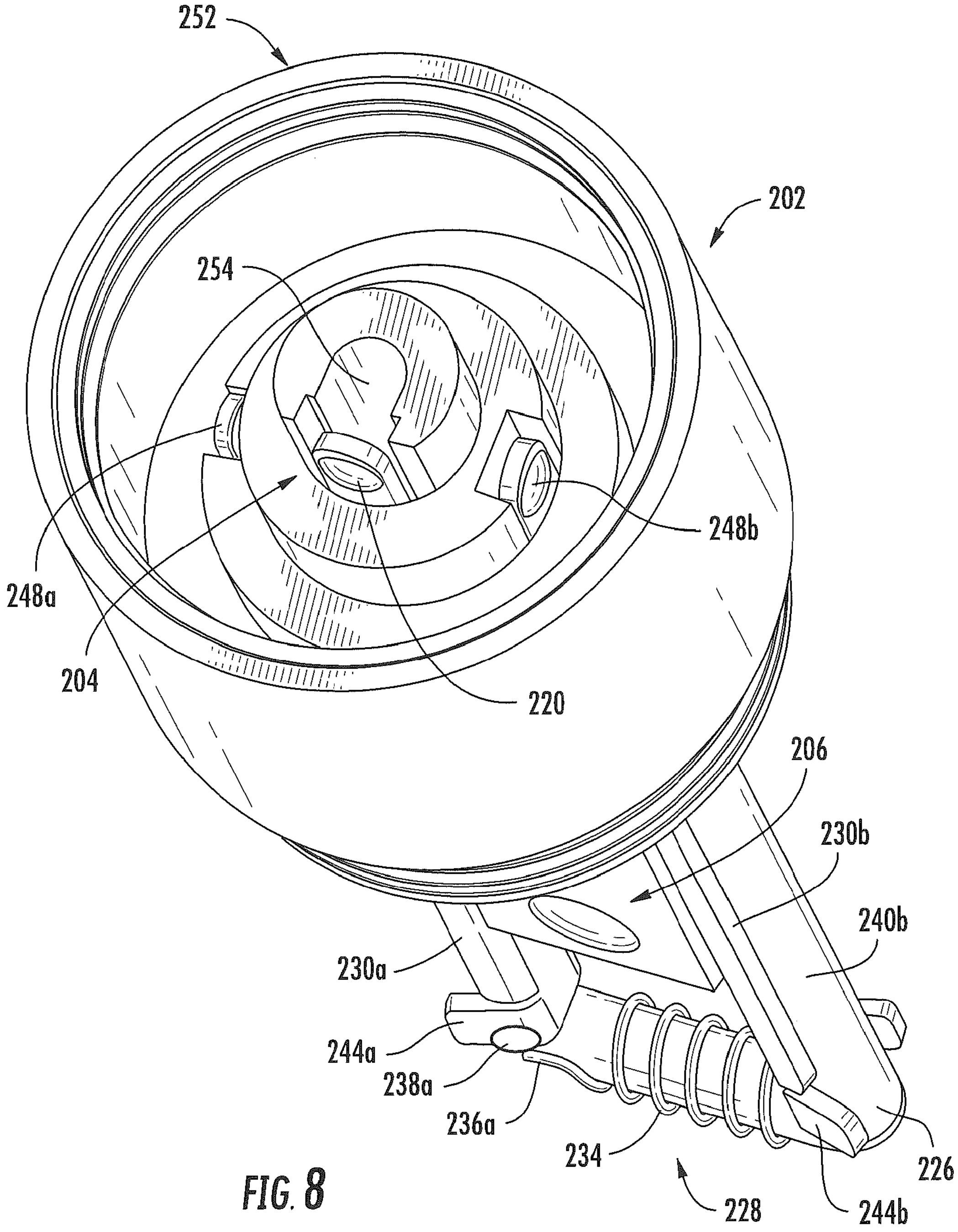
Figure 9:
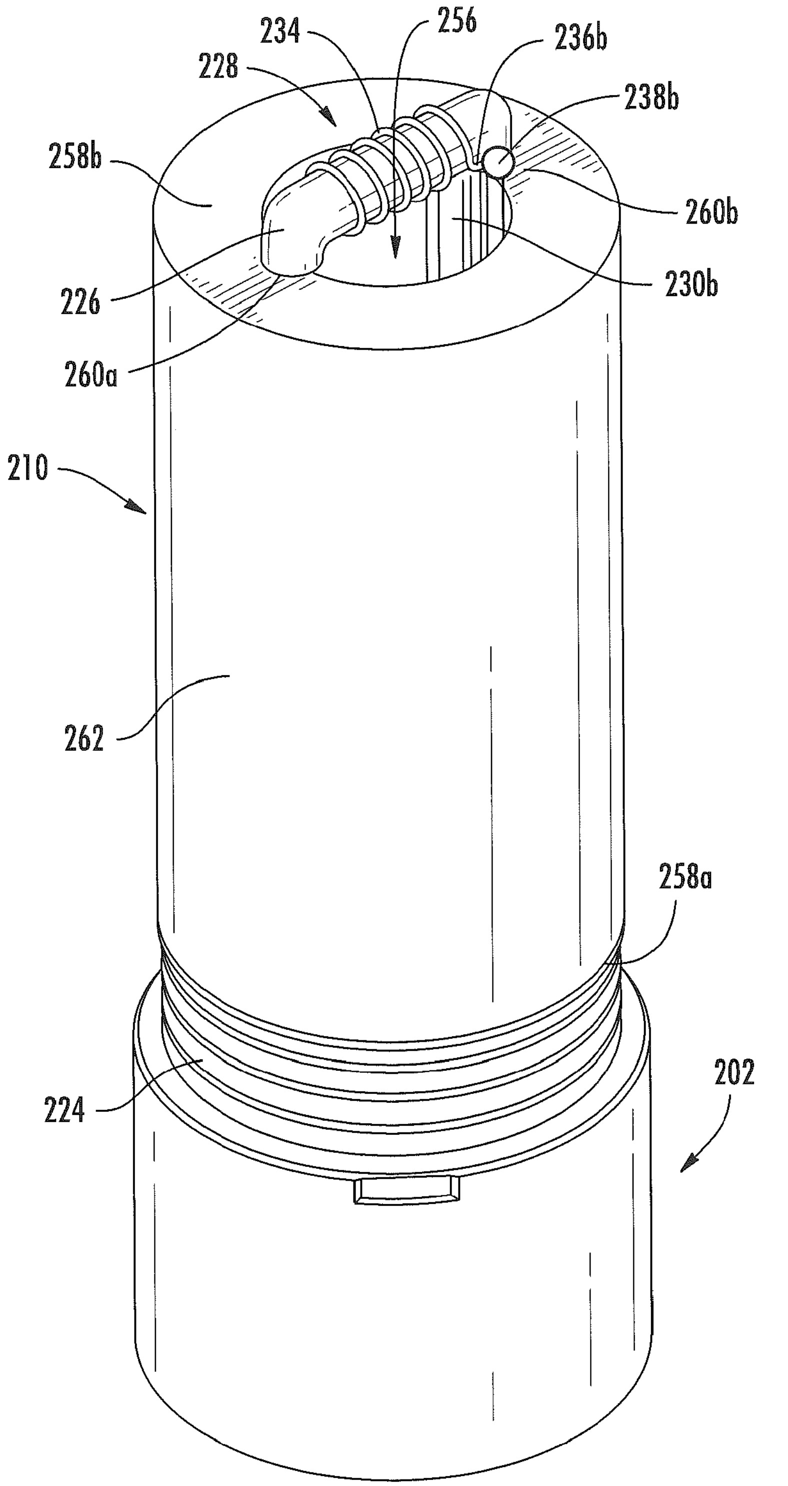
Figure 10:
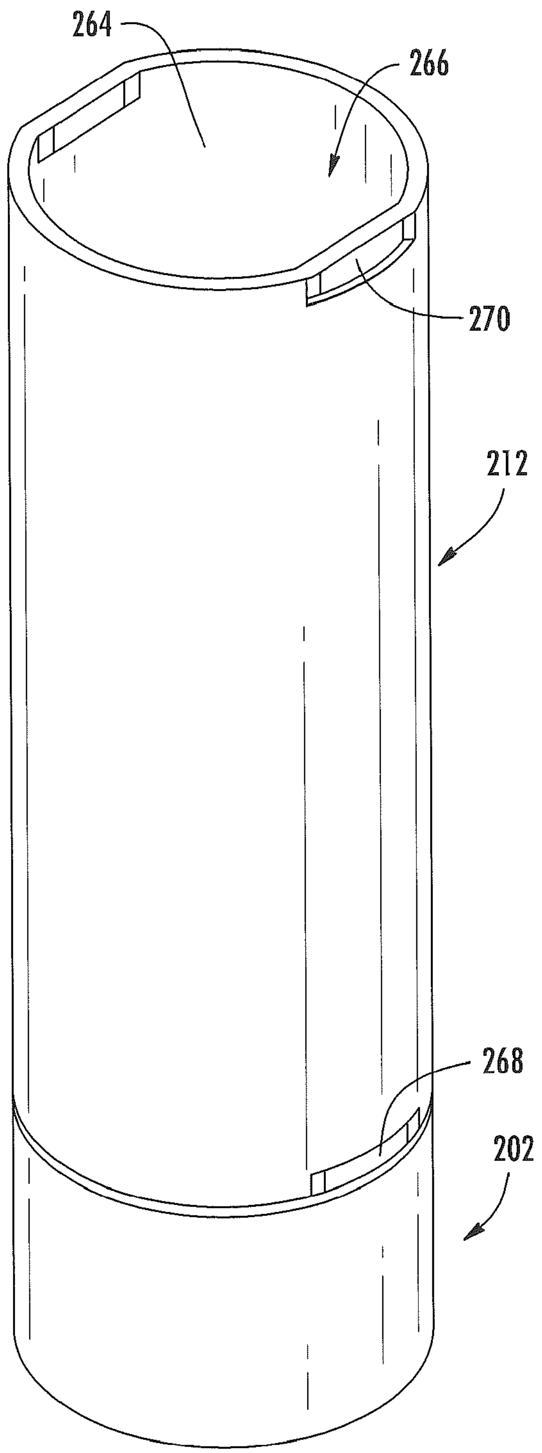
Figure 11:
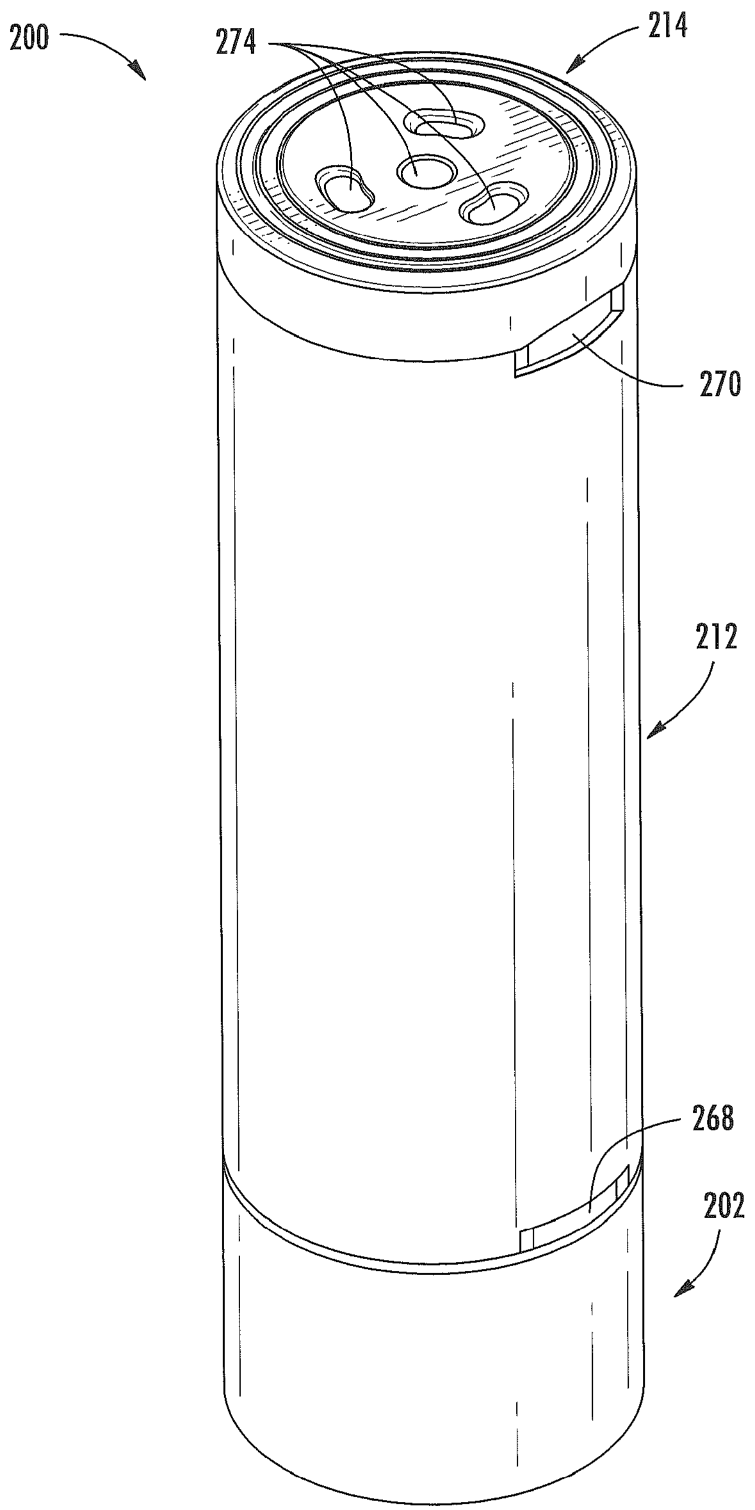
Figure 12:
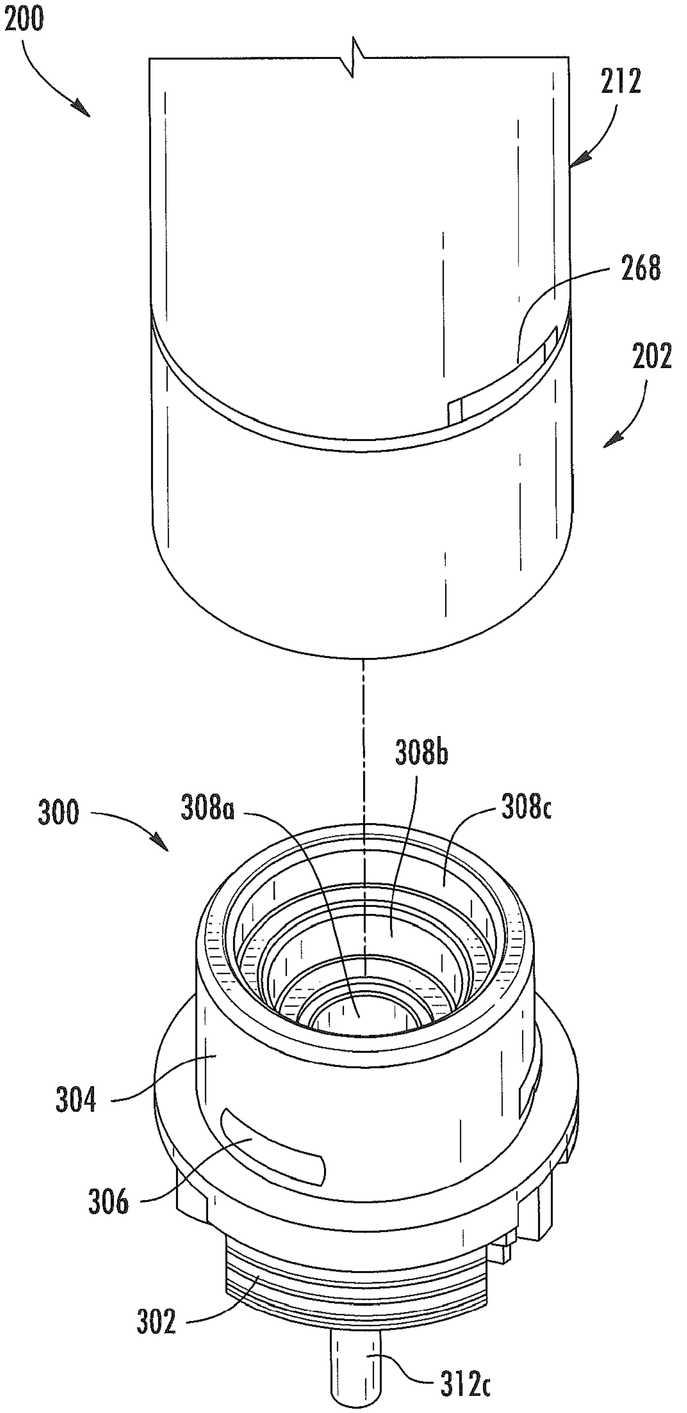
Figure 13:
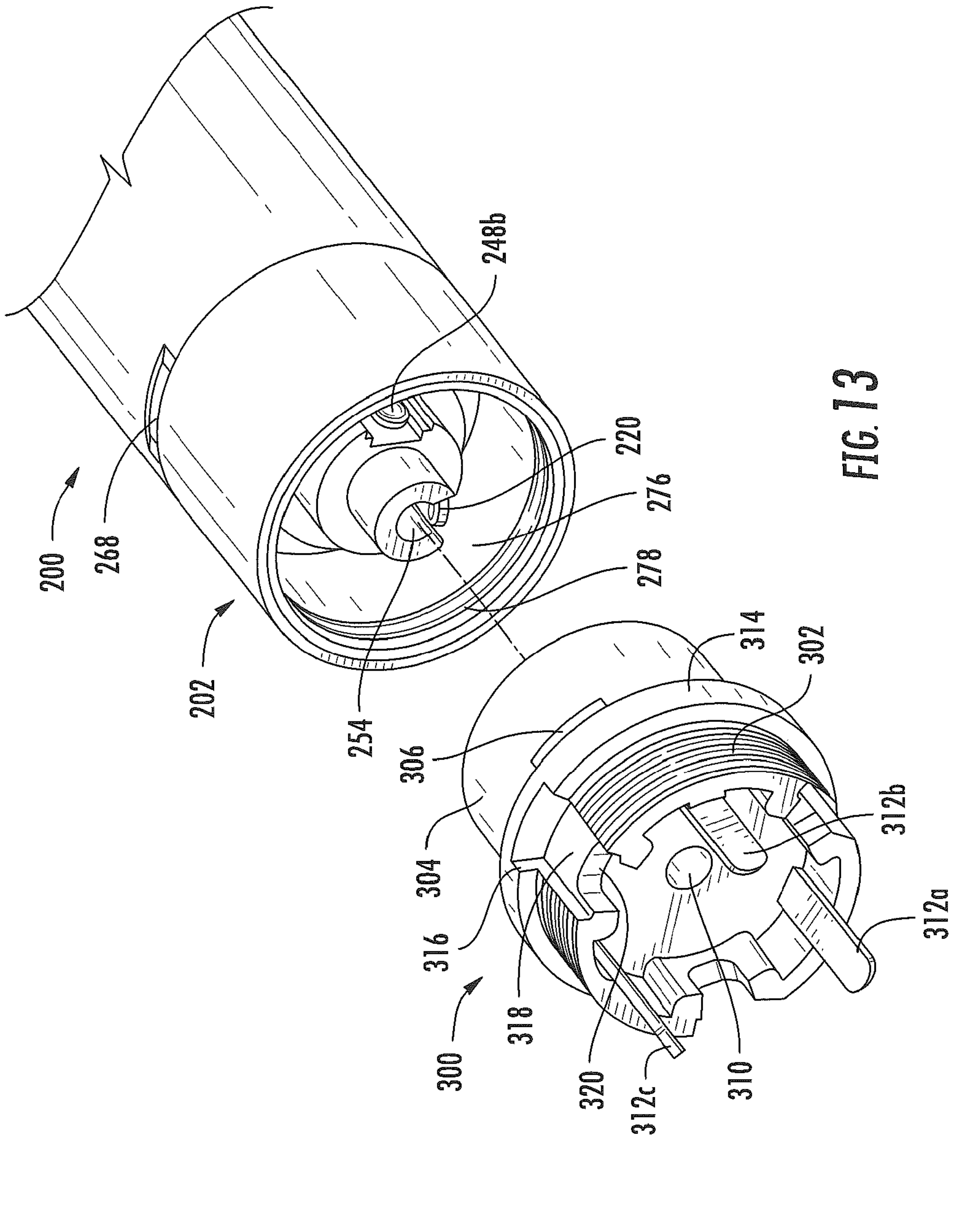
Figure 14:
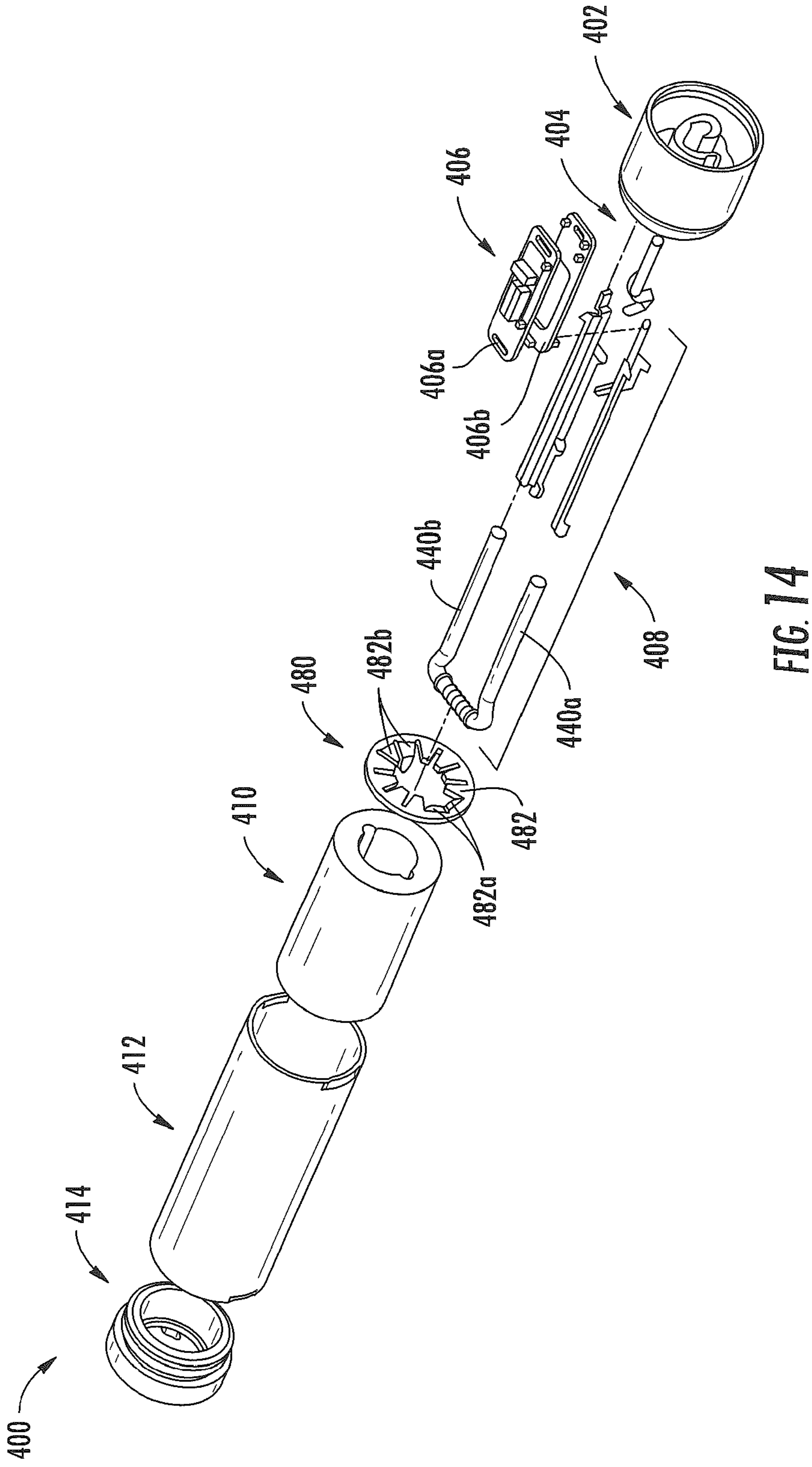
Figure 15:
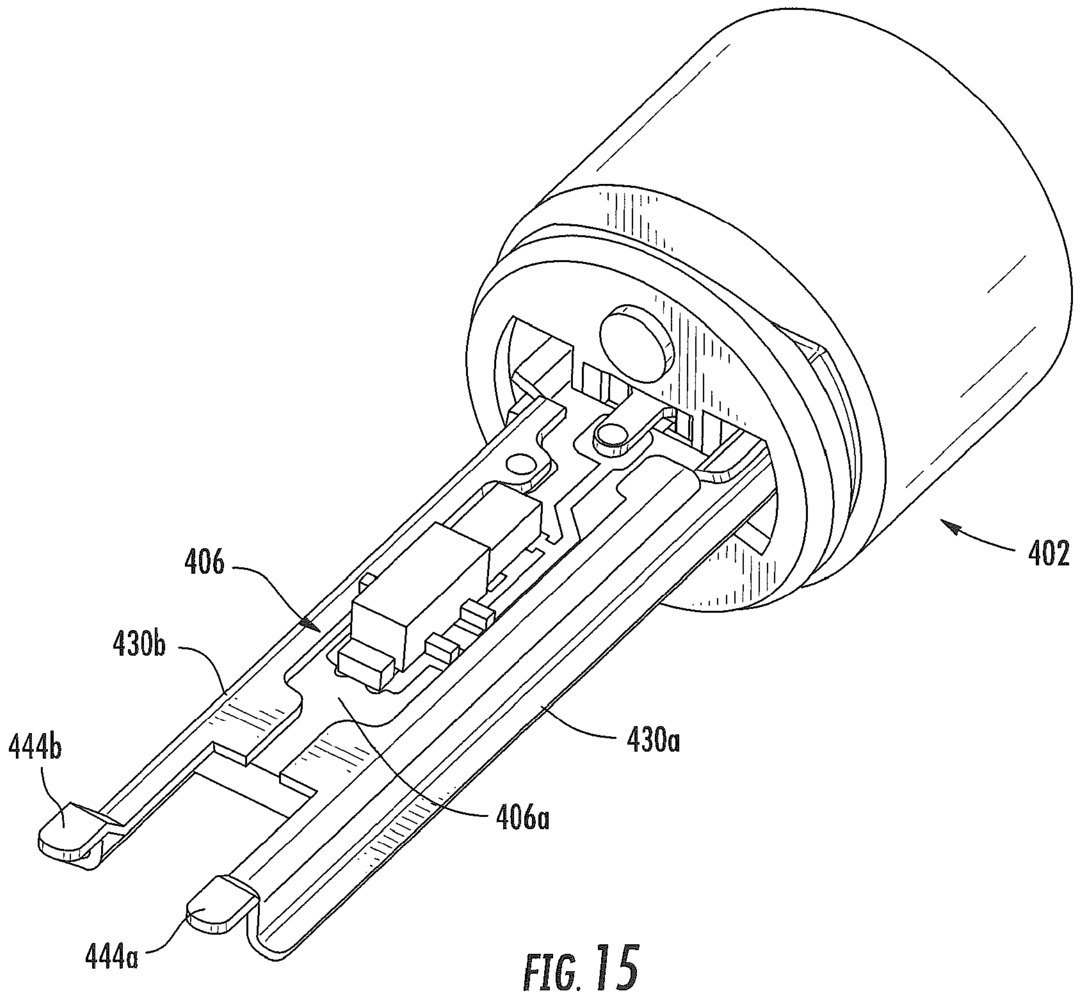
Figure 16:
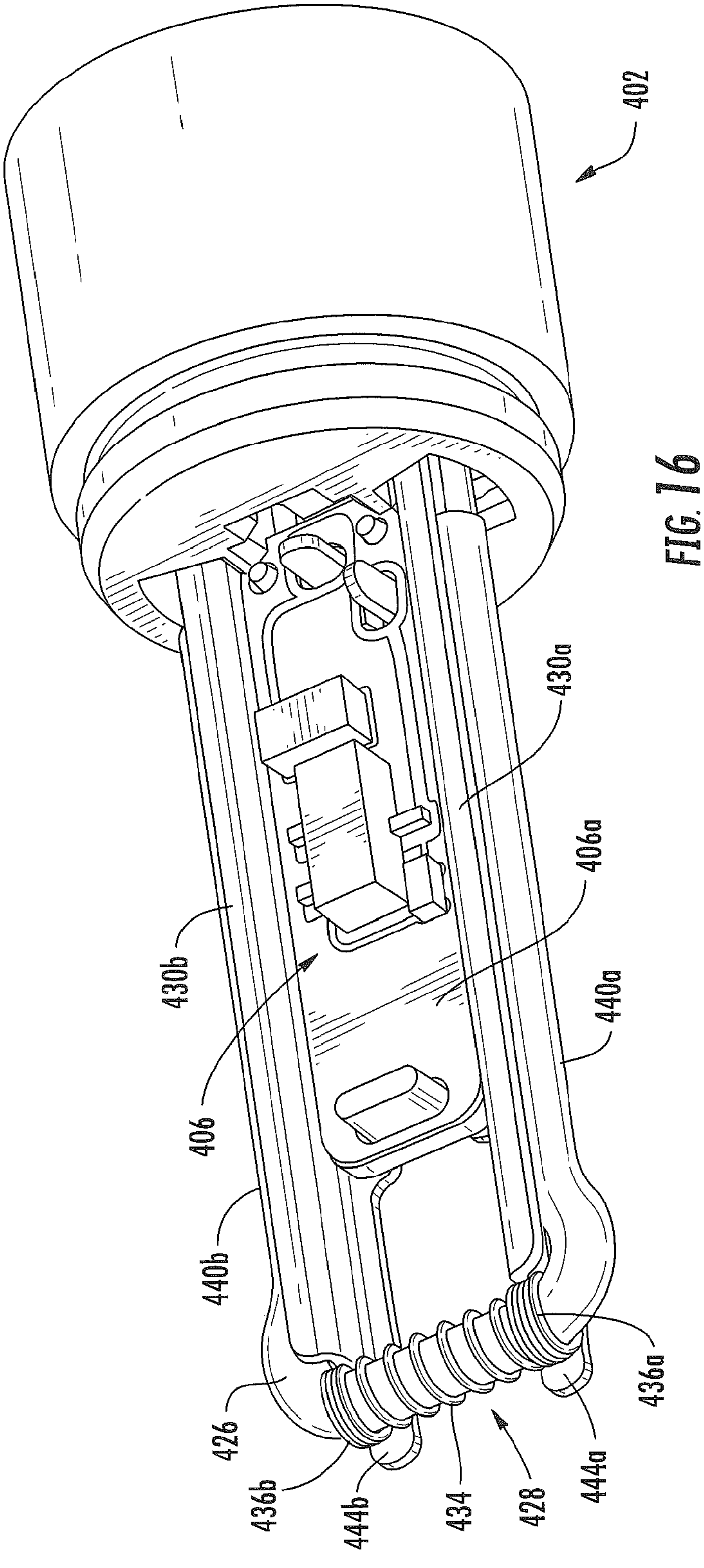
Figure 17:
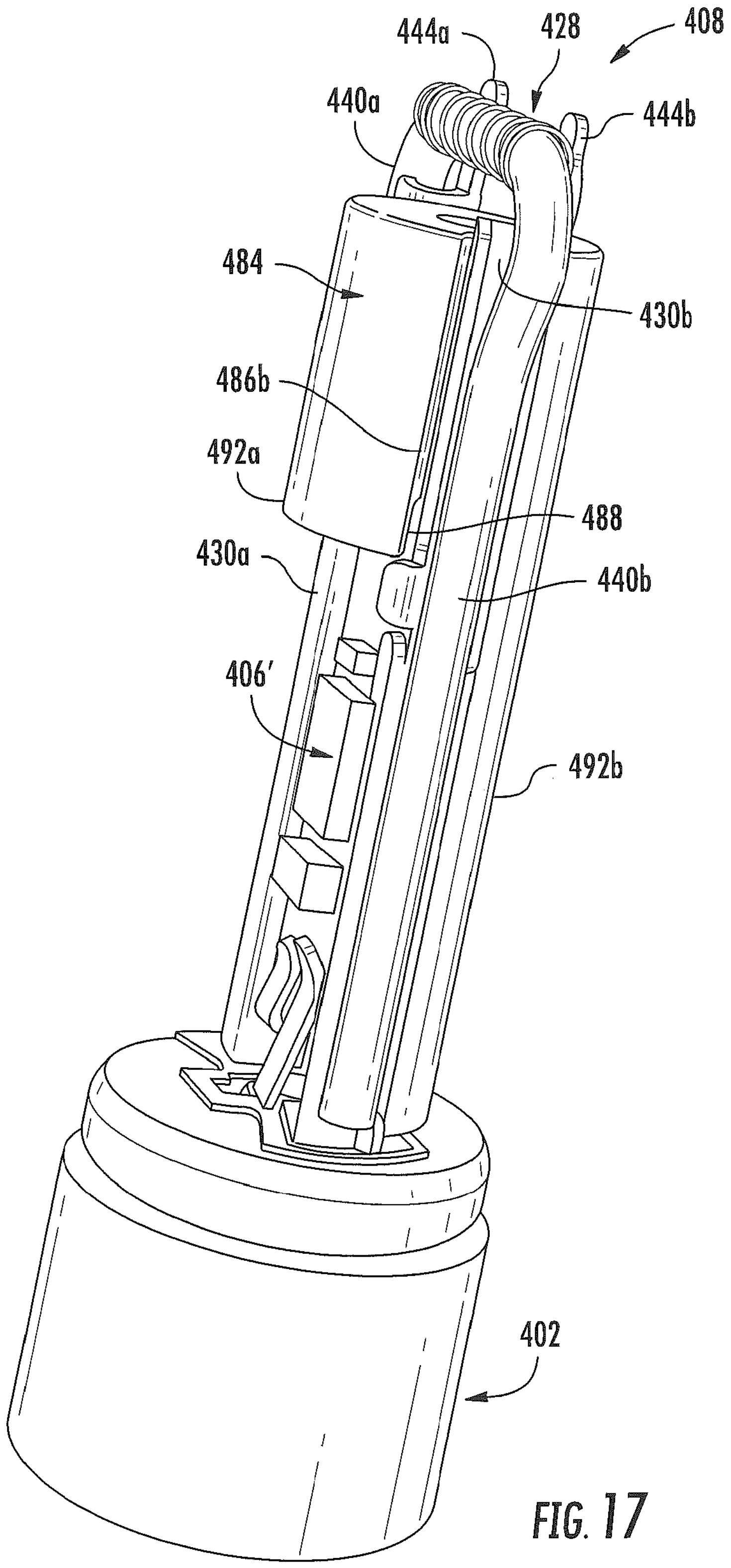
Figure 18:
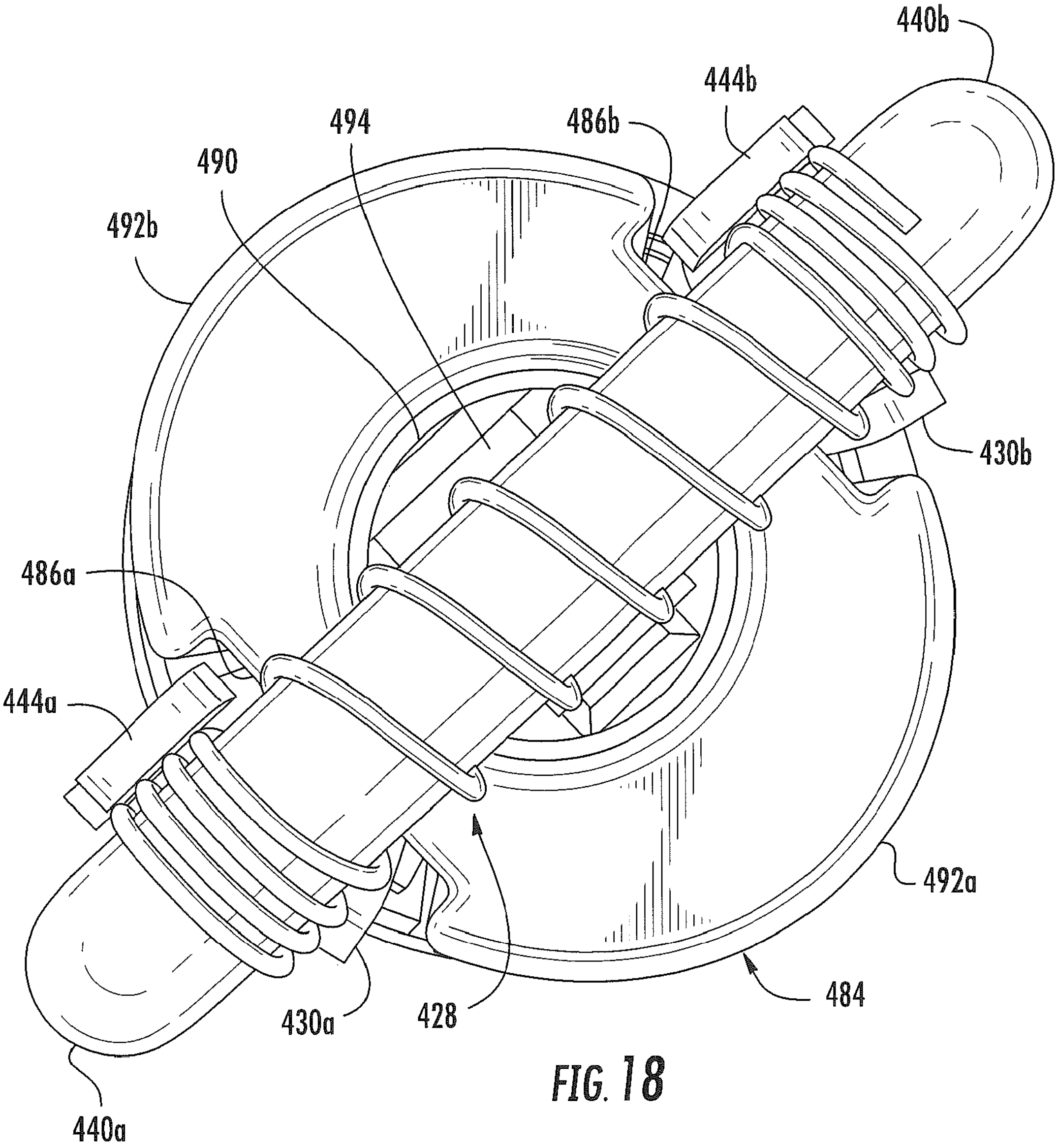
Figure 19:
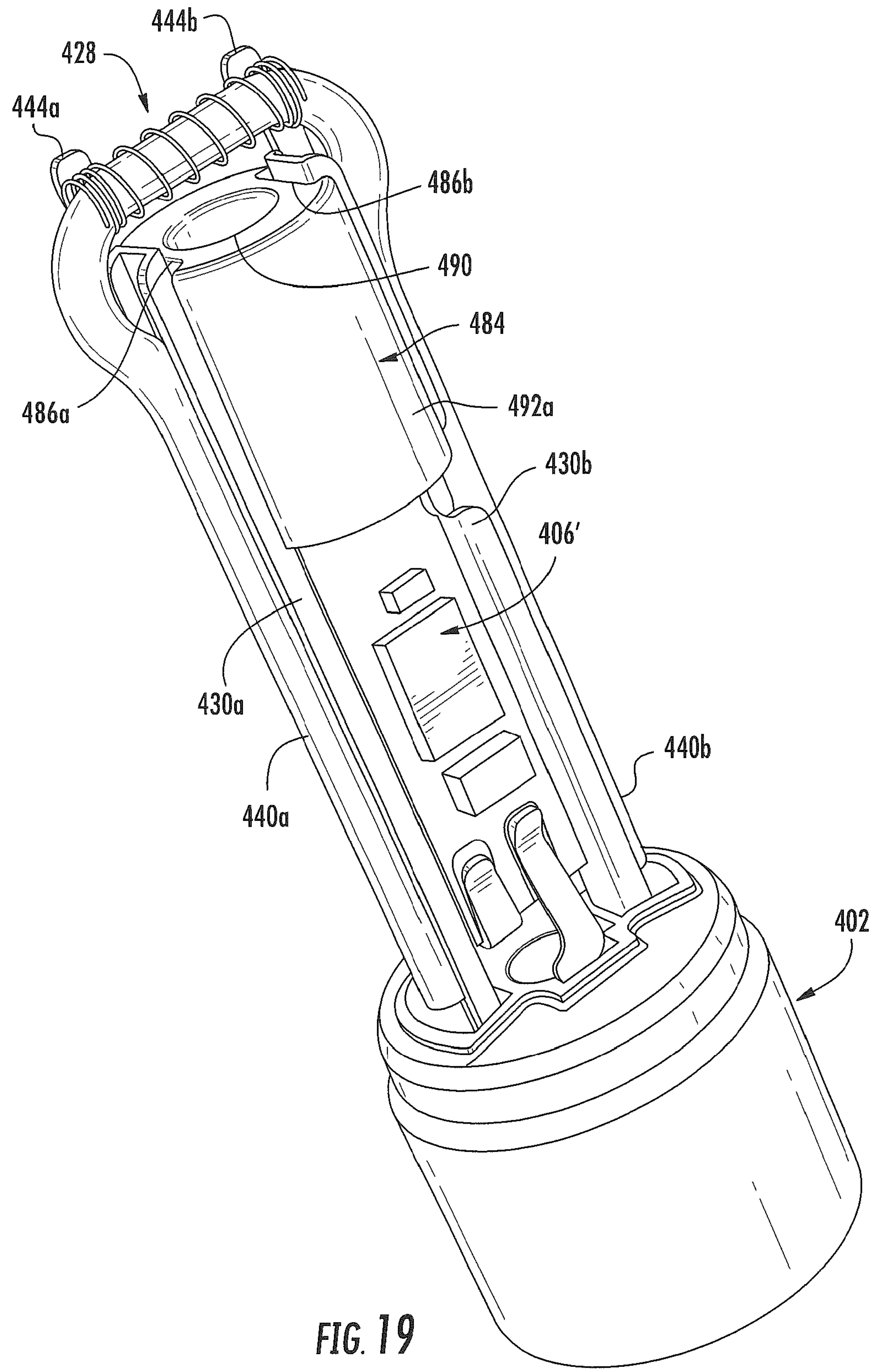
Figure 20:
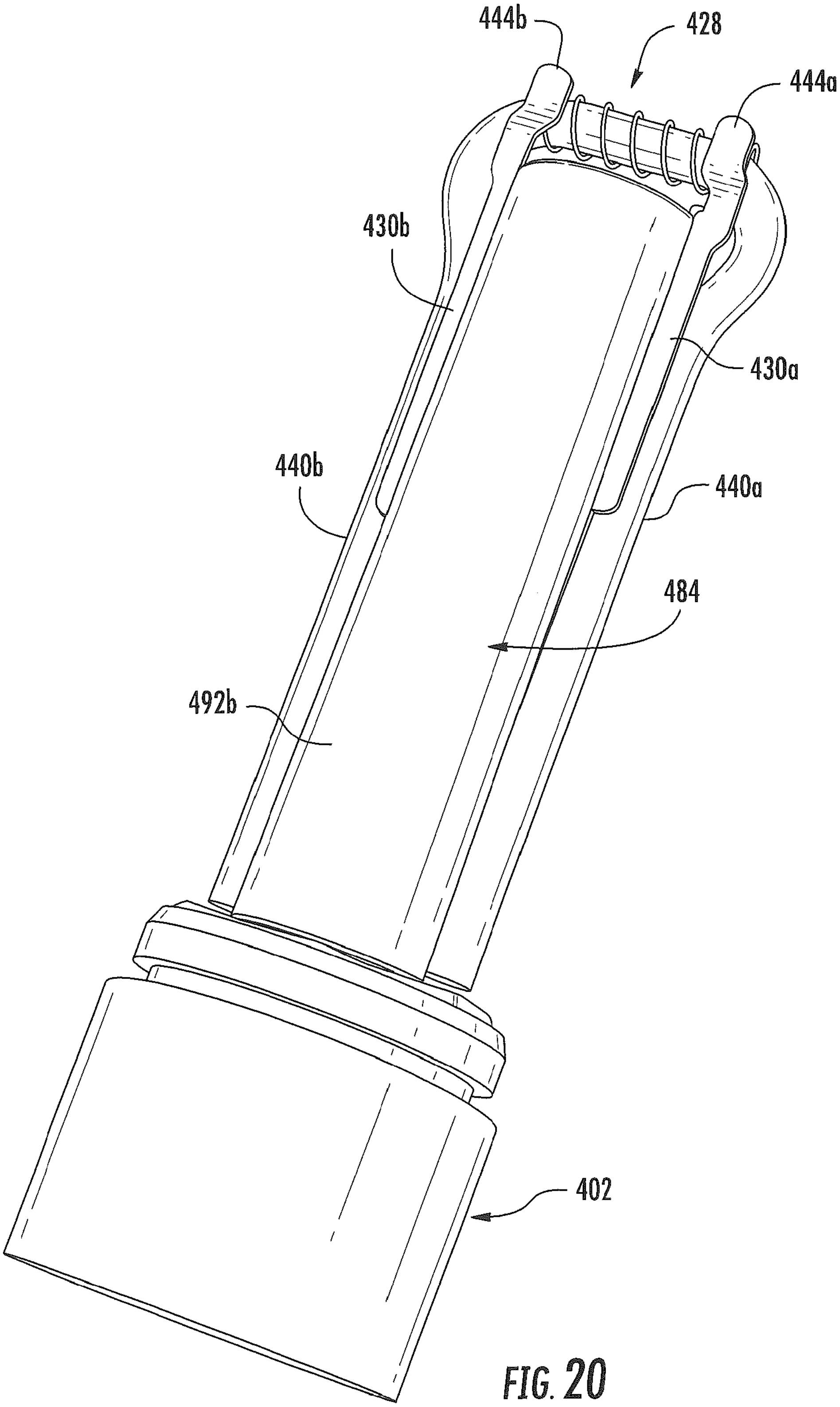
Figure 21:
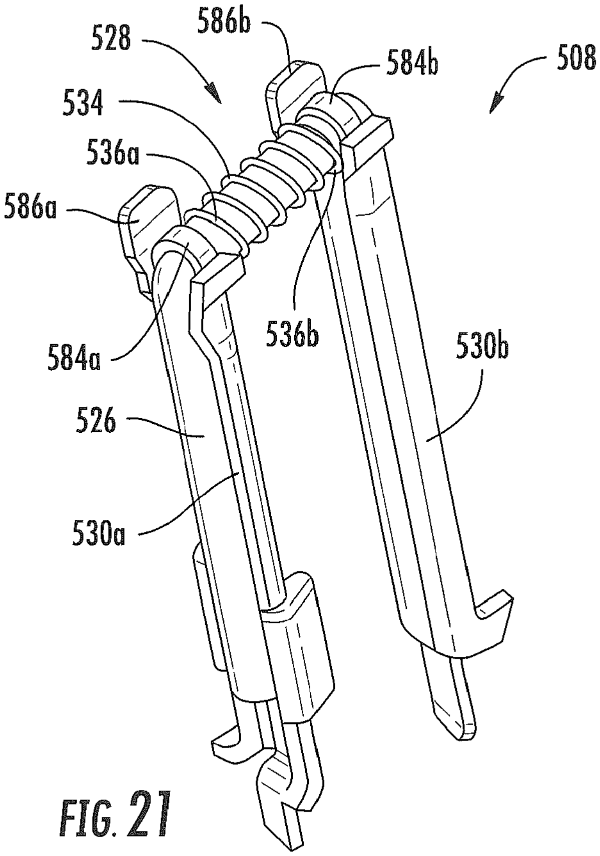
Figure 22:
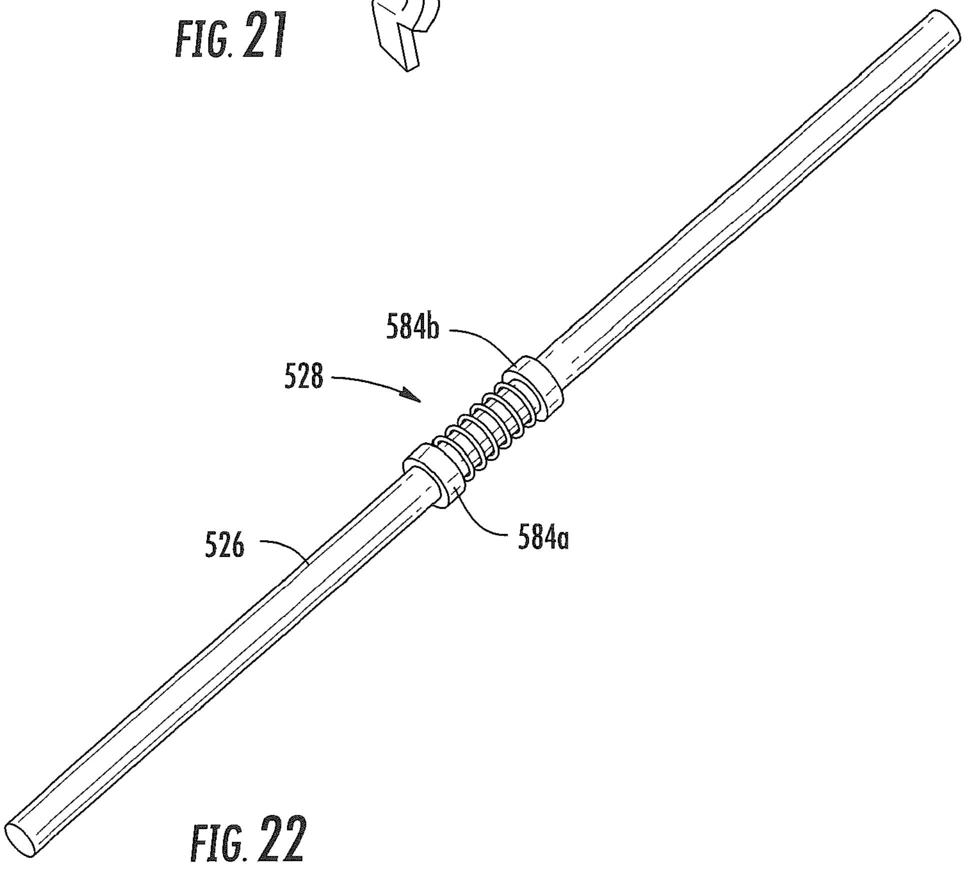
Figure 23:
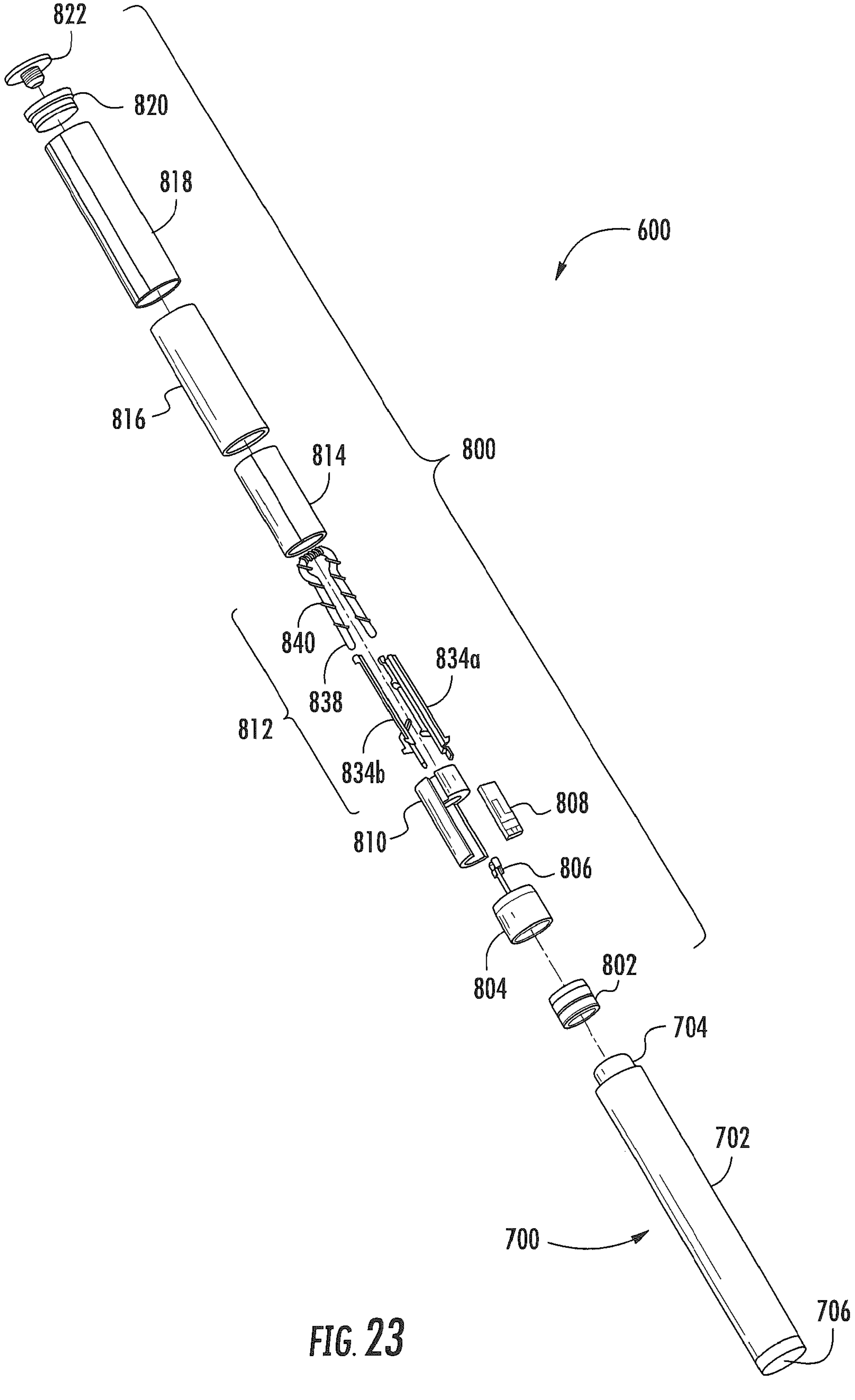
Figure 24:
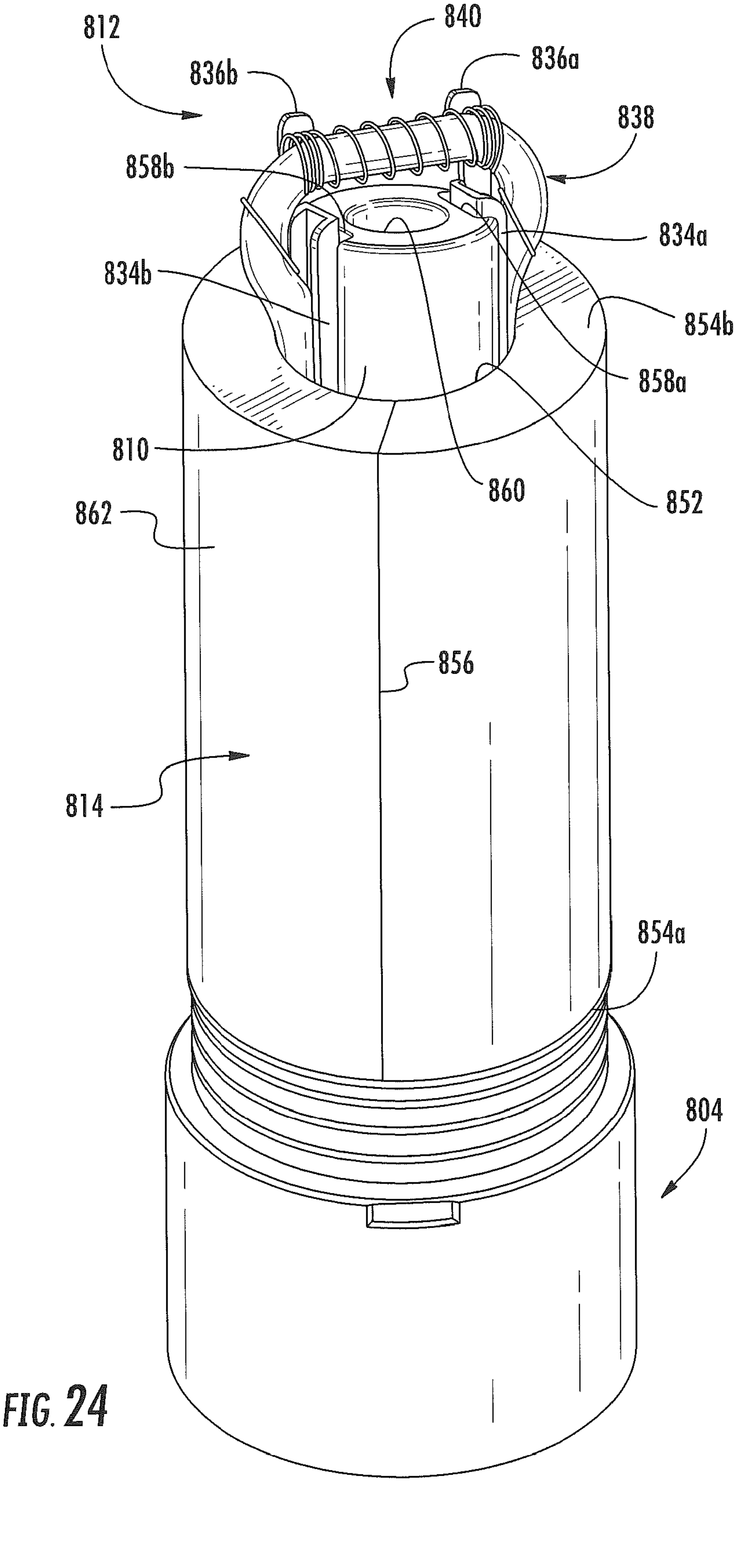
Figure 25:
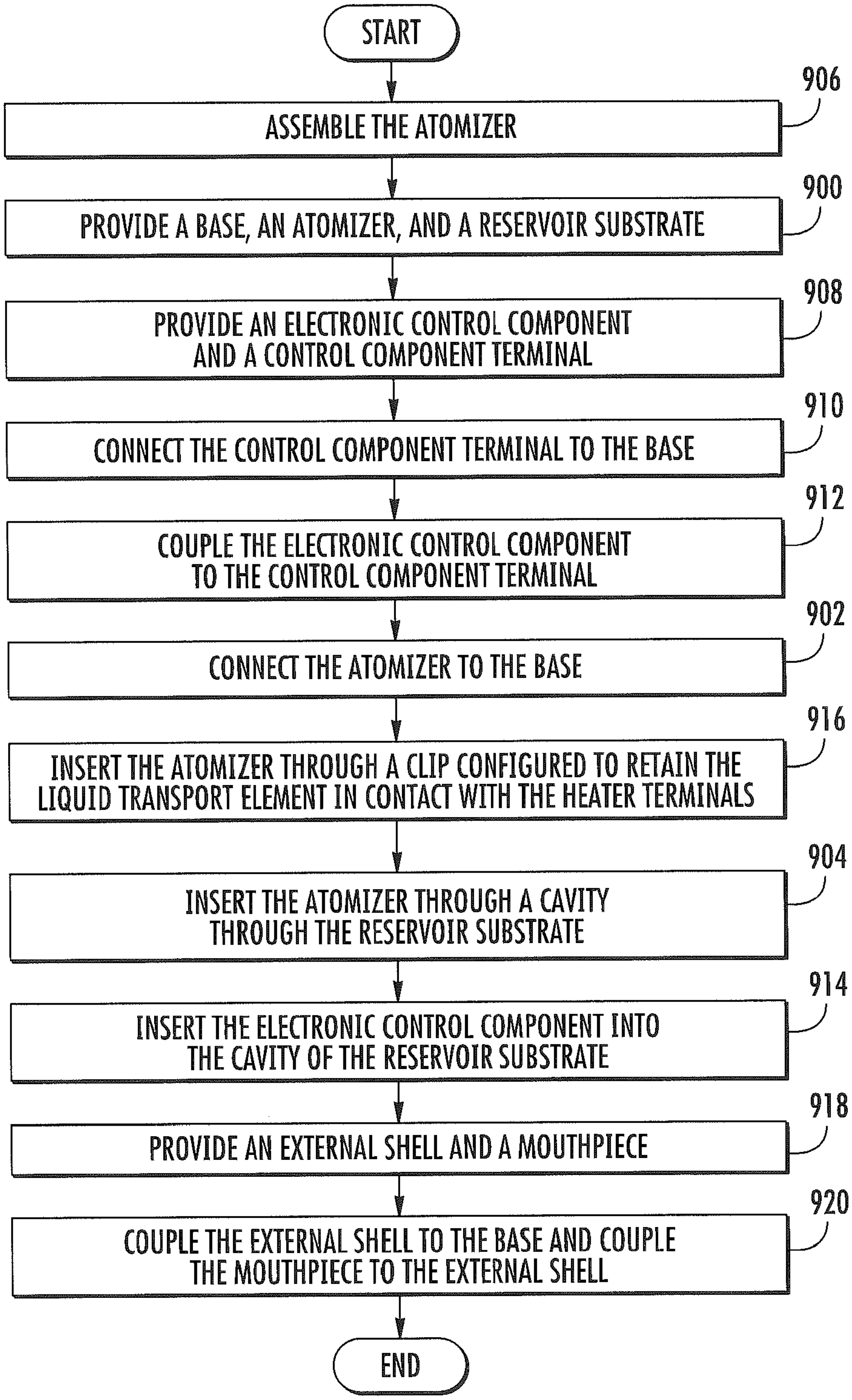
Figure 26:
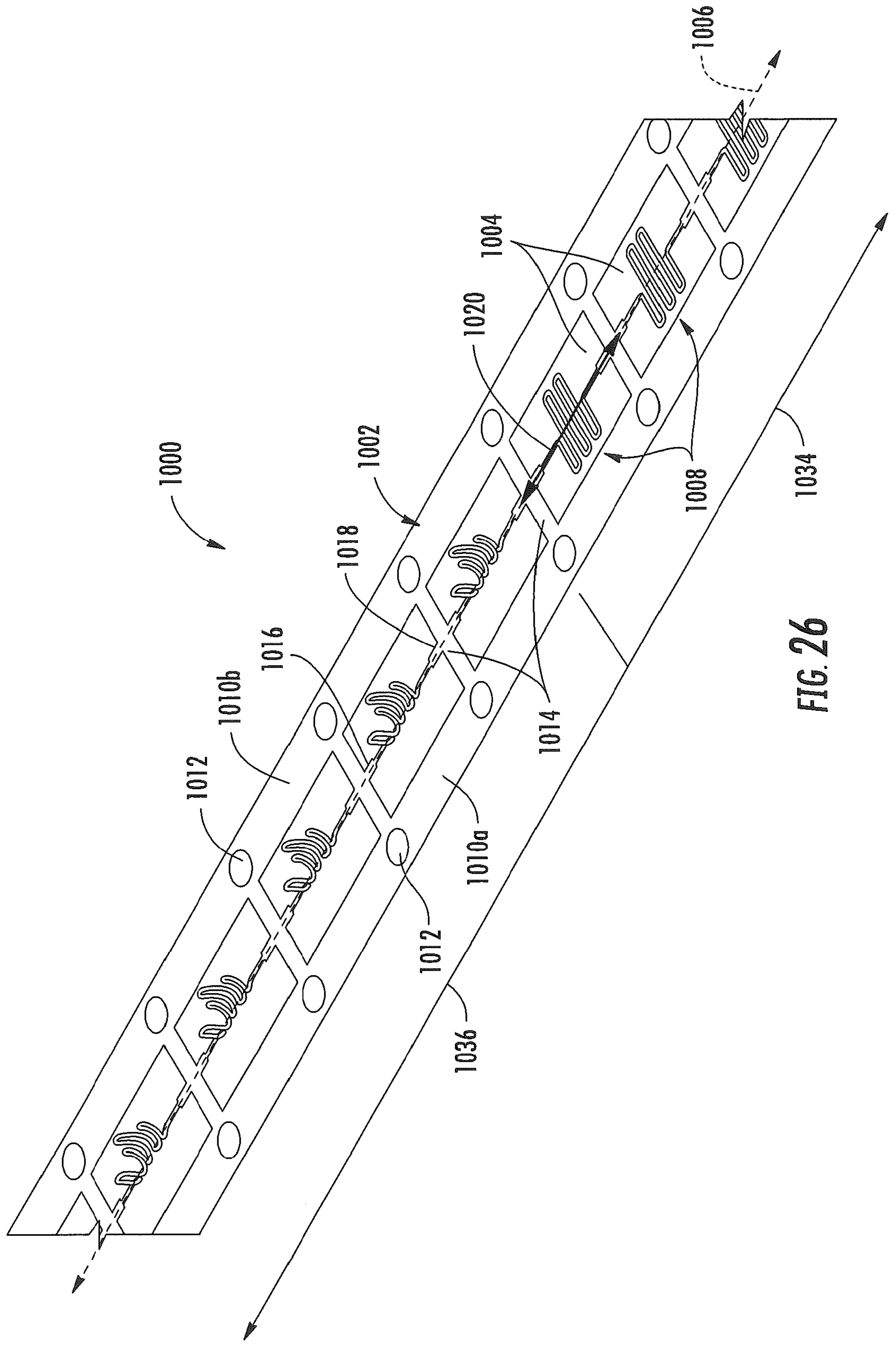
Figure 27:
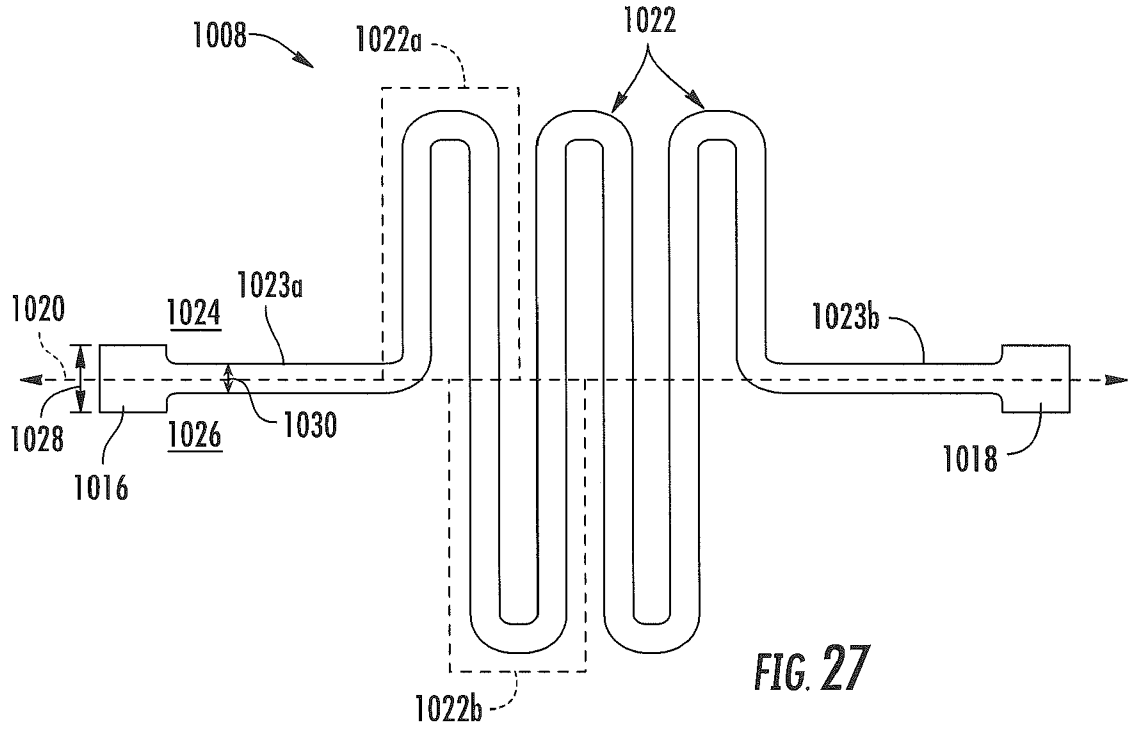
Figure 28:
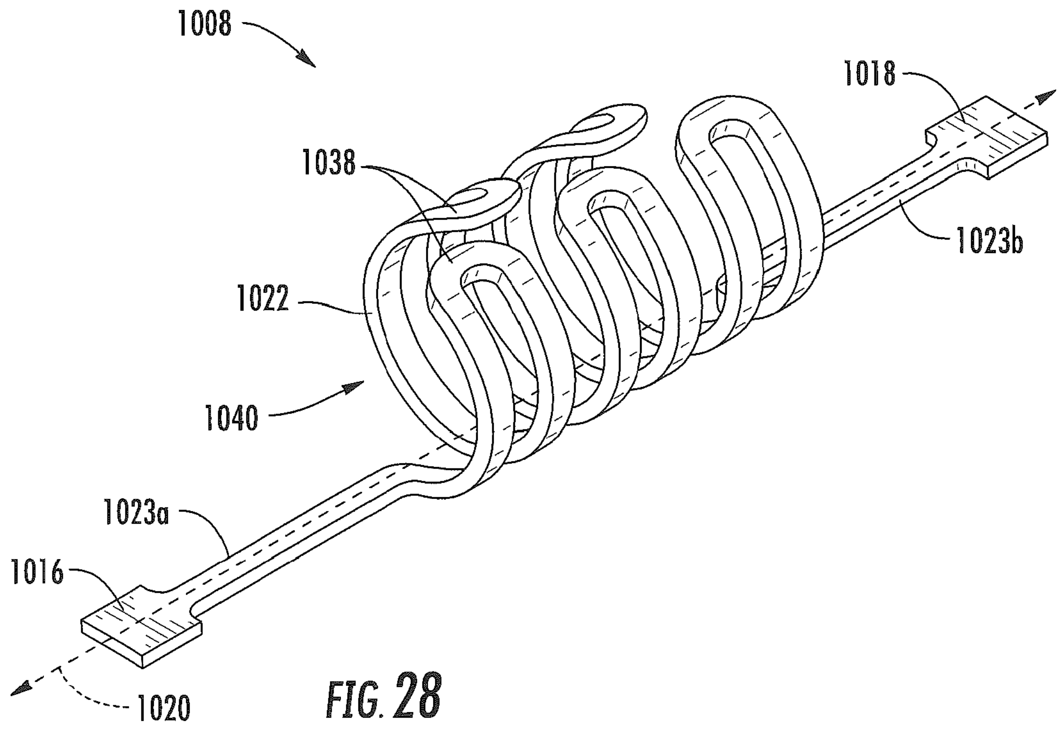
Figure 29:
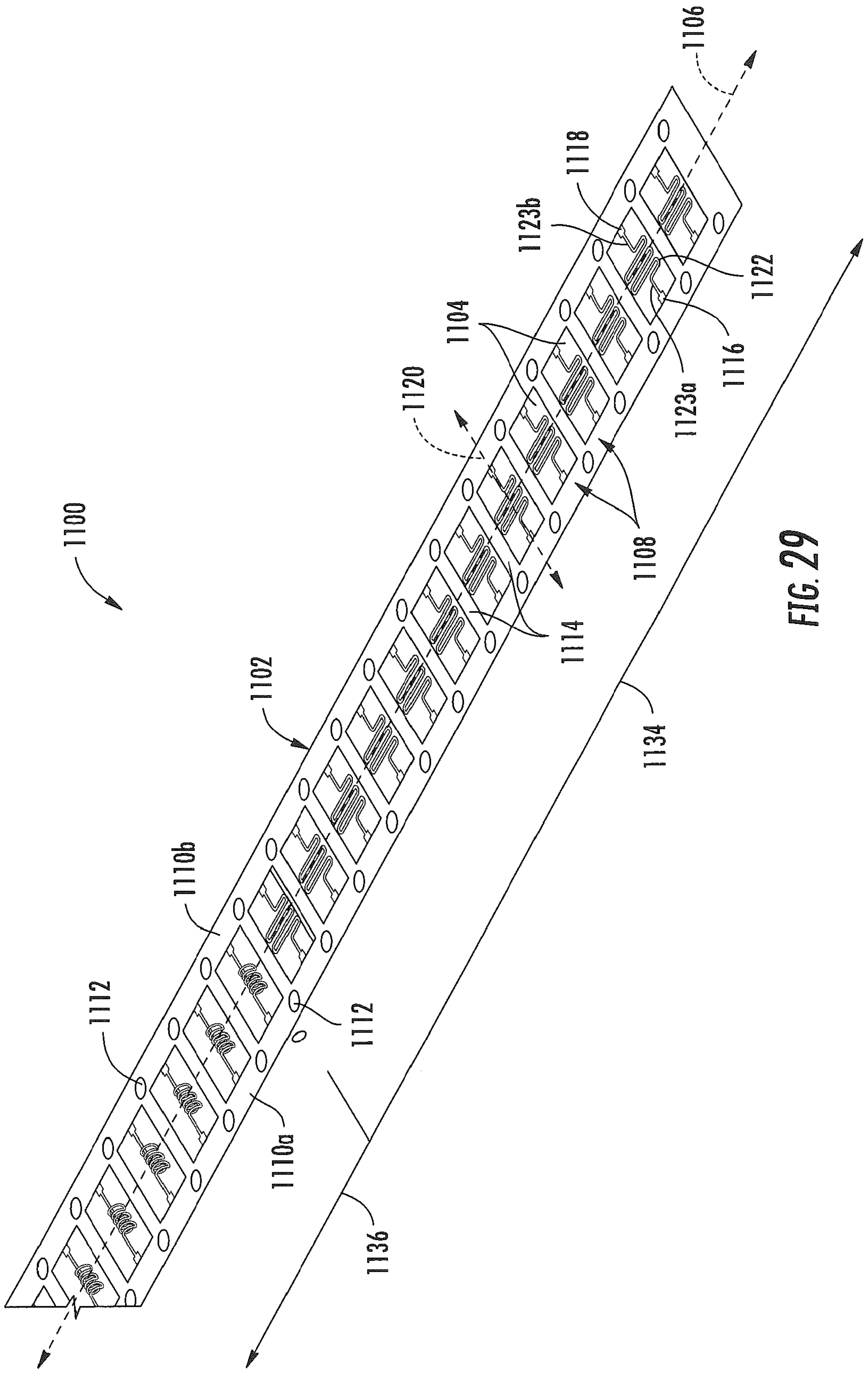
Figure 30:
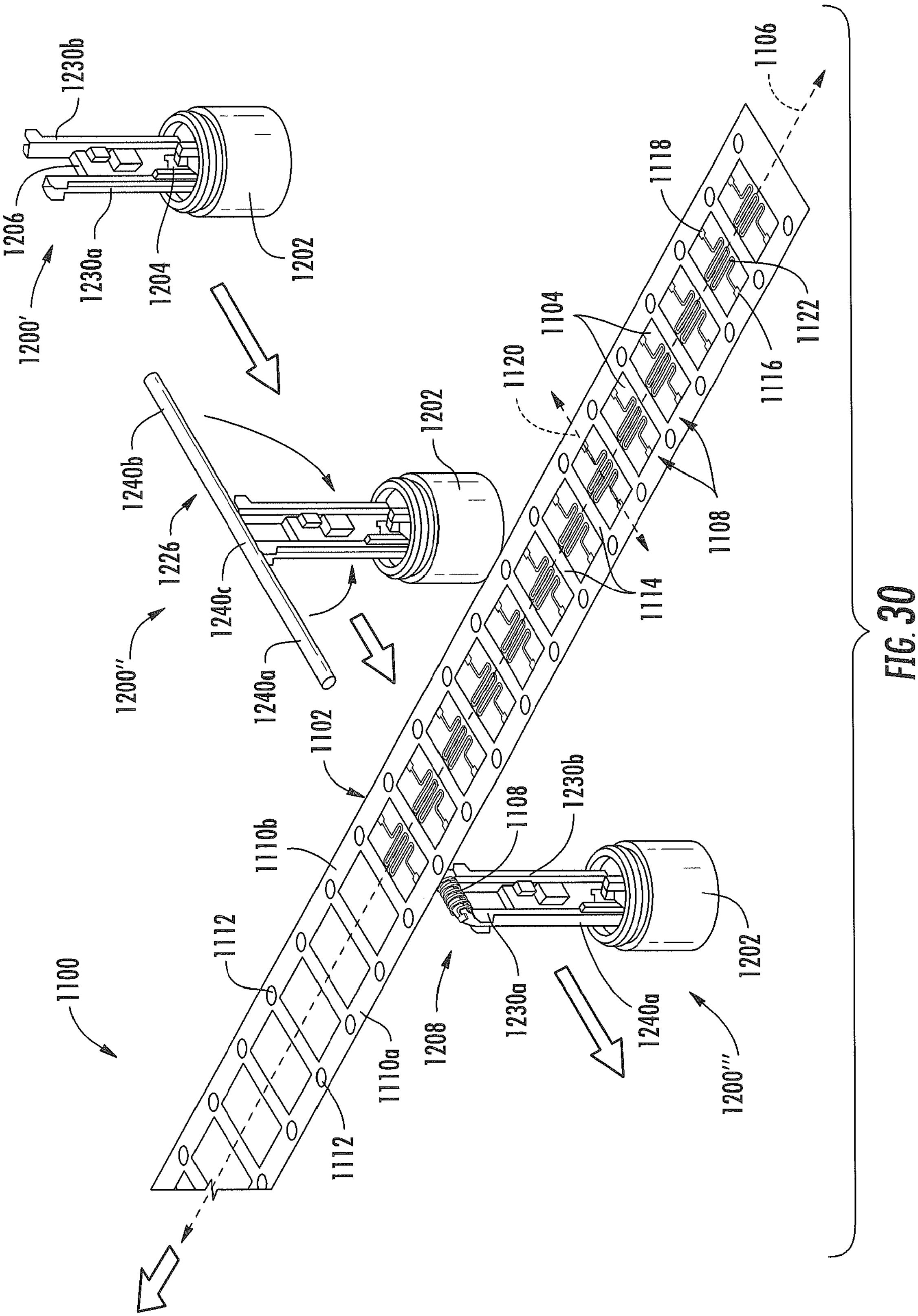
Figure 31:
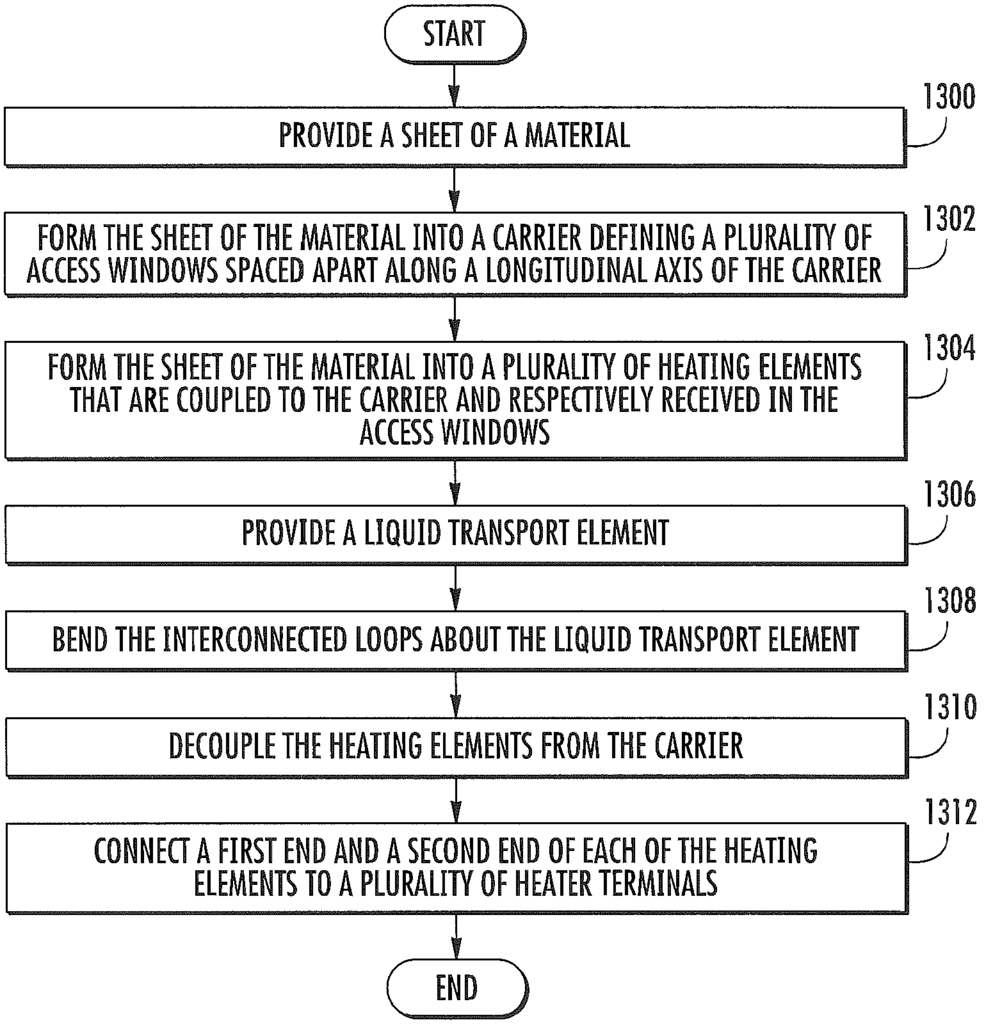

Having thus described the disclosure in the foregoing general terms, reference will now be made to the accompanying drawings, which are not necessarily drawn to scale, and wherein:

FIG. 1 illustrates a sectional view through a smoking article comprising a control body and a cartridge including an atomizer according to an example embodiment of the present disclosure;

FIG. 2 illustrates an exploded view of a cartridge for a smoking article comprising a base, a control component terminal, an electronic control component, an atomizer, a reservoir substrate, an external shell, and a mouthpiece according to an example embodiment of the present disclosure;

FIG. 3 illustrates an enlarged exploded view of the base and the control component terminal of the cartridge of FIG. 2;

FIG. 4 illustrates an enlarged perspective view of the base and the control component terminal of FIG. 2 in an assembled configuration;

FIG. 5 illustrates an enlarged perspective view of the base, the control component terminal, and the electronic control component of FIG. 2 in an assembled configuration;

FIG. 6 illustrates an enlarged perspective view of the atomizer of FIG. 2;

FIG. 7 illustrates an enlarged side perspective view of the base, the control component terminal, the electronic control component, and the atomizer of FIG. 2 in an assembled configuration;

FIG. 8 illustrates an enlarged bottom perspective view of the base, the control component terminal, the electronic control component, and the atomizer of FIG. 2 in an assembled configuration;

FIG. 9 illustrates a perspective view of the base, the atomizer, and the reservoir substrate of FIG. 2 in an assembled configuration;

FIG. 10 illustrates a perspective view of the base and the external shell of FIG. 2 in an assembled configuration;

FIG. 11 illustrates a perspective view of the cartridge of FIG. 2 in an assembled configuration;

FIG. 12 illustrates a first partial perspective view of the cartridge of FIG. 2 and a receptacle for a control body according to an example embodiment of the present disclosure;

FIG. 13 illustrates an opposing second partial perspective view of the cartridge of FIG. 2 and the receptacle of FIG. 12;

FIG. 14 illustrates an exploded view of a cartridge for a smoking article comprising a base, a control component terminal, an electronic control component, an atomizer, a retainer clip, a reservoir substrate, an external shell, and a mouthpiece according to an example embodiment of the present disclosure;

FIG. 15 illustrates an enlarged perspective view of the base, the control component terminal, and the heater terminals of the cartridge of FIG. 14 in an assembled configuration;

FIG. 16 illustrates an enlarged perspective view of the base, the control component terminal, the heater terminals, and the atomizer of the cartridge of FIG. 14 in an assembled configuration;

FIG. 17 illustrates a partial perspective view of the cartridge of FIG. 14 further comprising a flow tube according to an example embodiment of the present disclosure;

FIG. 18 illustrates an end view of the flow tube of FIG. 17;

FIG. 19 illustrates a perspective view of a truncated side of the flow tube;

FIG. 20 illustrates a perspective view of an elongated side of the flow tube;

FIG. 21 illustrates a perspective view of a liquid transport element with a wire heating element and connector rings received thereon according to an example embodiment of the present disclosure;

FIG. 22 illustrates a perspective view of an atomizer comprising the liquid transport element with the wire heating element and the connector rings received thereon of FIG. 21;

FIG. 23 illustrates a partially exploded view of an aerosol delivery device including a control body in a assembled configuration and a cartridge in an exploded configuration, the cartridge comprising a base shipping plug, a base, a control component terminal, an electronic control component, a flow tube, an atomizer, a reservoir substrate, an external shell, a label, a mouthpiece, and a mouthpiece shipping plug according to an example embodiment of the present disclosure;

FIG. 24 illustrates an enlarged perspective view of the base, the atomizer, the flow tube, and the reservoir substrate of FIG. 23 in an assembled configuration;

FIG. 25 illustrates a schematic view of a method for assembling a cartridge for a smoking article according to an example embodiment of the present disclosure;

FIG. 26 illustrates a partial perspective view of an input for production of a plurality of atomizers comprising a carrier and a plurality of heating elements coupled to connecting strips of the carrier according to an example embodiment of the present disclosure;

FIG. 27 illustrates an enlarged top view of one of the heating elements of the input of FIG. 20 in an initial planar configuration;

FIG. 28 illustrates an enlarged perspective view of one of the heating elements of the input of FIG. 26 in a bent configuration;

FIG. 29 illustrates a partial perspective view of an input for production of a plurality of atomizers comprising a carrier and a plurality of heating elements coupled to side strips of the carrier according to an example embodiment of the present disclosure;

FIG. 30 illustrates steps performed in producing atomizers from the input of FIG. 29 according to an example embodiment of the present disclosure; and FIG. 31 illustrates a schematic view of a method of forming a plurality of atomizers according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms “a”, “an”, “the”, include plural referents unless the context clearly dictates otherwise.

The present disclosure provides descriptions of aerosol delivery devices that use electrical energy to heat a material (preferably without combusting the material to any significant degree) to form an inhalable substance; such articles most preferably being sufficiently compact to be considered “hand-held” devices. In certain highly preferred embodiments, the aerosol delivery devices can be characterized as smoking articles. As used herein, the term “smoking article” is intended to mean an article or device that provides some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. As used herein, the term “smoking article” does not necessarily mean that, in operation, the article or device produces smoke in the sense of the aerosol resulting from by-products of combustion or pyrolysis of tobacco, but rather, that the article or device yields vapors (including vapors within aerosols that can be considered to be visible aerosols that might be considered to be described as smoke-like) resulting from volatilization or vaporization of certain components of the article or device. In highly preferred embodiments, articles or devices characterized as smoking articles incorporate tobacco and/or components derived from tobacco.

Articles or devices of the present disclosure also can be characterized as being vapor-producing articles, aerosol delivery articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term “aerosol” as used herein is meant to include vapors, gases and aerosols of a form or type suitable for human inhalation, whether or not visible, and whether or not of a form that might be considered to be smoke-like.

In use, smoking articles of the present disclosure may be subjected to many of the physical actions employed by an individual in using a traditional type of smoking article (e.g., a cigarette, cigar or pipe that is employed by lighting and inhaling tobacco). For example, the user of a smoking article of the present disclosure can hold that article much like a traditional type of smoking article, draw on one end of that article for inhalation of aerosol produced by that article, take puffs at selected intervals of time, etc.

Smoking articles of the present disclosure generally include a number of components provided within an outer shell or body. The overall design of the outer shell or body can vary, and the format or configuration of the outer body that can define the overall size and shape of the smoking article can vary. Typically, an elongated body resembling the shape of a cigarette or cigar can be a formed from a single, unitary shell; or the elongated body can be formed of two or more separable pieces. For example, a smoking article can comprise an elongated shell or body that can be substantially tubular in shape and, as such, resemble the shape of a conventional cigarette or cigar. In one embodiment, all of the components of the smoking article are contained within one outer body or shell. Alternatively, a smoking article can comprise two or more shells that are joined and are separable. For example, a smoking article can possess at one end a control body comprising a shell containing one or more reusable components (e.g., a rechargeable battery and various electronics for controlling the operation of that article), and at the other end and removably attached thereto a shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various smoking article designs and component arrangements can be appreciated upon consideration of the commercially available electronic smoking articles, such as those representative products listed in the background art section of the present disclosure.

Smoking articles of the present disclosure most preferably comprise some combination of a power source (i.e., an electrical power source), at least one control component (e.g., means for actuating, controlling, regulating and ceasing power for heat generation, such as by controlling electrical current flow the power source to other components of the article), a heater or heat generation component (e.g., an electrical resistance heating element or component commonly referred to as an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the smoking article for aerosol inhalation (e.g., a defined air flow path through the article such that aerosol generated can be withdrawn therefrom upon draw). Exemplary formulations for aerosol precursor materials that may be used according to the present disclosure are described in U.S. Pat. Pub. No. 2013/0008457 to Zheng et al., the disclosure of which is incorporated herein by reference in its entirety.

Alignment of the components within the article can vary. In specific embodiments, the aerosol precursor composition can be located near an end of the article (e.g., within a cartridge, which in certain circumstances can be replaceable and disposable), which may be is proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof. Additionally, the selection of various smoking article components can be appreciated upon consideration of the commercially available electronic smoking articles, such as those representative products listed in the background art section of the present disclosure.

A smoking article incorporates a battery or other electrical power source to provide current flow sufficient to provide various functionalities to the article, such as resistive heating, powering of control systems, powering of indicators, and the like. The power source can take on various embodiments. Preferably, the power source is able to deliver sufficient power to rapidly heat the heating member to provide for aerosol formation and power the article through use for the desired duration of time. The power source preferably is sized to fit conveniently within the article so that the article can be easily handled; and additionally, a preferred power source is of a sufficiently light weight to not detract from a desirable smoking experience.

One example embodiment of a smoking article 100 is provided in FIG. 1. As seen in the cross-section illustrated therein, the smoking article 100 can comprise a control body 102 and a cartridge 104 that can be permanently or detachably aligned in a functioning relationship. Although a threaded engagement is illustrated in FIG. 1, it is understood that further means of engagement are encompassed, such as a press-fit engagement, interference fit, a magnetic engagement, or the like.

In specific embodiments, one or both of the control body 102 and the cartridge 104 may be referred to as being disposable or as being reusable. For example, the control body may have a replaceable battery or may be rechargeable and thus may be combined with any type of recharging technology, including connection to a typical electrical outlet, connection to a car charger (i.e., cigarette lighter receptacle), and connection to a computer, such as through a USB cable.

In the exemplified embodiment, the control body 102 includes a control component 106, a flow sensor 108, and a battery 110, which can be variably aligned, and can include a plurality of indicators 112 at a distal end 114 of an external shell 116. The indicators 112 can be provided in varying numbers and can take on different shapes and can even be an opening in the body (such as for release of sound when such indicators are present).

An air intake 118 may be positioned in the external shell 116 of the control body 102. A receptacle 120 also is included at the proximal attachment end 122 of the control body 102 and extends into a control body projection 124 to allow for ease of electrical connection with an atomizer or a component thereof, such as a resistive heating element (described below) when the cartridge 104 is attached to the control body.

The cartridge 104 includes an external shell 126 with a mouth opening 128 at a mouthend 130 thereof to allow passage of air and entrained vapor (i.e., the components of the aerosol precursor composition in an inhalable form) from the cartridge to a consumer during draw on the smoking article 100. The smoking article 100 may be substantially rod-like or substantially tubular shaped or substantially cylindrically shaped in some embodiments.

The cartridge 104 further includes an atomizer 132 comprising a resistive heating element 134 comprising a wire coil in the illustrated embodiment and a liquid transport element 136 comprising a wick in the illustrated embodiment and configured to transport a liquid. Various embodiments of materials configured to produce heat when electrical current is applied therethrough may be employed to form the wire coil. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), and ceramic (e.g., a positive temperature coefficient ceramic). Electrically conductive heater terminals 138 (e.g., positive and negative terminals) at the opposing ends of the heating element 134 are configured to direct current flow through the heating element and configured for attachment to the appropriate wiring or circuit (not illustrated) to form an electrical connection of the heating element with the battery 110 when the cartridge 104 is connected to the control body 102. Specifically, a plug 140 may be positioned at a distal attachment end 142 of the cartridge 104. When the cartridge 104 is connected to the control body 102, the plug 140 engages the receptacle 120 to form an electrical connection such that current controllably flows from the battery 110, through the receptacle and plug, and to the heating element 134. The external shell 126 of the cartridge 104 can continue across the distal attachment end 142 such that this end of the cartridge is substantially closed with the plug protruding therefrom.

A reservoir may utilize a liquid transport element to transport an aerosol precursor composition to an aerosolization zone. One such example is shown in FIG. 1. As seen therein, the cartridge 104 includes a reservoir layer 144 comprising layers of nonwoven fibers formed into the shape of a tube encircling the interior of the external shell 126 of the cartridge, in this embodiment. An aerosol precursor composition is retained in the reservoir layer 144. Liquid components, for example, can be sorptively retained by the reservoir layer 144. The reservoir layer 144 is in fluid connection with a liquid transport element 136 (the wick in this embodiment). The liquid transport element 136 transports the aerosol precursor composition stored in the reservoir layer 144 via capillary action to an aerosolization zone 146 of the cartridge 104. As illustrated, the liquid transport element 136 is in direct contact with the heating element 134 that is in the form of a metal wire coil in this embodiment.

In use, when a user draws on the article 100, the heating element 134 is activated (e.g., such as via a puff sensor), and the components for the aerosol precursor composition are vaporized in the aerosolization zone 146. Drawing upon the mouthend 130 of the article 100 causes ambient air to enter the air intake 118 and pass through the central opening in the receptacle 120 and the central opening in the plug 140. In the cartridge 104, the drawn air passes through an air passage 148 in an air passage tube 150 and combines with the formed vapor in the aerosolization zone 146 to form an aerosol. The aerosol is whisked away from the aerosolization zone 146, passes through an air passage 152 in an air passage tube 154, and out the mouth opening 128 in the mouthend 130 of the article 100.

It is understood that a smoking article that can be manufactured according to the present disclosure can encompass a variety of combinations of components useful in forming an electronic smoking article. Reference is made for example to the smoking articles disclosed in U.S. patent application Ser. No. 13/536,438, filed Jun. 28, 2012, U.S. patent application Ser. No. 13/432,406, filed Mar. 28, 2012, U.S. patent application Ser. No. 13/602,871, filed Sep. 4, 2012, the disclosures of which are incorporated herein by reference in their entirety. Further to the above, representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties. Further, a single-use cartridge for use with an electronic smoking article is disclosed in U.S. patent application Ser. No. 13/603,612, filed Sep. 5, 2012, which is incorporated herein by reference in its entirety.

The various components of a smoking article according to the present disclosure can be chosen from components described in the art and commercially available. Examples of batteries that can be used according to the disclosure are described in U.S. Pat. App. Pub. No. 2010/0028766, the disclosure of which is incorporated herein by reference in its entirety.

An exemplary mechanism that can provide puff-actuation capability includes a Model 163PC01D36 silicon sensor, manufactured by the MicroSwitch division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Further description of current regulating circuits and other control components, including microcontrollers that can be useful in the present smoking article, are provided in U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties.

The aerosol precursor, which may also be referred to as an aerosol precursor composition or a vapor precursor composition, can comprise one or more different components. For example, the aerosol precursor can include a polyhydric alcohol (e.g., glycerin, propylene glycol, or a mixture thereof). Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference.

Still further components can be utilized in the smoking article of the present disclosure. For example, U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. App. Pub. No. 2009/0320863 by Fernando et al. discloses computer interfacing means for smoking devices to facilitate charging and allow computer control of the device; U.S. Pat. App. Pub. No. 2010/0163063 by Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. No. 8,156,944 to Hon; U.S. Pat. App. Pub. Nos. 2006/0196518, 2009/0126745, and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; and WO 2010/091593 to Hon. A variety of the materials disclosed by the foregoing documents may be incorporated into the present devices in various embodiments, and all of the foregoing disclosures are incorporated herein by reference in their entireties.

FIG. 2 illustrates an exploded view of an example embodiment of a cartridge 200 for a smoking article according to the present disclosure. The cartridge 200 may comprise a base 202, a control component terminal 204, an electronic control component 206, an atomizer 208, a reservoir substrate 210, an external shell 212, and a mouthpiece 214. The cartridge 200 may be configured to couple to a control body to form a smoking article. Note that the various embodiments of components described above in the cited references and/or included in commercially available aerosol delivery devices may be employed in embodiments of the cartridges described here. Note further that some of these portions of the cartridge 200 are optional. In this regard, by way of example, the cartridge 200 may not include the control component terminal 204 and the electronic control component 206 in some embodiments.

FIG. 3 illustrates an enlarged exploded view of the base 202 and the control component terminal 204. The control component terminal 204 may define a clip 216 configured to engage the electronic control component 206 and form an electrical connection therewith. Further, the control component terminal 204 may include one or more protrusions 218*a*, 218*b* configured to engage the base 202, for example via interference fit, such that the control component terminal 204 is retained in engagement therewith. An end 220 of the control component terminal 204 may be configured to engage a control body, so as to establish an electrical connection therewith.

As illustrated, the base 202 may define a receptacle 222 configured to receive the control component terminal 204 therein. In this regard, as illustrated in FIG. 4, the control component terminal 204 may couple to the base 202. For example, the control component terminal 204 may be retained in the receptacle 222 of the base 202 via interference fit, for example due to contact between the protrusions 218*a*, 218*b* and the base. As described below, the control component terminal 204 may extend through the base 202 to a position at which it may form an electrical connection with a control body to which the cartridge 200 connects. Further, the base 202 may define threads or protrusions 224 configured to engage the external shell 212, as will be described below.

As illustrated in FIG. 5, the control component terminal 204 may couple to the electronic control component 206 such that an electrical connection is established therebetween. Accordingly, when the cartridge 200 is coupled to a control body, the electronic control component 206 may communicate therewith through the control component terminal 204. The electronic control component 206 may be configured to perform one or more of a variety of functions. Further, the electronic control component 206 may be configured as purpose-specific analog and/or digital circuitry with or without a processor, or the electronic control component may comprise hardware, software, or a combination of hardware and software. Accordingly, any or all of the functions performed by or in conjunction with the electronic control component 206 may be embodied in a computer-readable storage medium having computer-readable program code portions stored therein that, in response to execution by a processor, cause an apparatus to at least perform or direct the recited functions. In one particular instance, upon establishment of communication between the electronic control component 206 and a control body, the electronic control component may be configured to provide an authentication code or other appropriate indicia to the control body. In such instances, the control body may be configured to evaluate the authentication indicia to determine whether the cartridge 200 is authorized for use with the control body. However, the electronic control component 206 may perform various other functions. Various examples of electronic control components and functions performed thereby are described in U.S. patent application Ser. No. 13/647,000, filed Oct. 8, 2012, which is incorporated herein by reference in its entirety.

FIG. 6 illustrates an enlarged perspective view of the atomizer 208. As illustrated, the atomizer 208 may include a liquid transport element 226, a heating element 228, a first heater terminal 230*a* and a second heater terminal 230*b* (collectively, "heater terminals 230"). The liquid transport element 226 extends between a first liquid transport element end 232*a* and a second liquid transport element end 232*b* (collectively, "liquid transport element ends 232"). The liquid transport element 226 may comprise a wick in some embodiments, as described above.

The heating element 228 extends at least partially about the liquid transport element 226 at a position between the first liquid transport element end 232*a* and the second liquid transport element end 232*b*. In some embodiments, the heating element 228 may comprise a wire 234 defining a plurality of coils wound about the liquid transport element 226 and extending between a first wire end 236*a* and a second wire end 236*b* (collectively, "wire ends 236"), as illustrated in FIGS. 6 and 8. The wire 234 may comprise material configured to produce heat when electrical current is provided therethrough. For example, the wire 234 may comprise Kanthal (FeCrAl), Nichrome, Molybdenum disilicide ($MoSi_2$), molybdenum silicide (MoSi), Molybdenum disilicide doped with Aluminum ($Mo(Si,Al)_2$), or ceramic (e.g., a positive temperature coefficient ceramic) in some embodiments, although various other materials may be employed in other embodiments. In some embodiments the heating element 228 may be formed by winding the wire 234 about the liquid transport element 226 as described in U.S. patent application Ser. No. 13/708,381, filed Dec. 7, 2012, which is incorporated herein by reference in its entirety. However, various other embodiments of methods may be employed to form the heating element 228, and various other embodiments of heating elements may be employed in the atomizer 208.

The heater terminals 230 connect to the heating element 228. In one embodiment the heater terminals 230 directly contact the wire 234 proximate the first wire end 236*a* and the second wire end 236*b*. Direct contact, as used herein, refers to physical contact between the wire 234 and the heater terminals 230. However, direct contact, as used herein, also encompasses embodiments in which one or more welds 238*a*, 238*b* couple the wire 234 and the heater terminals 230 (see, e.g., FIGS. 6 and 8). A weld, as used herein, refers to a solder, flux, braze, or other material that is deposited in liquid or molten form and hardens to form a connection.

As further illustrated in FIG. 6, the liquid transport element 226 may be configured in a substantially U-shaped configuration. Accordingly, a first distal arm 240*a* and a second distal arm 240*b* (collectively, "distal arms 240") of the liquid transport element 226 may respectively extend along the first and second heater terminals 230*a*, 230*b*. Further a center section 240*c* of the liquid transport element 226, at which the heating element 228 is positioned, may extend between the heater terminals 230. The liquid transport element 226 may be either preformed in the U-shaped configuration or bent to define this configuration.

The heater terminals 230 may define a plurality of walls 242. The walls 242 may include an inner wall 242*a*, and two side walls 242*b*, 242*c*. Accordingly, the distal arms 240 of the liquid transport element 226 may be surrounded on three sides by the walls 242 of the heater terminals 230. This configuration may assist in retaining the heater terminals 230 in contact with the distal arms 240 of the liquid transport element 226. Further, the heater terminals 230 may define a first tab 244*a* and a second tab 244*b* (collectively, "tabs 244") to which the first wire end 236*a* and the second wire end 236*b* may be welded or otherwise connected. The heater terminals 230 may also include protrusions 246*a*, 246*b* configured to engage the base 202, for example via interference fit, such that the atomizer 208 is retained in engagement therewith. Ends 248*a*, 248*b* of the heater terminals 230 may be configured to engage a control body, so as to establish an electrical connection therewith.

As illustrated in FIG. 7, the heater terminals 230 may couple to the base 202 in addition to the heating element 228. Accordingly, the atomizer 208 may be connected to the base 202 via the heater terminals 230. The electronic control component 206 may be received between the heater terminals 230 and the liquid transport element ends 232. This configuration may allow the heater terminals 230 to provide support to the electronic control component 206, for example by contact therewith, such that the electronic control component is securely retained in place. However, a gap 250 may be provided between the electronic control component 206 and the heating element 228. The gap 250 may reduce the amount of heat transferred to the electronic control component 206 from the heating element 228, for example by preventing direct conduction therebetween. Accordingly, the risk of damage to the electronic control component 206 from excessive heat received from the heating element 228 may be reduced.

FIG. 8 illustrates an alternative perspective view of the base 202, the control component terminal 204, the electronic control component 206, and the atomizer 208 after they are coupled to one another. In particular, FIG. 8 illustrates a view of a connector end 252 of the base 202. As illustrated, a central opening 254 may be defined in the base 202. The central opening 254 may be configured to receive airflow therethrough from a control body and direct the airflow toward the heating element 228 of the atomizer 208.

Further, the end 220 of the control component terminal 204 and the ends 248*a*, 248*b* of the heater terminals 230 may be exposed at the connector end 252 of the base 202. The end 220 of the control component terminal 204 and the ends 248*a*, 248*b* of the heater terminals 230 may be located at differing positions within the base 202 such that they make connections with components at different locations within the control body, and avoid unintended contact therebetween. In this regard, the end 220 of the control component terminal 204 and the ends 248*a*, 248*b* of the heater terminals 230 may be located at differing radial distances from the central opening 254. In the illustrated embodiment, the end 220 of the control component terminal 204 is located closest to the central opening 254, the first end 248*a* of the first heater terminal 230*a* is located farthest from the central opening, and the second end 248*b* of the second heater terminal 230*b* is located at a radial distance therebetween. Further, the end 220 of the control component terminal 204 and the ends 248*a*, 248*b* of the heater terminals 230 may extend to a plurality of different depths within the base 202. In the illustrated embodiment, the end 220 of the control component terminal 204 extends through the base 202 to a greatest depth, the first end 248*a* of the first heater terminal 230*a* extends through the base to the smallest depth, and the second end 248*b* of the second heater terminal 230*b* extends through the base to a depth therebetween.

FIG. 9 illustrates the assembly of FIGS. 7 and 8 after the reservoir substrate 210 is coupled thereto. The reservoir substrate 210 may be configured to hold an aerosol precursor composition. The reservoir substrate 210 may define a cavity 256 extending therethrough from a first reservoir end 258*a* to a second reservoir end 258*b*, wherein the first reservoir end is positioned proximate the base 202. In this regard, the reservoir substrate 210 may define a hollow tubular configuration. Note that although generally described herein as defining a hollow tubular configuration, the reservoir substrate 210 may define other shapes and configurations in other embodiments. The aerosol precursor composition may be retained within the material defining the reservoir substrate 210 itself, as opposed to within the cavity 256. This configuration may allow for airflow through the base, into and through the cavity 256, and past the heating element 228.

The reservoir substrate 210 can comprise various different materials and can be formed in a variety of different manners. In one embodiment the reservoir substrate 210 can be formed from a plurality of combined layers that can be concentric or overlapping. For example, the reservoir substrate 210 can be a continuous sheet of a material that is rolled to form the hollow tubular configuration. In other embodiments, the reservoir substrate 210 can be substantially a unitary component. For example, the reservoir substrate 210 can be shaped or molded so as to be a singular preformed element in the form of a substantially hollow tube, which may be substantially continuous in composition across the length and thickness thereof.

The reservoir substrate 210 can be formed from a material that is rigid or semi-rigid in some embodiments, while retaining the ability to store a liquid product such as, for example, an aerosol precursor composition. In certain embodiments, the material of the reservoir substrate 210 can be absorbent, adsorbent, or otherwise porous so as to provide the ability to retain the aerosol precursor composition. As such, the aerosol precursor composition can be characterized as being coated on, adsorbed by, or absorbed in the material of the reservoir substrate 210. The reservoir substrate 210 can be positioned within the cartridge 200 such that the reservoir substrate is in contact with the liquid transport element 226. More particularly, the reservoir substrate 210 can be manufactured from any material suitable for retaining the aerosol precursor composition (e.g., through absorption, adsorption, or the like) and allowing wicking away of the precursor composition for transport to the heating element 228.

The material of the reservoir substrate 210 may be suitable for forming and maintaining an appropriate shape. The material of the reservoir substrate 210 can be heat resistant so as to retain its structural integrity and avoid degradation at least at a temperature proximal to the heating temperature provided by the heating element 228. However, the reservoir substrate 210 need not be heat resistant to the full temperature produced by the heating element 228 due to the reservoir substrate being out of contact therewith. The size and strength of the reservoir substrate 210 may vary according to the features and requirements of the cartridge 200. In particular embodiments, the reservoir substrate 210 can be manufactured from a material suitable for a high-speed, automated manufacturing process. Such processes may reduce manufacturing costs compared to traditional woven or non-woven fiber mats. According to one embodiment, the reservoir can be manufactured from a cellulose acetate tow which can be processed to form a hollow acetate tube.

In certain embodiments, the reservoir substrate 210 can be provided in a form such that at least part of the cavity 256 is shaped and dimensioned to accommodate one or more other components of the cartridge 200. In some embodiments, the term "shaped and dimensioned" can indicate that a wall of the reservoir substrate 210 at the cavity 256 includes one or more indentations or protrusions that cause the interior of the reservoir substrate to have a shape that is other than substantially smooth and continuous. In other embodiments, the hollow nature of the reservoir substrate 210 can be sufficient to allow for accommodation of further components of the cartridge 200 without the need for formation of cavities or protrusions. Thus, the cartridge 200 can be particularly beneficial in that the reservoir substrate 210 can be pre-formed and can have a hollow interior defining the cavity 256 with a wall that is shaped and dimensioned to accommodate a further component of the cartridge in a mating arrangement. This particularly can facilitate ease of assembly of the cartridge 200 and can maximize the volume of the reservoir substrate 200 while also providing sufficient space for aerosol formation.

In the illustrated embodiment, the cavity 256 extending through the reservoir substrate 210 is shaped and dimensioned to accommodate at least a portion of the atomizer 208. Specifically, the reservoir substrate 210 includes two diametrically opposed grooves 260*a*, 260*b* (collectively, "grooves 260") at the cavity 256. As illustrated, the grooves 260 may extend substantially the entire length of the reservoir substrate 210 from the first end 258*a* to the second end 258*b* thereof. In light of the reservoir substrate 210 defining the cavity 256 therethrough, the atomizer 208 can be easily positioned interior to the reservoir substrate during assembly of the smoking article. Likewise, since the cavity 256 is shaped and dimensioned to mate with the atomizer 208, the combination can be easily assembled, and the atomizer can snugly mate with the reservoir substrate 210 while simultaneously placing the liquid transport element 226 in fluid connection with the reservoir substrate.

In this regard, the grooves 260 may be configured to receive the liquid transport element 226 at least partially therein. More particularly, the distal arms 240 of the liquid transport element 226 may be received in the grooves 260. Thus, the liquid transport element 226 may extend substantially entirely through the reservoir substrate 210 such that the liquid transport element ends 232 are positioned proximate the first reservoir end 258*a*. Further, the heater terminals 230 may extend through the cavity 256 through the reservoir substrate 210. In some embodiments the heater terminals 230 may be partially or fully received in the grooves 260. Additionally, the electronic control component 206 may be at least partially received in the cavity 256 through the reservoir substrate 210.

By adapting the cavity 256 of the reservoir substrate 210 to accommodate the atomizer 208, and/or various other components of the cartridge 200, available open space in the cartridge can be fully maximized by extending the reservoir substrate into the previously open spaces. As a result, the overall size and capacity of the reservoir substrate 210 can be increased in comparison to traditional woven or non-woven fiber mats that are typically utilized in electronic smoking articles. The increased capacity allows the reservoir substrate 210 to hold an increased amount of the aerosol precursor composition which may, in turn, result in longer use and enjoyment of the cartridge 200 by the end user.

As illustrated in FIG. 9, the atomizer 208 may extend through the cavity 256 of the reservoir substrate 210 such that the heating element 228 is positioned proximate the second reservoir end 258*b*. More particularly, the atomizer 208 may extend completely through the cavity 256 such that the heating element 228 is positioned past the second reservoir end 258*b*. This embodiment may reduce the heat directly applied by the heating element 228 to the reservoir substrate 210 such that the amount of the aerosol precursor composition vaporized by the heating element is controlled in part by the flow of the aerosol precursor composition through the liquid transport element 226 to the heating element. Accordingly, the amount of aerosol precursor composition vaporized may be more precisely controlled. However, in other embodiments, it is not necessary for the atomizer to extend beyond the second reservoir end, and the atomizer can be positioned relative to the reservoir substrate such that the heating element is received within the cavity of the reservoir substrate.

The aerosol precursor composition may comprise a variety of components including, by way of example, glycerin, nicotine, tobacco, tobacco extract, and/or flavorants. Various components that may be included in the aerosol precursor composition are described in U.S. Pat. No. 7,726,320 to Robinson et al., which is incorporated herein by reference. In some embodiments the aerosol precursor composition may additionally include an effervescent material. The effervescence material may be configured to effervesce under certain circumstances such as when combined with another material.

However, in another embodiment the effervescent material may be configured to effervesce (or otherwise produce bubbles) when exposed to heat. In this regard, the effervescent material may be configured to effervesce at a temperature at, or preferably below, a vaporization temperature of the aerosol precursor composition. By effervescing at, or preferably below, a temperature at which the aerosol precursor vaporizes, the air bubbles formed thereby may force the other components of the aerosol precursor composition to the surface of the liquid transport element 226. Accordingly, when current is applied through the heating element 228, the aerosol precursor component may be forced to the exterior of the liquid transport element 226, and then the aerosol precursor component may be vaporized more readily due to more immediate and direct contact with the heat produced by the heating element. Thus, the amount of electric power required to vaporize the aerosol precursor component may be reduced by employing an effervescent material as described above. Embodiments of effervescent materials are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; and U.S. Pat. No. 7,381,667 to Bergquist et al., as well as US Pat. Pub. Nos. 2006/0191548 to Strickland et al.; 2009/0025741 to Crawford et al; 2010/0018539 to Brinkley et al.; and 2010/0170522 to Sun et al.; and PCT WO 97/06786 to Johnson et al., all of which are incorporated by reference herein.

The reservoir substrate 210 includes an exterior surface 262 that can be substantially shaped and adapted to conform to an interior surface 264 of the external shell 212. In this regard, the external shell 212 may define a tubular shape with a cavity 266 therethrough sized to receive the reservoir substrate 210. For example, an inner radius of the external shell 212 may substantially correspond to, or may be slightly larger than, an outer radius of the reservoir substrate 210. Accordingly, the external shell 212 may be received over the reservoir substrate 210 and coupled to the base 202, as illustrated in FIG. 10. In this regard, one or more indentations 268 may engage the threads or protrusions 224 on the base 202 such that coupling is retained therebetween.

As illustrated in FIG. 11, the external shell 212 may couple to the mouthpiece 214 such that the cavity 266 defined by the external shell is at least partially enclosed. More particularly, in one embodiment one or more indentations 270 may engage threads or protrusions 272 on the mouthpiece 214 (see, e.g., FIG. 2) such that coupling therebetween is retained. The mouthpiece 214 defines one or more openings 274 through which air mixed with aerosol produced by the atomizer 208 may be directed when a user draws on the mouthpiece, as described in accordance with the above-noted example embodiments of smoking articles.

FIGS. 12 and 13 illustrate a coupler or receptacle 300 that may be included in a control body configured to engage the cartridge 200 and the various other embodiments of cartridges described below. As illustrated, the receptacle 300 may comprise protrusions or threads 302 that are configured to engage an external shell of the control body such that a mechanical connection is formed therebetween. The receptacle 300 may define an outer surface 304 configured to mate with an internal surface 276 of the base 202. In one embodiment the internal surface 276 of the base 202 may define a radius that is substantially equal to, or slightly greater than, a radius of the outer surface 304 of the receptacle 300. Further, the receptacle 300 may define one or more protrusions 306 at the outer surface 304 configured to engage one or more recesses 278 defined at the inner surface 276 of the base 202. However, various other embodiments of structures, shapes, and components may be employed to couple the base 202 to the receptacle 300. In some embodiments the connection between the base 202 and the receptacle 300 of the control body may be substantially permanent, whereas in other embodiments the connection therebetween may be releasable such that, for example, the control body may be reused with one or more additional cartridges.

The receptacle 300 may further comprise a plurality of electrical contacts 308*a-c* respectively configured to contact the end 220 of the control component terminal 204 and the ends 248*a*, 248*b* of the heater terminals 230. The electrical contacts 308*a* may be positioned at differing radial distances from a central opening 310 through the receptacle 300 and positioned at differing depths within the receptacle 300. The depth and radius of each of the electrical contacts 308*a-c* is configured such that the end 220 of the control component terminal 204 and the ends 248*a*, 248*b* of the heater terminals 230 respectively come into contact therewith when the base 202 and the receptacle 300 are joined together to establish an electrical connection therebetween. More particularly, in the illustrated embodiment, a first electrical contact 308*a* defines the smallest diameter, a third electrical contact 308*c* defines the greatest diameter, and a second electrical contact 308*b* defines a diameter therebetween. Further, the electrical contacts 308*a-c* are located at differing depths within the receptacle 300 relative to a connector end thereof. In the illustrated embodiment, the first electrical contact 308*a* is located at a greatest depth, the third electrical contract 308*c* is located at the smallest depth, and the second electrical contact 308*b* is located at a depth therebetween. Accordingly, the first electrical contact 308*a* may be configured to contact the end 220 of the control component terminal 204, the second electrical contact 308*b* may be configured to contact the second end 248*b* of the second heater terminal 230*b*, and the first end 248*a* of the first heater terminal 230*a* may be configured to contact the third electrical contact 308*c*.

In the illustrated embodiment the electrical contacts 308*a-c* comprise circular metal bands of varying radii positioned at differing depths within the receptacle 300 as described above. In one embodiment the bands may comprise continuous round rings. In another embodiment, the bands may comprise a sheet of metal material that is wound into the circular configuration and defines a joint where the ends thereof meet. In some embodiments the joint between the ends of each band of metal material may be configured at opposing non-perpendicular angles relative to a longitudinal length of the metal material defining the bands. Thereby, the ends of the band may meet at a joint that does not extend parallel to a central axis extending through the receptacle 300. This configuration may be preferable in that it avoids creating a joint extending parallel to the central axis through the receptacle, which could form a poor connection with an end of one of the heater terminals or the control component terminal when in contact therewith. Each of the bands defines a major contact surface facing radially inwardly toward the central axis of the receptacle 300. The bands defining the electrical contacts 308*a-c* are separated from one another by stepped surfaces of the body of the receptacle, which may be oriented perpendicularly to the radially facing major surfaces of the electrical contacts.

When the electrical contacts 308*a-c* comprise circular bands and the end 220 of the control component terminal 204 and the ends 248*a*, 248*b* of the heater terminals 230 extend to corresponding depths and radii within the base 202, electrical connections between the base and the receptacle 300 may be established regardless of the rotational orientation of the base with respect to the receptacle. Accordingly, connection between the base 202 of the cartridge 200 and the receptacle 300 of the control body may be facilitated. The electrical contacts 308*a-c* may be respectively coupled to a plurality of control body terminals 312*a-c* that connect to a plurality of components within the control body such as a battery and a controller therefor.

Further, when the base 202 of the cartridge 200 and the receptacle 300 of the control body are coupled together, a fluid connection may also be established. In this regard, the receptacle 300 may define a fluid pathway configured to receive air from an ambient environment and direct the air to the cartridge 200 when a user draws thereon. More particularly, in one embodiment the receptacle 300 may define a rim 314 with a radially extending notch 316 defined therein. Further a longitudinally extending recessed slot 318 may extend from the notch 316 to an opening 320. The opening 320 may define a cutout or a hole through a portion of the receptacle in some embodiments. Thus, when the receptacle 300 is engaged with the end of an external shell or body of a corresponding control body, the fluid pathway through the notch 316, the slot 318, and the opening 320 may remain open. Air drawn through this path may then be directed through the central opening 310 of the receptacle 300 and the central opening 254 of the base 202 when the receptacle and the base are connected to one another. Accordingly, air may be directed from the control body through the cartridge 200 in the manner described above when a user draws on the mouthpiece 214 of the cartridge.

Accordingly, the above-described cartridge 200 may provide benefits in terms of ease of assembly and ease of attachment to the receptacle 300 of a control body. In particular, with respect to the cartridge 200, assembly thereof may be simplified in that the components thereof may be axially assembled. More specifically, the components of the cartridge 200 may be assembled in the order illustrated in FIG. 2 in some embodiments. Thus, for example, the control component terminal 204 may be coupled to the base 202, the electronic control component 206 may be coupled to the control component terminal, the atomizer 208 may be coupled to the base, the reservoir substrate 210 may be coupled to the atomizer, the external shell 212 may be coupled to the base, and the mouthpiece 214 may be coupled to the external shell, in that order. Although this order of assembly may facilitate assembly of the cartridge 200, the components thereof may be assembled in differing orders in other embodiments.

An alternate embodiment of a cartridge 400 for a smoking article is illustrated in FIG. 14. The cartridge 400 may be substantially similar to the above-described embodiment of a cartridge 200 illustrated in FIG. 2. Accordingly, only differences with respect to the above-described embodiment of a cartridge 200 will be highlighted.

In this regard, the cartridge 400 may comprise a base 402, a control component terminal 404, an electronic control component 406, an atomizer 408, a reservoir substrate 410, an external shell 412, and a mouthpiece 414. The cartridge 400 may be configured to couple to a control body to form a smoking article. Accordingly, the cartridge 400 may include embodiments of each of the components described above with respect to the embodiment of the cartridge 200 illustrates in FIG. 2.

However, as illustrated in FIG. 14, the electronic control component 406 may comprise two portions 406*a*, 406*b*. A first portion 406*a* of the electronic control component 406 may include hardware and/or software configured to perform one or more functions, whereas the second portion 406*b* of the electronic control component may provide structural support thereto. Accordingly, the electronic control component 406 may be provided in two-piece form in some embodiments. This form may allow for substitution of the first portion 406*a*, as may be desirable to change the functionality of the electronic control component 406, while still employing the same second portion 406*b* for structural support.

The atomizer 408 may also differ in one or more aspects. In this regard, as illustrated in FIG. 15, the shape of the first heater terminal 430*a* and the second heater terminal (collectively, "heater terminals 430") may differ in that the first tab 444*a* and the second tab 444*b* (collectively, "tabs 444") may be positioned at the end of the heater terminals distal to the base 402 and extend therefrom. In this regard, as illustrated in FIG. 16, the atomizer 408 may comprise a liquid transport element 426 and a heating element 428. The heating element 428 may comprise a wire 434 defining a plurality of coils wound about the liquid transport element 426 and extending between a first wire end 436*a* and a second wire end 436*b* (collectively, "wire ends 436"). The tabs 444 may be configured to contact the wire ends 436 such that an electrical connection is established therebetween. In this regard, the tabs 444 may be configured to be positioned adjacent to the heating element 428 such that tabs contact one or more coils of the wire 434.

In one embodiment, as illustrated in FIG. 16, the spacing of the coils (i.e. the distance therebetween) may be less proximate the wire ends 436 than proximate a center of the heating element 428. For example, in one embodiment the coils of the heating element 428 may touch one another at the wire ends 436, whereas the coils may be spaced apart such that there is not contact therebetween between the wire ends. By decreasing the spacing between the coils of the wire 434 at the wire ends 436, more coils may contact the tabs 444, such that an improved electrical connection between the heating element 428 and the heater terminals 430 may be established. Although not illustrated, a weld may optionally be provided to secure the connection between the tabs 444 and the wire ends 436.

As illustrated in FIG. 14, the cartridge 400 may also include a retainer clip 480 in some embodiments. The retainer clip 480 may be configured to surround the atomizer 408 and retain the liquid transport element 426 in contact with the heater terminals 430. More specifically, a first distal arm 440*a* and a second distal arm 440*b* (collectively, "distal arms 440") of the liquid transport element 426 may be held in place against the heater terminals 430 by the retainer clip 480. The retainer clip 480 may define a plurality of inwardly extending bendable tabs. In some embodiments, as illustrated, the bendable tabs may include pre-bent tabs 482*a*, 482*b* configured to allow the distal arms 440 of the liquid transport element 426 to be received therethrough. After assembly of the cartridge 400, the retainer ring 480 may be positioned between the base 402 and the reservoir substrate 410.

Another difference between the cartridge 200 illustrated in FIG. 2 and the cartridge 400 illustrated in FIG. 14 is that in the embodiment the cartridge 400 illustrated in FIG. 14, the liquid transport element 426 and the heating element 428 may not be coupled to the heater terminals 430 until after the heater terminals are coupled to the base 402. In contrast, in the embodiment of the cartridge 200 illustrated in FIG. 2, the heater terminals 230 may be coupled to the liquid transport element 226 and the heating element 228 prior to coupling the atomizer 208, as an assembled unit, to the base 202. Coupling the assembled atomizer 208 to the base 202 may provide benefits in terms of assembly efficiency, whereas coupling the heater terminals 430 to the base 402 prior to coupling the liquid transport element 426 and the heating element 428 thereto may provide benefits in terms of use of the base as a structural member to hold the heater terminals in place during assembly, which may facilitate production of the heater terminals. Accordingly, both embodiments of assembly methods and related structures may provide benefits.

As illustrated in FIGS. 17-20, in some embodiments the cartridge may additionally include a flow tube 484. In some embodiments the flow tube 484 may comprise a ceramic material. For example, the flow tube 484 may comprise 96.5% aluminum trioxide in one embodiment. However, the flow tube 484 may be formed from various other materials in other embodiments.

As illustrated in FIG. 17, the flow tube 484 may be positioned between, and held in place by, the terminals 430. More particularly, as illustrated in FIG. 18, the flow tube 484 may define first 486*a* and second 486*b* opposing grooves (collectively, "grooves 486"). The grooves 486 may be sized and shaped to respectively receive one of the terminals 430 therein. In this regard, in some embodiments the flow tube 484 may define a generally round outer perimeter, with the exception of the grooves 486. Thus, the flow tube 484 may be received inside the cavity defined through the reservoir substrate 410. Accordingly, the flow tube 484 may additionally or alternatively be held in place by the reservoir substrate 410.

The flow tube 484 may further comprise a cutout 488 configured to receive the top of an electronic control component 406' therein. Optional differences with respect to the electronic control component 406' and the previously described embodiments of electronic control components are described below. By receiving the top of the electronic control component 406' in the cutout 488, the flow tube 484 may be at least partially coupled thereto. In this regard, during assembly of the cartridge, in one embodiment the flow tube 484 may be attached to the electronic control component 406' via reception of the top of the electronic control component in the cutout 488 prior to coupling the atomizer 408 to the base. However, in another embodiment the flow tube 484 may be coupled to the atomizer 408 via reception of the terminals 430 in the grooves 486 such that the cutout 488 engages the electronic control component 406' at the same time that the atomizer is coupled to the base 402.

The flow tube 484 may be configured to direct a flow of air received from a central opening 454 (see, FIG. 14) in the base 402 to the heating element 428 of the atomizer 408. More particularly, as illustrated in FIG. 18, the flow tube 484 may define a through hole 490 configured to receive air from the central opening 454 in the base 402 and direct it to the heating element 428. The electronic control component 406' may substantially align with a center of the through hole 490 such that air directed through the central opening 454 in the base 402 is directed around both sides of the electronic control component and then converges in the through hole 490. However, in other embodiments the central opening 454 in the base 402 may be configured to direct flow to only one side of the electronic component 406'. In this regard, in one embodiment the electronic control component 406' may define a substantially smooth surface on one side, and the flow of air from the central opening 454 in the base 402 may be directed to only the smooth side of the electronic control component. However, various other embodiments of electronic control components may be employed.

In the illustrated embodiment, the flow tube 484 defines a truncated side 492*a* (see, e.g., FIG. 19) and an elongated side 492*b* (see, e.g., FIG. 20). The elongated side 492*b* may define a flow channel 494 (see, e.g., FIG. 18) with a substantially constant area between the flow tube 484 and the electronic control component 406'. In some embodiments the electronic control component 406' may define the substantially smooth surface on the side adjacent to the elongated side 492*b* of the flow tube 484, as described above. Thus, the flow channel 494 may be substantially free of interference, which may improve flow to the heating element 428.

In contrast, the truncated side 492*a* of the flow tube 484 may be provided in order to complete the substantially round outer perimeter of the flow tube such that it may be retained in place in the reservoir substrate 410 and provide material through which the through hole 490 is defined. The flow tube 484 may be truncated on this side 492*a* in order to allow for space for components extending from the electronic control component 406'. However, depending on the particular size and shape of the electronic control component, the tubular reservoir substrate may be elongated on both sides such that the flow tube substantially surrounds the electronic control component and flow channels are defined on both sides thereof.

Regardless of the particular flow patterns around the electronic control component 406', the through hole 490 may receive all of the flow of air directed through the central opening 454 in the base 402. Accordingly, the size of the through hole 490 may be selected to define a desired velocity of air directed to the heating element 428. Accordingly, a desired amount of aerosol may be delivered to the air as it passes the heating element 428. For example, the through hole 490 may taper from a relatively larger diameter to a relatively smaller diameter proximate the heating element 428. However, in other embodiments the through hole 490 may define a substantially constant diameter.

FIG. 21 illustrates an additional embodiment of an atomizer 508. The atomizer 508 may be substantially similar to the embodiments of atomizers 208, 408 described above. Accordingly, features of the atomizer 508 that are substantially similar to the previously described embodiments will not be discussed. However, the heating atomizer 508 may differ in that it may further comprise a first connector ring 584*a* and a second connector ring 584*b* (collectively, "connector rings 584"). The connector rings 584 may surround a heating element 528. In this regard, as described above, the heating element 528 may comprise a wire 534 defining a plurality of coils wound about a liquid transport element 526 and extending between a first wire end 536*a* and a second wire end 536*b* (collectively, "wire ends 536"). The connector rings 584 may surround the heating element 528 at the wire ends 536.

A first heater terminal 530*a* and a second heater terminal 530*b* (collectively, "heater terminals 530") may engage the connector rings 584. Accordingly, an electrical connection may be established therebetween. More particularly, as illustrated in FIG. 22, the connector rings 584 may be coupled to the wire ends 536 prior to coupling the heating element 528 and the liquid transport element 526 to the heater terminals 530. Then, the connector rings 584 may be respectively received in a first clip 586*a* and a second clip 586*b* (collectively, "clips 586"), which may retain the connectors therein via interference fit. Accordingly, a relatively secure mechanical and electrical connection may be established between the heating element 528 and the heater terminals 530. In this regard, a weld may not be required to connect the heating element 528 to the heater terminals 530. However, a weld may be optionally included in some embodiments.

Note that the above-described atomizers and variations thereof may be employed in a variety of embodiments of cartridges for aerosol delivery devices. In this regard, FIG. 23 illustrates a partially exploded view of an aerosol delivery device 600 including a control body 700, which is illustrated in an assembled configuration, and a cartridge 800, which is illustrated in an exploded configuration. The control body 700 may include various components as described above. For example, the control body 700 may include an outer tube 702 and a receptacle or coupler 704 and an end cap 706 coupled to opposing ends of the outer tube. Various internal components inside the outer tube 702 may include, by way of example, a flow sensor, a control component, and an electrical power source (e.g., a battery), and a light emitting diode (LED) element. However, the control body 700 may include additional or alternative components in other embodiments.

As illustrated, the cartridge 800 may comprise a base shipping plug 802, a base 804, a control component terminal 806, an electronic control component 808, a flow tube 810, an atomizer 812, a reservoir substrate 814, an external shell 816, a label 818, a mouthpiece 820, and a mouthpiece shipping plug 822 according to an example embodiment of the present disclosure. Many of these components are substantially similar to the components of the cartridges described above. Accordingly, only differences with respect to the previously-described embodiments of cartridges will be described below.

In this regard, in one embodiment the electronic control component 808 may comprise a single-piece printed circuit board assembly. The electronic control component 808 may include a ceramic substrate, which may comprise about 96% alumina ceramic in one embodiment. This material is inorganic, non-reactive, non-degrading, and non-porous. Use of such a ceramic material may be preferable in that it may define a robust, dimensionally-stable part without requiring a separate supporting structure. Further, such a ceramic material may allow for adhesion of a coating thereto. For example, a component side of the electronic control component 808 may comprise a chloro-substituted poly (para-xylylene) commercially available as Parylene C from Specialty Coating Systems, Inc., or any other coating or other sealant/barrier coating configured to protect components of the circuit board from liquid and moisture. The sealant/barrier coating may also provide the electronic control component 808 with a decreased coefficient of friction, which may facilitate an axial assembly process of the cartridge 800.

Further, the mouthpiece shipping plug 822 is configured to engage openings in the mouthpiece 820 prior to use of the cartridge 800 in order to prevent entry of contaminants through the openings in the mouthpiece. Similarly, the base shipping plug 802 is configured to couple to an inner periphery of the base 804 to protect the base from damage or contamination during transport and storage. Further, the label 818 may serve as an exterior member providing the cartridge 800 with identifying information.

FIG. 24 illustrates a perspective view of the cartridge 800 in a partially assembled configuration. More particularly, FIG. 24 illustrates components of the cartridge 800 in a partially assembled configuration corresponding to the configuration illustrated in FIG. 9. Thus, briefly, FIG. 24 illustrates a configuration in which the control component terminal 806 has been coupled to the base 804, the electronic control component 808 has been coupled to the electronic control component terminal, a first heater terminal **834*a* and a second heater terminal 834*b* (collectively, "heater terminals 834") has been coupled to the base, the flow tube 810 is received between the heater terminals, a heating element 840 is coupled to a liquid transport element 838, the heating element is coupled to first and second tabs 836*a*, 836*b* (collectively, "tabs 836) of the heater terminals to complete the atomizer 812, and the reservoir substrate 814** is received around the atomizer.

The reservoir substrate 814 may define a cavity 852 extending therethrough from a first reservoir end **854*a* to a second reservoir end 854*b* (collectively, "reservoir ends 854"), wherein the first reservoir end is positioned proximate the base 804. In this regard, the reservoir substrate 814 may define a hollow tubular configuration. The reservoir substrate 814 can comprise one or more of various materials and can be formed in a variety of different manners. In one embodiment the reservoir substrate 814 can be formed from a plurality of combined layers that can be concentric or overlapping. For example, the reservoir substrate 814 can be a continuous sheet of a material that is rolled such that the ends thereof meet along a joint 856 to form the hollow tubular configuration, or multiple layers of the material may be wrapped thereabout. Thus, the reservoir substrate 814 may conform to the shape of the components received in the cavity 852 such as the atomizer 812**.

As illustrated in FIGS. 23 and 24, in some embodiments the heating element 840 may comprise a wire wound about the liquid transport element 838 and extending along substantially the entirety of the length of the liquid transport element 838. As further illustrated, in one embodiment the heating element 840 may define a variable coil spacing. The spacing of the coils may be the smallest proximate the tabs 836, greatest at the distal ends of the liquid transport element 838, and in between the spacing of the coils at the tabs and the distal ends between the heater terminals 834. By decreasing the spacing between the coils of the heating element 840 proximate the tabs 836, contact therebetween may be improved. For example, a laser may be directed at a back side of the tabs, opposite from the heating element 840, which may weld the heating element to the tabs in order to provide for a connection therebetween. The spacing of the coils of the heating element 840 between the tabs 836 may be selected to define a desired resistance and/or produce a desired amount of heat. Further, the spacing of the coils of the heating element 840 at the distal ends of the liquid transport element 838 may be relatively large in order to decrease material costs associated with production of the heating element.

The cartridge 800 may additionally include the flow tube 810, which may be substantially similar to the above-described flow tube 484. Thus, as illustrated in FIG. 24, the flow tube 810 may be positioned between, and held in place by, the terminals 834. More particularly, the flow tube 810 may define first **858*a* and second 858*b* opposing grooves (collectively, "grooves 858"). The grooves 858 may be sized and shaped to respectively receive one of the terminals 834 therein. In this regard, in some embodiments the flow tube 810 may define a generally round 10 outer perimeter, with the exception of the grooves 858. Thus, the flow tube 810 may be received inside the cavity 852 defined through the reservoir substrate 814. Accordingly, the flow tube 810 may additionally or alternatively be held in place by the reservoir substrate 814. The flow tube 810 may also be held in place via contact with the electronic control component 808** in some embodiments.

The flow tube 810 may be configured to direct a flow of air received from the base 804 to the heating element 840 of the atomizer 812. More particularly, as illustrated in FIG. 24, the flow tube 810 may define a through hole 860 extending at least partially along the length of the flow tube at a center thereof and configured to receive air from the base 804 and direct it to the heating element 840. Accordingly, the size of the through hole 860 may be selected to define a desired velocity of air directed to the heating element 840. Accordingly, a desired amount of aerosol may be delivered to the air as the air passes the heating element 840. For example, the through hole 860 may taper from a relatively larger diameter to a relatively smaller diameter proximate the heating element 840. However, in other embodiments the through hole 860 may define a substantially constant or increasing diameter.

In some embodiments the flow tube 810 may comprise a ceramic material. For example, the flow tube 810 may comprise 96.5% aluminum tri oxide in one embodiment. This material may provide heat resistance which may be desirable due to proximity to the heating element 840. However, the flow tube 810 may be formed from various other materials in other embodiments.

The reservoir substrate 814 includes an exterior surface 862 that can be substantially shaped and adapted to conform to an interior surface of the external shell 816 (see, FIG. 23). Accordingly, the external shell 816 may be received over the reservoir substrate 814 and coupled to the base 804. In a fully assembled configuration the cartridge may appear substantially similar to the cartridge 200 illustrated in FIG. 11 with the base shipping plug, the mouthpiece shipping plug, and the label coupled thereto.

A method for assembling a cartridge for a smoking article is also provided. As illustrated in FIG. 25, the method may include providing a base defining a connector end configured to engage a control body, an atomizer, and a reservoir substrate configured to hold an aerosol precursor composition and defining a cavity extending therethrough from a first reservoir end to a second reservoir end at operation 900. Further, the method may include connecting the atomizer to the base at operation 902. Additionally, the method may include inserting the atomizer through the cavity through the reservoir substrate at operation 904.

In some embodiments the method may further comprise assembling the atomizer at operation 906. Assembling the atomizer at operation 906 may comprise providing a plurality of heater terminals, a liquid transport element extending between a first liquid transport element end and a second liquid transport element end, and a heating element. Further, assembling the atomizer at operation 906 may include wrapping the heating element at least partially about the liquid transport element and connecting the heating element to the heater terminals such that the heating element extends therebetween and a first distal arm of the liquid transport element and a second distal arm of the liquid transport element extend along the heater terminals. In some embodiments wrapping the heating element at least partially about the liquid transport element may comprise winding a wire about the liquid transport element to define a plurality of coils wound about the liquid transport element extending between a first wire end and a second wire end. Further, winding the wire about the liquid transport element to define the coils may comprise winding the wire such that a spacing of the coils of the wire is less proximate the first wire end and the second wire end.

In some embodiments assembling the atomizer at operation 906 may comprise coupling a plurality of connector rings to the heating element at the first wire end and the second wire end, wherein connecting the heating element to the heater terminals comprises connecting the heater terminals to the connector rings. In some embodiments connecting the heating element to the heater terminals may comprise connecting the heating element to the heater terminals directly. Further, connecting the atomizer to the base at operation 902 may comprise connecting the heater terminals to the base. Additionally, inserting the atomizer through the cavity at operation 904 may comprise positioning the atomizer such that the heating element is proximate the second reservoir end, the first distal arm and the second distal arm of the liquid transport element and the heater terminals are at least partially received in the cavity, the first liquid transport element end and the second liquid transport element end are proximate the first reservoir end, and the first reservoir end of the reservoir substrate is proximate the base. Inserting the atomizer through the cavity at operation 904 may further comprise inserting the first distal arm and the second distal arm of the liquid transport element in a plurality of grooves extending between the first reservoir end and the second reservoir end of the reservoir substrate at the cavity.

The method may further comprise providing an electronic control component and a control component terminal at operation 908, connecting the control component terminal to the base at operation 910, coupling the electronic control component to the control component terminal at operation 912, and inserting the electronic control component into the cavity of the reservoir substrate at operation 914. Connecting the control component terminal to the base at operation 910 and connecting the heater terminals to the base may comprise inserting the control component terminal and the heater terminals to a plurality of different heights within the base. Further, connecting the control component terminal to the base at operation 910 and coupling the electronic control component to the control component terminal at operation 912 may be conducted before connecting the heater terminals to the base. The method may further comprise inserting the atomizer through a retainer clip configured to retain the liquid transport element in contact with the heater terminals at operation 916. Additionally, the method may include providing an external shell and a mouthpiece at operation 918 and coupling the external shell to the base and coupling the mouthpiece to the external shell at operation 920.

In some embodiments the method described above and various other embodiments of methods for assembling a cartridge for a smoking article may be substantially automated. For example, an assembly line may employ a plurality of substations to automatically assemble the cartridge. A first substation may provide the base. A second substation may insert the control component terminal into the base. A third substation may insert the heater terminals into the base. A fourth substation may couple the electronic control component to the control component terminal. A fifth substation may attach the flow tube to the electronic control component and the heater terminals. A sixth substation may cut the heating element and the liquid transport element and laser weld the heating element to the heater terminals. A seventh substation may bend the distal arms of the liquid transport element into contact with the heater terminals. An eighth substation may electrically test the atomizer to determine whether it defines a desired resistance. A ninth substation may flow test the assembly to determine if it defines a desired pressure drop. A tenth substation may couple the reservoir substrate to the assembly and couple a sleeve around the reservoir substrate. An eleventh substation may couple the sleeve to the base, for example by crimping the sleeve thereon. A twelfth substation may flow test the assembly to determine if it defines a desired pressure drop.

A thirteenth substation may couple a shipping plug to the base to protect the base during shipment.

Thereafter, the assembly created by the above-described substations may be transported to a second assembly line. The second assembly line may include a first substation that brings a mouthpiece into contact with the sleeve. A second substation may press the mouthpiece into the sleeve. A third substation may crimp the sleeve to retain the mouthpiece in place. A fourth substation may laser mark the sleeve and visually inspect the assembly. A fifth substation may wrap a label around the assembly and visually inspect the assembly to determine if the label is properly positioned. A sixth substation may insert a shipping plug into the mouthpiece. A seventh substation may off-load the completed assemblies and separate out rejects. However, it should be understood that the above-described operations may be performed in other manners by other combinations of substations, in other orders, and/or with a greater or smaller number of assembly lines.

In the various embodiments described above, the heating element is generally described as comprising a wire wound about a liquid transport element and defining a plurality of coils thereon. However, various other embodiments of heating elements may be employed. In this regard, various other embodiments of heating elements and methods and inputs for the production thereof are provided below.

By way of example, FIG. 26 illustrates an input 1000 for production of a plurality of atomizers. As illustrated, the input 1000 may comprise a carrier 1002 defining a plurality of access windows 1004 spaced apart along a longitudinal axis 1006 of the carrier. The input 1000 may further comprise a plurality of heating elements 1008 that are coupled to the carrier 1002 and respectively received in the access windows 1004.

In some embodiments the carrier 1002 and the heating elements 1008 may be integrally formed from a sheet of a material. The material defining the sheet may comprise a material configured to produce heat when an electrical current is applied thereto. For example, the material may comprise Kanthal (FeCrAl), Nichrome, Molybdenum disilicide ($MoSi_2$), molybdenum silicide (MoSi), Molybdenum disilicide doped with Aluminum ($Mo(Si,Al)_2$), or ceramic (e.g., a positive temperature coefficient ceramic). However, various other materials may be employed in other embodiments.

Various embodiments of operations may be performed to produce the input 1000. For example, the sheet of the material may be cut (e.g., die or laser cut), stamped, and/or various other operations may be performed thereon. Accordingly, the input 1000 may be produced in a relatively simple manner, which may be repeated on a large scale to produce a number of the inputs, or a continuous roll of the input.

As further illustrated in FIG. 26, the carrier 1002 may comprise a first side strip 1010*a* and a second side strip 1010*b* (collectively, "side strips 1010") extending parallel to the longitudinal axis 1006 of the carrier 1002. The side strips 1010 may be employed to impart motion to the input 1000 along the longitudinal axis 1006 of the carrier 1002 during use thereof to produce atomizers. For example, pairs of counter-rotating wheels may engage the side strips 1010. In another embodiment one or both of the side strips 1010 may include a plurality of apertures 1012 extending therethrough. Thus, by way of example, the apertures 1012 may be engaged by protrusions on rotating wheels in order to impart motion to the input 1000 along the longitudinal axis 1006 of the carrier 1002.

In some embodiments the carrier 1002 may further comprise a plurality of connecting strips 1014 extending between the first side strip 1010*a* and the second side strip 1010*b* and separating the access windows 1004. For example, in the illustrated embodiment the connecting strips 1014 are configured perpendicularly to the side strips 1010. The connecting strips 1014 may provide the input 1000 with support and stability. As illustrated in FIG. 26, in some embodiments a first end 1016 and a second end 1018 of each of the heating elements 1008 may be respectively coupled to one of the connecting strips 1014. Thus, connections between the ends 1016, 1018 of the heating elements 1008 and the connecting strips 1014 may be retained when the input 1000 is formed from the sheet of the material. Accordingly, in one embodiment the heating elements 1008 may be directly supported by the connecting strips 1014 and indirectly supported by the side strips 1010, to which the connecting strips couple. In this embodiment, longitudinal axes 1020 of each of the heating elements 1008 may be coaxial with the longitudinal axis 1006 of the carrier 1002.

FIG. 27 illustrates an enlarged view of one of the heating elements 1008 with the remainder of the input 1000 not shown for clarity purposes. Note that the heating element 1008 may be produced without first being formed as a part of the input 1000. In this regard, the heating elements 1008 may still be produced from a sheet of a material, but the heating elements may be separated from one another or provided in differing connected forms in some embodiments of the present disclosure.

The heating element 1008 may comprise the first end 1016, the second end 1018, and a plurality of interconnected loops 1022 connected to the first end and the second end through a first connector section 1023*a* and a second connector section 1023*b* (collectively, "connector sections 1023"). The connector sections 1023 may couple the ends 1016, 1018 to the loops 1022. As illustrated in FIG. 27, in some embodiments the loops 1022 may be oriented transversely to the longitudinal axis 1020 of the heating element 1008 and the connector sections 1023. In other words, the loops 1022 may generally extend perpendicularly relative to the longitudinal axis 1020 of the heating element 1008 and the connector sections 1023.

As further illustrated in FIG. 27, the loops 1022 may be alternatingly disposed with respect to the longitudinal axis 1020 and the connector sections 1023. In this regard, as illustrated in FIG. 27, a first loop 1022*a* may be positioned on a first side 1024 of the longitudinal axis 1020 and the connector sections 1023, and a second loop 1022*b* may be positioned on an opposing second side 1026 of the longitudinal axis and the connector sections. This pattern may be repeated for one or more additional loops 1022.

As noted above, the input 1000 as a whole, including the heating elements 1008 may be formed from a single sheet of a material. In this regard, the first end 1016, the second end 1018, the connector sections 1023, and the interconnected loops 1022 may be integrally formed from the sheet of the material. As noted above, various embodiments of materials may be employed. For example, the sheet may comprise Kanthal (FeCrAl), Nichrome, Molybdenum disilicide ($MoSi_2$), molybdenum silicide (MoSi), Molybdenum disilicide doped with Aluminum ($Mo(Si,Al)_2$), and ceramic (e.g., a positive temperature coefficient ceramic). In this regard, the material may be configured to produce heat when electrical current is applied therethrough. Further, in some embodiments the material may be configured to bend, as described below. In some embodiments the material of the sheet may be a metal material.

In some embodiments the first end 1016 and the second end 1018 of the heating element 1008 may define a width 1028 that is greater than a width 1030 of the material defining the interconnected loops 1022 and the connector sections 1023. Providing the first end 1016 and the second end 1018 of the heating elements 1008 with a greater width 1028 than the width 1030 of the material defining the interconnected loops 1022 and the connecting sections 1023 may provide the first end and the second end with a relatively larger surface area that may facilitate connection of the heating elements to heater terminals. For example, welding and/or other methods of coupling the heating elements 1008 to the heater terminals may be employed, as described elsewhere herein.

The heating elements 1008 may be at least partially bent around a liquid transport element in order to form an atomizer. In some embodiments the heating elements 1008 may be pre-bent prior to coupling to a liquid transport element such that they me received partially about the liquid transport element prior to completion of bending thereabout. In this regard, FIG. 26 illustrates a first portion 1034 of the heating elements 1008 in an initial planar configuration and a second portion 1036 of the heating elements are illustrated as having been pre-bent from the initial planar configuration to an intermediate, pre-bent configuration. In the intermediate configuration, at least a part of the interconnected loops 1022 may be oriented in a non-planar configuration relative to a remainder of the input 1000. For example, at least a portion of the interconnected loops 1022 may be oriented substantially perpendicular to a plane defined by the remainder of the input 1000 such that the interconnected loops oppose one another. Accordingly, the pre-bent heating elements 1008 may receive a liquid transport element between the opposing interconnected loops 1022. However, in other embodiments the heating elements 1008 may be wrapped about the liquid transport element without first pre-bending the interconnected loops. For example, the heating elements 1008 may be bent from the planar configuration to a configuration in which the interconnected loops 1022 at least partially wrap about the liquid transport element without first being bent to an intermediate configuration.

Regardless of whether the interconnected loops 1022 are pre-bent to the intermediate configuration, the interconnected loops may ultimately be wrapped at least partially around a liquid transport element. By way of example, FIG. 28 illustrates one of the heating elements 1008 in a fully bent configuration. Note that in the fully bent configuration, the heating elements 1008 may be wrapped around a liquid transport element. However, the liquid transport element is not shown in FIG. 28 for clarity purposes.

As illustrated in FIG. 28, the interconnected loops 1020 may be bent such that a plurality of tips 1038 of the interconnected loops are positioned adjacent one another. Further, the interconnected loops 1022 may define a substantially cylindrical void 1040 extending parallel to the longitudinal axis 1020 of the heating element 1008 and the connector sections 1023. The substantially cylindrical void 1040 may be configured to define a radius substantially equal to a radius of the liquid transport element about which the interconnected loops 1022 are wrapped, such that the heating element 1008 may be retained thereon. Note that in the bent configuration, the connector sections 1023 and the ends 1016, 1018 may remain in a substantially planar configuration.

A second embodiment of an input 1100 for production of a plurality of atomizers is illustrated in FIG. 29. As illustrated, the input 1100 illustrated in FIG. 29 may be substantially similar to the input 1000 illustrated in FIG. 26. Accordingly, similar features of the input 1100 will not be described in detail, and only differences therebetween will be highlighted.

In this regard, as illustrated in FIG. 29, the input 1100 may comprise a carrier 1102 defining a plurality of access windows 1104 spaced apart along a longitudinal axis 1106 of the carrier. The input 1100 may further comprise a plurality of heating elements 1108 that are coupled to the carrier 1102 and respectively received in the access windows 1104. The carrier 1102 may comprise a first side strip 1110*a* and a second side strip 1110*b* (collectively, "side strips 1110") extending parallel to the longitudinal axis 1106. The side strips 1110 may include a plurality of apertures 1112 extending therethrough.

The carrier 1102 may further comprise a plurality of connecting strips 1114 extending between the first side strip 1110*a* and the second side strip 1110*b* (e.g., perpendicularly thereto) and separating the access windows 1104. In the embodiment of the input 1000 described above and illustrated in FIG. 26, the ends 1016, 1018 of each of the heating elements 1008 are respectively coupled to one of the connecting strips 1014. In contrast, in the embodiment of the input 1100 illustrated in FIG. 29, a first end 1116 and a second end 1118 of each of the heating elements 1108 are respectively coupled to one of the first side strip 1110*a* and the second side strip 1110*b*. Thus, the heating elements 1108 may be directly coupled to and supported by the side strips 1110 in some embodiments. In this embodiment, connections between the ends 1116, 1118 of the heating elements 1108 and the side strips 1110 may be retained when the input 1100 is formed.

Further, a plurality of longitudinal axes 1120 of the heating elements 1108 may be perpendicular to the longitudinal axis 1106 of the carrier 1102. Each of the longitudinal axes 1120 of the heating elements 1108 may be parallel with one another in some embodiments. A plurality of interconnected loops 1122 may be respectively connected to the first end 1116 and the second end 1118 by a first connector section 1123*a* and a second connector section 1123*b* (collectively, "connector sections 1123"). The interconnected loops 1122 may be oriented transversely to the longitudinal axes 1120 of the heating elements 1108 and the connector sections 1123 and alternatingly disposed with respect thereto.

A first portion 1134 of the input 1100 is illustrated with the interconnected loops 1122 of the heating elements 1108 in an unbent, planar configuration. In contrast, a second portion 1136 of the input 1100 is illustrated with the interconnected loops 1122 in a pre-bent configuration. As described above, the input 1100 may be provided in either the planar or pre-bent configurations prior to being wrapped about a liquid transport element.

FIG. 30 illustrates production of atomizers according to an example embodiment of the present disclosure. In the illustrated embodiment, by way of example, a cartridge subassembly 1200' comprising a base 1202 with an electronic control component 1206 and first and second heater terminals 1230*a*, 1230*b* (collectively, "heater terminals 1230") coupled thereto is provided. The electronic control component 1206 may be coupled to the base 1202 via a control component terminal 1204.

A liquid transport element 1226 may also be provided. In some embodiments the liquid transport element 1226 may be at least partially engaged with the heater terminals 1206 prior to coupling the heating element 1108 thereto. In this regard, FIG. 30 illustrates a cartridge subassembly 1200"

comprising the components of the cartridge subassembly 1200' in addition to the liquid transport element 1226. As illustrated, a first distal arm 1240*a* and a second distal arm 1240*b* (collectively, "distal arms 1240") of the liquid transport element 1226 may be engaged with the heater terminals 1230 and a center section 1240*c* of the liquid transport element may extend therebetween. Accordingly, the liquid transport element 1226 may be transported to one or more assembly stations by moving the base 1202. Alternatively or additionally, the base 1202 may be employed to hold the liquid transport element 1226 in a position that assists in attachment of one of the heating elements 1108 thereto.

The cartridge subassembly 1200" may then be moved into proximity with the input 1100. More particularly, one of the heating elements 1108 may be brought into proximity with the center section 1240*c* of the liquid transport element 1226. Thereby, the interconnected loops 1122 of the heating element 1108 may be at least partially wrapped around the liquid transport element 1226. For example, a pair of actuators may extend into one of the access windows 1104 and compress the interconnected loops 1122 against the liquid transport element 1226. In some embodiments the actuators may define a profile configured to match a profile of the liquid transport element 1226. For example, the actuators may define actuating surfaces configured to engage the heating element 1108 that define a radius substantially equal to a radius of the liquid transport element 1226. However, the liquid transport may define cross-sectional shapes other than rounded in other embodiments, and the actuators configured to bend the heating element may be appropriately configured to match the particular cross-sectional shape. During the bending operation of the heating element 1108 about the liquid transport element 1226, the ends 1116, 1118 of the heating element may remain connected to the carrier 1102. Accordingly, the heating element 1108 may be supported by the carrier 1102 during the bending operation such that issues with respect to retaining the heating element in the proper position may be averted.

Thereafter, the ends 1116, 1118 of the heating element 1108 may be decoupled from the carrier 1102 and the ends of the heating element may be connected to the heater terminals 1230 to form an atomizer 1208, as illustrated at cartridge subassembly 1200'". Additional cartridge subassemblies 1200'" with atomizers 1208 may be produced by repeating the procedures noted above and incrementing the position of the input 1100 such that the next heating element 1108 may be provided in an appropriate position. For example, in the embodiment illustrated in FIG. 30, the input 1100 may be incremented generally into the page and to the left.

Accordingly, use of the above-described embodiments of heating elements formed from a sheet of a material may be beneficial in that it may eliminate the need to conduct winding operations in which a wire is wound about a liquid transport element. In this regard, winding a wire about a liquid transport element to form a heating element may require a relatively high degree of precision. Further, handling of the wire, which may define a relatively small diameter, may be difficult. In contrast, the formation of heating elements from a sheet of material may only involve relatively simple cutting operations, which may allow for repeatable mass production thereof. Further, the attachment of the heating elements to the liquid transport element may be simplified by employing the carrier to hold the heating elements. Thus, the heating elements may be easily transported to a desired position by moving the carrier. Further, the carrier may support the heating element during attachment to the liquid transport element. Accordingly, use of heating elements formed from a sheet of a material may simplify production of cartridges for a smoking article.

A method of forming a plurality of atomizers is also provided. As illustrated in FIG. 30, the method may comprise providing a sheet of a material at operation 1300. The method may further include forming the sheet of the material into a carrier defining a plurality of access windows spaced apart along a longitudinal axis of the carrier at operation 1302. Additionally, the method may include forming the sheet of the material into a plurality of heating elements that are coupled to the carrier and respectively received in the access windows at operation 1304.

In some embodiments the method may further comprise providing a liquid transport element at operation 1306. The method may additionally include bending the interconnected loops about the liquid transport element at operation 1308. A plurality of tips of the interconnected loops may be positioned adjacent one another and the interconnected loops may define a substantially cylindrical void extending parallel to the longitudinal axis of the carrier in which the liquid transport element is received in some embodiments. The method may additionally include decoupling the heating elements from the carrier at operation 1310 and connecting a first end and a second end of each of the heating elements to a plurality of heater terminals at operation 1312.

In some embodiments of the method, forming the sheet of the material into the carrier at operation 1302 may comprise forming a first side strip and a second side strip extending parallel to the longitudinal axis. Further, forming the sheet of the material into the carrier at operation 1302 and forming the sheet of the material into the heating elements at operation 1304 may comprise retaining a plurality of connections between a first end and a second end of the heating elements and the first side strip and the second side strip. Additionally, forming the sheet of the material into the carrier at operation 1302 may comprise forming a plurality of apertures extending through at least one of the first side strip and the second side strip.

In some embodiments of the method, forming the sheet of the material into the carrier at operation 1302 may comprise forming a plurality of connecting strips extending between the first side strip and the second side strip and separating the access windows. Further, forming the sheet of the material into the carrier at operation 1302 and forming the sheet of the material into the heating elements at operation 1304 may comprise retaining a plurality of connections between a first end and a second end of each of the heating elements and the connecting strips. Additionally, forming the sheet of the material into the heating elements at operation 1304 may comprise forming a plurality of interconnected loops oriented transversely to a plurality of longitudinal axes of the heating elements. Forming the sheet of the material into the heating elements at operation 1304 may also comprise forming the heating elements such that the longitudinal axes thereof are coaxial with the longitudinal axis of the carrier. In another embodiment, forming the sheet of the material into the heating elements at operation 1304 may comprise forming the heating elements such that the longitudinal axes thereof are perpendicular to the longitudinal axis of the carrier.

In an additional aspect, a controller configured to execute computer code for performing the above-described operations is provided. The controller may comprise a processor that may be a microprocessor or a controller for controlling the overall operation thereof. In one embodiment the processor may be particularly configured to perform the functions described herein. The controller may also include a memory device. The memory device may include non-transitory and tangible memory that may be, for example, volatile and/or non-volatile memory. The memory device may be configured to store information, data, files, applications, instructions or the like. For example, the memory device could be configured to buffer input data for processing by the processor. Additionally or alternatively, the memory device may be configured to store instructions for execution by the processor.

The controller may also include a user interface that allows a user to interact therewith. For example, the user interface can take a variety of forms, such as a button, keypad, dial, touch screen, audio input interface, visual/image capture input interface, input in the form of sensor data, etc. Still further, the user interface may be configured to output information to the user through a display, speaker, or other output device. A communication interface may provide for transmitting and receiving data through, for example, a wired or wireless network such as a local area network (LAN), a metropolitan area network (MAN), and/or a wide area network (WAN), for example, the Internet.

The controller may also include atomizer forming module. The processor may be embodied as, include or otherwise control the atomizer forming module. The atomizer forming module may be configured for controlling or executing the atomizer forming operations described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling atomizer forming operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Thus, an embodiment of a non-transitory computer readable medium for storing computer instructions executed by a processor in a controller for an apparatus configured to form atomizers is provided. The non-transitory computer readable medium may comprise computer code for providing a sheet of a material, computer code for forming the sheet of the material into a carrier defining a plurality of access windows spaced apart along a longitudinal axis of the carrier, and computer code for forming the sheet of the material into a plurality of heating elements that are coupled to the carrier and respectively received in the access windows.

In some embodiments the non-transitory computer readable medium may further comprise computer code for providing a liquid transport element and computer code for bending the interconnected loops about the liquid transport element such that a plurality of tips of the interconnected loops are positioned adjacent one another and the interconnected loops define a substantially cylindrical void extending parallel to the longitudinal axis of the carrier. The non-transitory computer readable medium may further comprise computer code for decoupling the heating elements from the carrier and computer code for connecting a first end and a second end of each of the heating elements to a plurality of heater terminals.

Additionally, in some embodiments the computer code for forming the sheet of the material into the carrier may comprise computer code for forming a first side strip and a second side strip extending parallel to the longitudinal axis. Computer code for forming the sheet of the material into the carrier and computer code for forming the sheet of the material into the heating elements may comprise computer code for retaining a plurality of connections between a first end and a second end of the heating elements and the first side strip and the second side strip. Computer code for forming the sheet of the material into the carrier may comprise computer code for forming a plurality of apertures extending through at least one of the first side strip and the second side strip. Computer code for forming the sheet of the material into the carrier may comprise computer code for forming a plurality of connecting strips extending between the first side strip and the second side strip and separating the access windows.

In some embodiments computer code for forming the sheet of the material into the carrier and computer code for forming the sheet of the material into the heating elements may comprise computer code for retaining a plurality of connections between a first end and a second end of each of the heating elements and the connecting strips. Computer code for forming the sheet of the material into the heating elements may comprise computer code for forming a plurality of interconnected loops oriented transversely to a plurality of longitudinal axes of the heating elements. Computer code for forming the sheet of the material into the heating elements may comprise computer code for forming the heating elements such that the longitudinal axes thereof are coaxial with the longitudinal axis of the carrier. Computer code for forming the sheet of the material into the heating elements may comprise computer code for forming the heating elements such that the longitudinal axes thereof are perpendicular to the longitudinal axis of the carrier.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A cartridge of an aerosol delivery device, the cartridge comprising:
- a base configured for connection with a control body of the aerosol delivery device;
- a liquid transport element;
- a heating element at least partially surrounding a portion of the liquid transport element; and
- a plurality of heater terminals extending from the heating element and configured to engage the base such that the heating element at least partially surrounding the portion of the liquid transport element is retained in engagement with the base,
- wherein the heating element comprises a first end, a second end, a first connector section, a second connector section, and a plurality of interconnected loops connected to the first end through the first connector section and connected to the second end through the second connector section;

wherein the heating element defines a longitudinal axis between the first end and the second end, and the plurality of interconnected loops are arranged so that one or more of the plurality of interconnected loops are positioned on a first side of the heating element and so that one or more of the plurality of interconnected loops are positioned on a second side of the heating element; and wherein the plurality of interconnected loops are alternatingly disposed with respect to the longitudinal axis.

2. The cartridge of claim 1, wherein the plurality of heater terminals engage the base via interference fit.

3. The cartridge of claim 1, wherein the heater terminals are configured to engage the control body so as to establish an electrical connection therewith.

4. The cartridge of claim 1, wherein ends of the plurality of heater terminals are exposed at an end of the base.

5. The cartridge of claim 1, wherein the base comprises at least one opening configured to receive airflow therethrough.

6. The cartridge of claim 5, wherein the at least one opening is configured to direct the airflow toward the heating element.

7. The cartridge of claim 1, wherein the first end, the second end, and the plurality of interconnected loops of the heating element are integrally formed from a sheet of a material that is configured to produce heat when an electrical current is applied thereto.

8. The cartridge of claim 1, wherein the one or more of the plurality of interconnected loops that are positioned on the first side of the heating element and the one or more of the plurality of interconnected loops that are positioned on the second side of the heating element are bent so as to define a void therebetween in which the liquid transport element is arranged.

9. The cartridge of claim 1, wherein at least one of the plurality of heater terminals is extending from the first end of the heating element, and at least one of the plurality of heater terminals is extending from the second end of the heating element.

10. The cartridge of claim 1, wherein the plurality of interconnected loops are oriented in a non-planar configuration relative to one or more of the first end, the first connector section, the second end, and the second connector section.

* * * * *